(12) United States Patent
Choi et al.

(10) Patent No.: US 9,451,645 B2
(45) Date of Patent: Sep. 20, 2016

(54) DATA COMMUNICATION METHOD AND APPARATUS BASED ON WIRELESS COMMUNICATION

(71) Applicant: Samsung Electronics Co., Ltd., Gyeonggi-do (KR)

(72) Inventors: Wonsuk Choi, Seoul (KR); Kwangsub Son, Gyeonggi-do (KR); Suha Yoon, Seoul (KR); Youngeun Han, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 14/461,215

(22) Filed: Aug. 15, 2014

(65) Prior Publication Data
US 2015/0050880 A1    Feb. 19, 2015

(30) Foreign Application Priority Data
Aug. 16, 2013 (KR) .......................... 10-2013-0097325

(51) Int. Cl.
| | | |
|---|---|---|
| *H04W 24/00* | (2009.01) | |
| *H04W 76/02* | (2009.01) | |
| *H04B 7/26* | (2006.01) | |
| *H04W 48/00* | (2009.01) | |

(52) U.S. Cl.
CPC .............. *H04W 76/02* (2013.01); *H04B 7/26* (2013.01); *H04W 48/00* (2013.01)

(58) Field of Classification Search
None
See application file for complete search history.

(56) References Cited

U.S. PATENT DOCUMENTS

| | | | |
|---|---|---|---|
| 9,100,793 B2* | 8/2015 | Johnson | ............. G06F 17/3087 |
| 2006/0114881 A1 | 6/2006 | Chari et al. | |
| 2008/0159232 A1 | 7/2008 | Thalanany et al. | |
| 2009/0075653 A1 | 3/2009 | Yeom | |
| 2009/0077207 A1 | 3/2009 | Karaoguz et al. | |
| 2010/0309815 A1 | 12/2010 | Yepez et al. | |
| 2010/0317289 A1 | 12/2010 | Desai et al. | |
| 2012/0185583 A1 | 7/2012 | Wu et al. | |
| 2012/0249338 A1 | 10/2012 | Merino | |
| 2012/0269072 A1 | 10/2012 | Wu et al. | |
| 2012/0289158 A1* | 11/2012 | Palin | ..................... H04W 8/005 455/41.2 |
| 2012/0289160 A1* | 11/2012 | Palin | ..................... H04W 48/14 455/41.2 |
| 2012/0317198 A1 | 12/2012 | Patton et al. | |

(Continued)

FOREIGN PATENT DOCUMENTS

| | | | |
|---|---|---|---|
| CA | 2 506 121 A1 | 4/1997 | |
| EP | 2 355 563 A1 | 8/2011 | |

(Continued)

OTHER PUBLICATIONS

Partial European Search Report dated Feb. 19, 2015 in connection with European Patent Application No. 14180832.9; 8 pages.

(Continued)

*Primary Examiner* — Fayyaz Alam

(57) ABSTRACT

An electronic device includes a communication module that transmits and receives data based on wireless communication, and a control module configured to select at least one of other electronic devices which have been searched in relation to forming of a communication channel using the communication module based on predefined conditions, or determines a communication connection sequence of the plurality of other electronic devices. Other embodiments including a data transmission and reception method and a storage medium are also disclosed.

20 Claims, 29 Drawing Sheets

(56) References Cited

U.S. PATENT DOCUMENTS

| | | | |
|---|---|---|---|
| 2013/0059606 A1* | 3/2013 | Pujol | H04W 4/023 455/456.3 |
| 2013/0143542 A1 | 6/2013 | Kovvali et al. | |
| 2013/0197955 A1 | 8/2013 | Dillon | |
| 2014/0046955 A1* | 2/2014 | Dollard | G06Q 30/0251 707/748 |
| 2014/0073357 A1* | 3/2014 | Johnson | G06F 17/3087 455/456.3 |
| 2015/0195768 A1* | 7/2015 | Abraham | H04W 4/206 370/254 |

FOREIGN PATENT DOCUMENTS

| | | |
|---|---|---|
| EP | 2 424 321 A1 | 2/2012 |
| WO | WO 02/01807 A2 | 1/2002 |
| WO | WO 2008/024568 A2 | 2/2008 |

OTHER PUBLICATIONS

Extended European Search Report dated Jul. 6, 2015 in connection with European Patent Application No. 14180832.9; 14 pages.

* cited by examiner

| DATA TRANSMISSION PROCESSOR | ~71 |

| DATA RECEPTION PROCESSOR | ~72 |

FIG. 22

| No. | Service | Target ID | Distance |
|---|---|---|---|
| A | Emergency Notice | dsea8291 | 20m |
| B | Emergency Notice | sxtq0034 | 30m |
| C | Emergency Notice | fgca8799 | 25m |
| D | Emergency Notice | ewgt2433 | 15m |
| E | Emergency Notice | graw5322 | 150m |

FIG. 25

| No. | Service | Target ID | RSS |
|---|---|---|---|
| A | Proximity Chatting | dsea8291 | -80 |
| B | Local SNS | sxtq0034 | -85 |
| C | Proximity Chatting | fgca8799 | -80 |
| D | Proximity Chatting | ewgt2433 | -70 |
| E | Proximity Chatting | graw5322 | -100 |

※ RSS (Received Signal Strenth) : UNIT dBm

DATA COMMUNICATION METHOD AND APPARATUS BASED ON WIRELESS COMMUNICATION

CROSS-REFERENCE TO RELATED APPLICATION AND CLAIM OF PRIORITY

The present application is related to and claims the benefit under 35 U.S.C. §119(a) of a Korean patent application No. 10-2013-0097325 filed on Aug. 16, 2013 in the Korean Intellectual Property Office, the entire disclosure of which is hereby incorporated by reference.

TECHNICAL FIELD

The present disclosure relates to a communication method and apparatus, and more particularly to a communication method and apparatus between devices based on wireless communication.

BACKGROUND

Some of electronic devices have communication functions, and have been manufactured and sold with sizes small enough to be carried. Recently, with the aid of hardware and software supports, such electronic devices have been dramatically grown.

Portable electronic devices among electronic devices use a mobile communication network system using a base station so as to support a communication function as well as mobility. In order to use the mobile communication network system, it is required to design and install a base station, a base station controller, and a mobile switching center, which constitute the system.

SUMMARY

An electronic device in the related art can support a communication service based on a server on a network. If the electronic device is unable to be connected to the server on the network, the use of the communication service can be limited.

To cope with the increase of communication traffics, communication technology on a wireless network has been rapidly developed. Although the communication technology has been developed in the direction to improve the speed, quality, or capacity of the communication through the wireless network, there are limitations due to limited resources of the base station. Direct wireless communication technology, through which electronic devices (e.g., user devices, such as cellular phones and tablet computers) directly send and receive data with each other without using a base station, can be provided. According to the communication technology as described above, (e.g., communication technology between devices), overload of the base station can be decreased, the lack of frequency can be mitigated, and various application services and business models can be provided.

To address the above-discussed deficiencies, it is a primary object to provide a device includes a transceiver that transmits and receives data based on wireless communication, and a control module that selects at least one of a plurality of other electronic devices which are searched in relation to forming of a communication channel using the communication module based on predefined conditions, or determines a communication connection sequence of the plurality of other electronic devices.

In accordance with another aspect of the present disclosure, a method includes searching other electronic devices based on wireless communication; selecting at least one of the plurality of other electronic devices which are searched based on predefined conditions or determining a communication connection sequence of the plurality of other electronic devices; and performing communication connection with the selected other electronic devices or the specific other electronic devices according to the determined communication connection sequence and performing transmission and reception of data.

In accordance with still another aspect of the present disclosure, a storage medium that is readable by a machine that stores commands, which are set to make at least one processor perform at least one operation when the at least one processor executes the commands, wherein the at least one operation comprises at least one of a first data processing operation to select at least one of a plurality of other electronic devices which are searched using wireless communication based on predefined conditions, to determine a communication connection sequence of the plurality of other electronic devices, and to transmit data to the at least one of the plurality of other electronic devices based on at least one of the selection or the communication connection sequence; a second data processing operation to select a specific filter according to at least one of a time, a place, and the other electronic devices to be connected for communication to transmit the data and to select at least one piece of the data transmitted and received through the other electronic devices based on filter information written in the selected specific filter; and a third data processing operation to divide specific information into data pieces, to sequentially broadcast the data pieces to the selected other electronic devices, and to provide a specific event or content to the other electronic devices that sequentially respond to the sequential broadcast or respond to at least a part of the data pieces.

According to the communication method and apparatus according to the various embodiments, it is possible to support efficient data operations in data transmission and reception environments on the wireless network, for example, by performing at least one of the data transmission control operation based on the predefined filter, the data transmission control operation based on the predetermined conditions, and the data transmission control operation based on the relation between the devices.

Further, according to the communication method and apparatus according to the various embodiments, it is possible to support more adaptive data operations, for example, by performing at least one of the above-described operations to correspond to the data transmission environment.

Further, according to the communication method and apparatus according to the various embodiments, it is possible to improve the utility of the electronic device, for example, by effectively performing at least one of the above-described operations.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates in more detail the configuration of a relation-based data processing module according to various embodiments;

FIG. 22 illustrates the results of distance calculation according to various embodiments;

FIG. 25 is a diagram illustrating the results of received signal strength between an electronic device and other electronic devices according to various embodiments;

DETAILED DESCRIPTION

Figure 1:
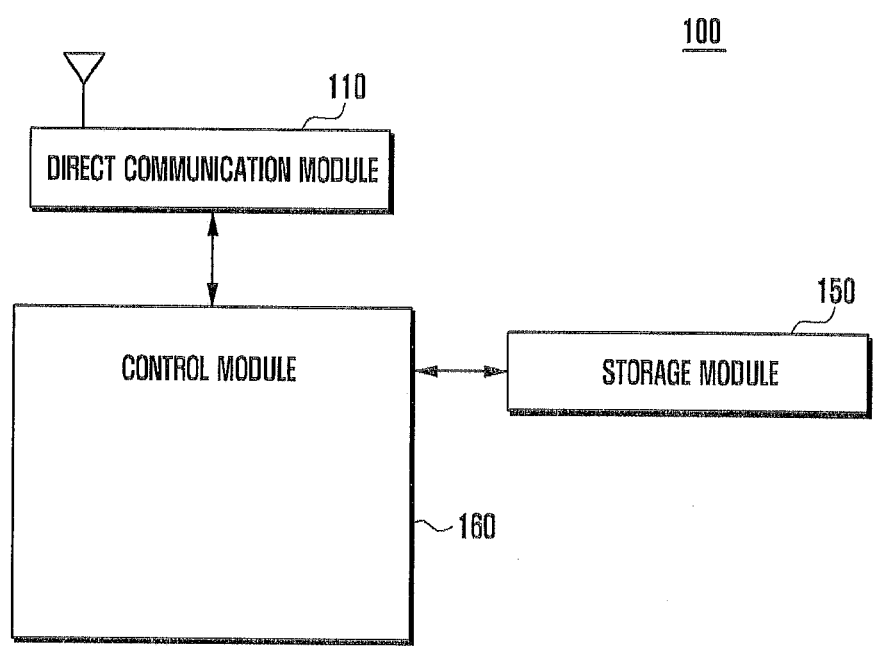
FIG. 1 schematically illustrates an electronic device according to various embodiments.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged telecommunication technologies. Hereinafter, preferred embodiments of the present disclosure will be described in detail with reference to the accompanying drawings. In the accompanying drawings, the same reference numerals are used for the same constituent elements. Further, detailed description of well-known functions and structures incorporated herein can be omitted to avoid obscuring the subject matter of the present disclosure. In the following description of the present disclosure, only portions that are necessary to understand the operations according to various embodiments of the present disclosure are described, and explanation of other portions will be omitted to avoid obscuring the subject matter of the present disclosure.

For the same reason, in the drawings, some constituent elements are exaggerated, omitted, or schematically illustrated. Further, the sizes of the respective constituent elements may not entirely reflect the actual sizes. Accordingly, the present disclosure is not limited to the relative sizes or gaps drawn in the accompanying drawings.

An electronic device according to the present disclosure can be a device that includes a communication function. In the electronic device, a communication module that provides the communication function can connect communication between the electronic device and other electronic devices. The communication module can support a predetermined communication protocol (e.g., Wireless Fidelity (Wi-Fi), Bluetooth (BT), or Near Field Communication (NFC)), or a predetermined network communication (e.g., Internet, Local Area Network (LAN), Wire Area Network (WAN), telecommunication network, cellular network, satellite network, or Plain Old Telephone Service (POTS)).

The communication module (e.g., a transceiver) can be a direct communication (or indirect wireless communication) module. In the Device-to-Device (D2D) communication technology that corresponds to the direct wireless communication, data can be directly transmitted or received between devices without passing through a network. The direct communication module enables the electronic devices directly send and receive the data without passing through a base station. The direct communication module can include at least one of a Long Term Evolution (LTE)-Direct communication module, a WiFi-Direction communication module, a Bluetooth (BT) communication module, a FlashLinQ communication module, an eye communication module of Engineer and Electronics and Telecommunications Research Institute (ETRI), a D2D communication module, a communication module that adopts a communication system defined in IEEE802.1aq, and a communication module that adopts a communication system defined in IEEE802.15PAC.

The electronic device according to the present disclosure can be a device that includes a communication function. For example, the electronic device can include at least one of a smart phone, a tablet PC, a mobile phone, a video phone, an e-book reader, a desktop PC, a laptop PC, a net-book computer, a Personal Digital Assistance (PDA), a Portable Multimedia Player (PMP), an MP3 player, a mobile medical device, a camera, a wearable device (e.g., a Head Mounted Device (HMD), such as e-glasses, e-clothing, e-necklace, e-appcessary, and a smart watch.

In some embodiment, the electronic device can be a smart home appliance having a communication function. The smart home appliance can include, for example, at least one of a television, a Digital Video Disk (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an e-dictionary, a camcorder, and an e-frame.

In some embodiments, the electronic device can include at least one of various kinds of medical devices (e.g., Magnetic Resonance Angiography (MRA), Magnetic Resonance Imaging (MRI), Computed Tomography (CT), a camera, and an ultrasound machine), an Event Data Recorder (EDR), a Flight Data Recorder (FDR), a vehicle infotainment device, e-equipment for ship (e.g., a navigation device for ship and gyro compass for ship), avionics, and a security device.

In some embodiments, the electronic device can include at least one of a part of furniture having a communication function or a building/structure, an electronic signature receiving device, a projector, and various kinds of measurement devices (e.g., water supply, electricity, gas, and radio waves).

The electronic device according to the present disclosure can be a combination of one or more of the above-described devices. Further, it is apparent to those skilled in the art that the electronic device according to the present disclosure is not limited to one of the above-described devices.

FIG. 1 schematically illustrates an electronic device according to various embodiments.

Referring to FIG. 1, an electronic device 100 can include a direct communication module 110, a control module 160, and a storage module 150. The electronic device 100 can form a communication channel with at least one of other electronic devices that can perform direct wireless communication. The electronic device 100 can receive or transmit data through the communication channel. The electronic device 100 can transmit or receive data on the basis of at least one of relation-based data processing, data processing according to predetermined conditions, and filter-based data processing. The relation-based data processing method can divide data to be transmitted into a predetermined number of pieces and transmits the whole data or a specific event to the other electronic device that receives the divided pieces. The data processing method according to predetermined conditions can form a communication channel with the other electronic device based on predefined elements, for example, a distance between the devices, signal reception strength, and the like, and transmits data based on the formed communication channel. In the following description, an explanation will be made of the assumption that states in which various elements satisfy the predefined standards correspond to optimum conditions. The filter-based data processing method can operate a filter in which predefined information is arranged to filter data.

The storage module 150 can store data (e.g., audio content, video content, or text content) that is operated in relation to various embodiments of the present disclosure. For example, the storage module 150 can store at least one of advertisement content, music content, movie content, broadcasting content, photo content, novel content, and game content. The data stored in the storage module 150 can be stored when the electronic device 100 is designed. In an embodiment, the data stored in the storage module 150 can be received from other electronic devices. According to various embodiments, the data stored in the storage module 150 can include content generated by the electronic device 100.

The storage module 150 can transmit the data stored therein to the direct communication module 110 in response to a request from the control module (or controller) 160. The data transmitted to the direct communication module 110 or specific information corresponding to the data can be transmitted in a broadcast, multicast, or unicast method. Further, the data can be transmitted to the other electronic device through the communication channel formed therein. The data that is received through the direct communication module 110 can be stored in the storage module 150 under the control of the control module 160.

The storage module 150 can store a software module that supports the relation-based data processing. The storage module 150 can store optimum condition parameters that support the optimum condition data processing and a software module that supports selection of the optimum condition. The storage module 150 can store at least one filter that supports the filter-based data processing and a filter selection software module. The storage module 150 can store a filter generation software module (not illustrated) that is designed to generate the specific filter using the optimum condition parameters. The storage module 150 can store schedule information that supports application of at least one filter to the relation-based data processing. The storage module 150 can store a software module that includes at least one of a command and a routine for selecting the other electronic device under the optimum condition in relation to the relation-based data processing operation.

The storage module 150 can be composed various types of memories. For example, the storage module 150 can include at least one of a volatile memory (e.g., a Dynamic RAM (DRAM), a Static RAM (SRAM), or a Synchronous Dynamic RAM (SDRAM)) and a nonvolatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory). According to various embodiments, the storage module 150 can be a Solid State Drive (SSD). Further, the storage module 150 can further include, for example, a Compact Flash (CF), a Secure Digital (SD), a micro Secure Digital (SD), a mini Secure Digital (SD), an Extreme Digital (xD), or a memory stick.

As described above, the electronic device 100 can perform at least one of the relation-based data processing, the data processing according predetermined conditions, and the filter-based data processing. The electronic device 100 can include at least one data processing module in relation to the above-described processing methods. For example, the electronic device 100 can allocate a first data processing module in relation to the filter-based data processing. The electronic device 100 can allocate a second data processing module in relation to the relation-based data processing. The electronic device 100 can allocate a third data processing module in relation to the data processing according to the predetermined conditions. Hereinafter, the first to third data processing modules as described above will be described to correspond to the filter-based data processing module, the relation-based data processing module, and the optimum condition data processing module.

Figure 2:
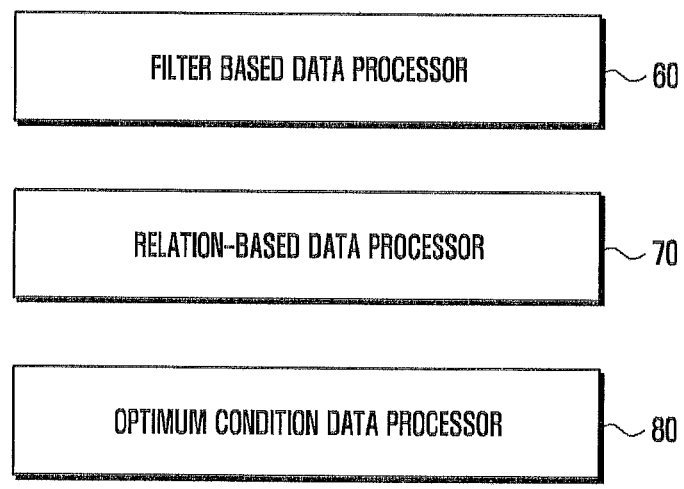
FIG. 2 illustrates a data processing module according to various embodiments.

FIG. 2 is a diagram illustrating a data processing module according to various embodiments.

Referring to FIG. 2, the electronic device 100 according to the present disclosure can include at least one of a filter-based data processing module 60, a relation-based data processing module 70, and an optimum condition data processing module 80. Here, the data processing modules 60, 70, and 80 can be configured to include at least one or a combination of two or more of a hardware module, a middleware module, a firmware module, and a software module.

In a case where the electronic device 100 operates the above-described data processing modules 60, 70, and 80, the storage module 150 can store commands or routines that support the above-described data processing modules 60, 70, and 80 in the form of a module. According to an embodiment, in a case where the electronic device 100 supports only data transmission and reception through the relation-based data processing, the control module 160 can include only the relation-based data processing module 70, and accordingly, the storage module 150 can store a software module that supports the relation-based data processing. According to an embodiment, in a case where the electronic device 100 supports only data transmission and reception through the filter-based data processing, the control module 160 can include only the filter-based data processing module 60. Accordingly, the storage module 150 can store filters that support the filter-based data processing and a filter selection unit. According to an embodiment, in a case where the electronic device 100 supports only data transmission and reception through the optimum condition data processing, the control module 160 can include only the optimum condition data processing module 80. Accordingly, the storage module 150 can store a software module that includes parameters that correspond to the optimum conditions and parameter-based device selection routines. The control module 160 as illustrated in FIG. 2 can be configured to include one processing module as described above.

According to various embodiments of the present disclosure, the control module 160 as described above with reference to FIG. 2 can be implemented to include a plurality of processing modules to correspond to the design method.

According to one embodiment, in a case where the electronic device 100 is designed to support the relation-based data processing and the optimum condition data processing, the control module 160 can include the relation-based data processing module 70 and the optimum condition data processing module 80. Accordingly, the storage module 150 can store optimum condition parameters that support the optimum condition data processing, a software module that supports the optimum condition selection, and a software module that includes relation-based processing routines that support the relation-based data processing. In a case where the electronic device 100 is designed to compositely perform the relation-based data processing and the optimum condition data processing, the storage module 150 can include a software module or schedule information that defines to apply the optimum condition parameters in the relation-based data processing.

According to various embodiments, in a case where the electronic device 100 is designed to support the relation-based data processing and the filter-based data processing, the control module 160 can include the relation-based data processing module 70 and the filter-based data processing module 60. Accordingly, the storage module 150 can store at least one filter that supports the filter-based data processing, a filter selection software module, and a software module that includes routines that support the relation-based data processing. Further, the storage module 150 can store a software module or schedule information that is set to differently apply the relation-based data processing routine to correspond to the selected filter. Further, the storage module 150 can store a software module or schedule information that includes routines providing different filters for the relation-based data processing methods.

According to various embodiments, in a case where the electronic device 100 is designed to support the filter-based data processing and the optimum condition data processing, the control module 160 can include the optimum condition data processing module 80 and the filter-based data processing module 60. Accordingly, the storage module 150 can store at least one filter that supports the filter-based data processing, a filter selection software module, and a software module that includes routines that support the optimum condition data processing. Further, the storage module 150 can store a software module or schedule information that includes routines defined to apply different optimum conditions for the selected filters. The storage module 150 can store a software module or schedule information that includes routines defined to apply different filters for the optimum conditions. Further, the storage module 150 can store a software module that generates filters based on the optimum conditions.

The electronic device 100 according to various embodiments of the present disclosure can be implemented to include three processing modules.

According to various embodiments, in a case where the electronic device 100 is designed to support the relation-based data processing, the optimum condition data processing, and the filter-based data processing, the control module 160 can include the relation-based data processing module 70, the optimum condition data processing module 80, and the filter-based data processing module 60. Accordingly, the storage module 150 can store a software module that supports the relation-based data processing, parameters that support the optimum condition data processing, at least one filter that supports the filter-based data processing, and a filter selection software module. Further, the storage module 150 can store a software module or schedule information that includes routines defined to apply the filters selected on the basis of the optimum conditions to a specific relation method. Further, the storage module 150 can store a software module or schedule information that is designed to apply the optimum conditions when a plurality of other electronic devices are searched in operating the selected filters in relation to the specific relation method. Further, the storage module 150 can include a software module or schedule information that is designed to apply the specific filters and the relation method to the other electronic devices selected according to the optimum conditions.

The respective processing modules of the control module 160 as described above can be implemented by independent processors or by one processor that allocates tasks or threads. The processors or tasks can support composite data transmission and reception method, such as integration of the relation basis and the optimum conditions or generation of the filters through applying of the optimum conditions. At this operation, the processors or tasks can compositely or sequentially perform the methods related to the predefined schedule information or program routines. According to an embodiment, the control module 160 can operate at least one filter using the optimum condition data processing module 80. The control module 160 can transmit or receive filter-based data through providing the generated filters to the filter-based data processing module 60. According to one embodiment, the control module 160 can operate the filter-based data processing module 60 and preferentially select filters that suit the current situation or the situation according to the preset schedule information. Further, the control module 160 can control the operation of the relation-based data processing module 70 using the at least one selected filter.

The schedule information, parameters, and software modules may not be stored in the storage module 150, but can be embedded in a specific hardware module or can be arranged in a memory device arranged in the specific hardware module. For example, according to various embodiments of the present disclosure, the specific processing module can be implemented to be included in the direct communication module 110. Further, at least a part of the specific processing module can be implemented by a separate hardware module and can be arranged between the direct communication module 110 and the control module 160. Hereinafter, the above-described structure will be described in more detail through the drawings.

Figure 3:
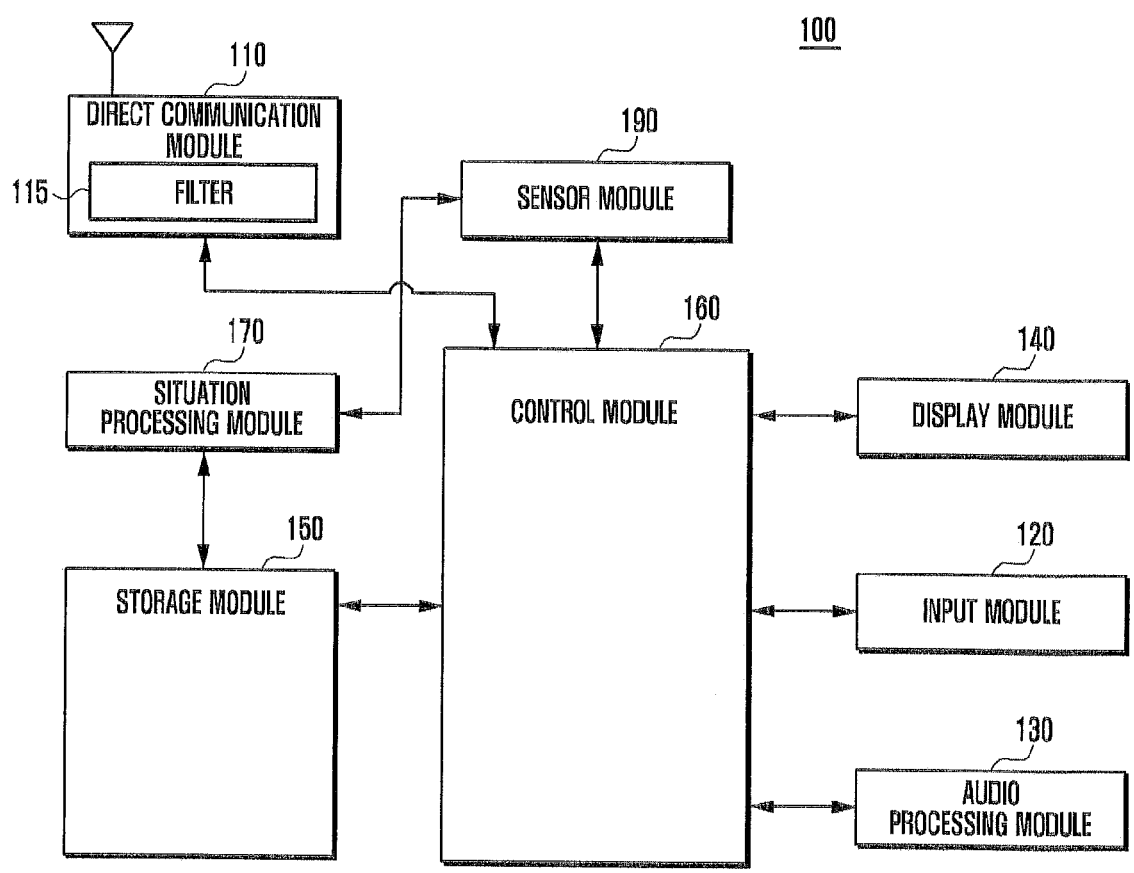
FIG. 3 schematically illustrates an electronic device according to various embodiments.

FIG. 3 schematically illustrates an electronic device according to various embodiments.

The electronic device 100 may not only performs direct connection through the filter-based data processing but also support the optimum condition data processing or the relation-based data processing.

Referring to FIG. 3, the electronic device 100 can include a direction communication module 110, a control module 160, a storage module 150, a situation processing module 170, an input module 120, an audio processing module 130, a display module 140, and a sensor module 190. The electronic device 100 can further include other communication modules, for example, a mobile communication module and a wired communication module, to correspond to the communication support type of the corresponding device.

The electronic device 100 having the above-described configuration can include the situation processing module 170. The situation processing module 170 can support the filter-based data processing and can be implemented by a separate hardware module. The direct communication module 110 can be implemented to include at least one filter 115. The direction communication module 110 can include a configuration of a storage medium that supports storage of the filter 115, and can include a processor that supports an operation of the filter 115 stored in the storage medium. The filter 115 can be included in the situation processing module 170 or can be arranged in the control module 160 to correspond to the design method.

The electronic device 100 can select the filter 115 that is to be applied to the direction communication module 110 based on collected situation information and can perform direct communication connection based on the selected filter 115. Here, the direct communication connection function can be a function that performs at least one of data transmission and reception functions with the other electronic device through the direct communication module 110 that can perform data transmission without using a network.

The input module 120 can process various input signals of the electronic device 100. The input module 120 can include various compatible input devices that are built in or connected to the electronic device 100. For example, the input module 120 can include physical type key button, side key, home key, and power key. Further, the input module 120 can include touch type key buttons, keypad, and touch screen. Further, the input module 120 can further include a configuration of a keyboard or a mouse that is connected through an external device connection interface provided in the electronic device 100. The input module 120 can generate an input signal for requesting activation or inactivation of a direct connection function based on the direct communication module 110. For example, in a case where the electronic device 100 provides a specific application (hereinafter referred to as "app") that is operated on the basis of the direct communication module 110, the input module 120 can generate an input signal for requesting selection and activation of the corresponding app in response to user's control. Here, the input signal can be generated in various types that correspond to the type of the input module 120. For example, the input signal can include a key input signal a touch gesture based on a touch, or a motion gesture based on a motion sensor.

The input module 120 can receive various input signals related to generation of the filter 115. The input module 120 can provide the received input signal to the control module 160. The input module 120 can generate (or process) an input signal for selecting the specific filter 115, an input signal for removing the selected filter 115, or an input signal related to correction of information of the filter 115. In a case where the electronic device 100 compositely provides the relation-based data processing function, the optimum condition data processing function, or the filter-based data processing function, the input module 120 can generate a signal for selecting at least one of the above-described functions in response to the user's control.

The display module 140 can output a screen related to the operation of the electronic device 100. For example, the display module 140 can provide a screen for preparing the filter 115, a screen for selecting the filter 115, a screen for displaying information of the filter 115 that is currently applied, a screen for a list of the whole filters 115, and a screen for explaining the characteristics of the filters 115. According to various embodiments, in relation to the relation-based data processing function of the electronic device 100, the display module 140 can display at least one of a screen for displaying received data pieces, a screen for displaying the whole data generated by a combination of the data pieces, information on the other electronic device that provides the corresponding data pieces, and data file information provided by the electronic device. According to various embodiments, when the electronic device 100 supports the optimum condition data processing function, the display module 140 can provide information on the optimum condition parameters and a screen for supporting the change of the optimum conditions. A user can differently define a weight value of the parameter that corresponds to the specific condition through the optimum condition change screen.

The display module 140 can output information that guides which data processing method is currently being applied during performing of the direct connection function as at least one of an image and text. In this case, the output image or text can be provided as a popup window that is temporarily or repeatedly output or can be displayed on a status bar region as a specific icon or indicator. The display module 140 can output at least one of an image or text that indicates the relation-based data processing, an image or text that indicates the filter-based data processing, and an image or text that indicates the optimum condition data processing. Here, the images or texts can be differently displayed in relation to the respective processing methods.

According to various embodiments, the display module 140 can include a display panel, a touch panel, or a touch sheet. For example, the display module 140 can operate as an input module. The touch panel or the touch sheet can adopt at least one of various touch methods that can sense a finger touch and an electronic pen or general pen touch. For example, the touch panel or the touch sheet can adopt an electromagnetic induction method, a capacitive method, or a resistive method.

The audio processing module 130 can process audio information of the electronic device 100. The audio processing module 130 can output the audio information stored in the electronic device 100 or audio information received from an outside. The audio processing module 130 can collect specific audio information in relation to a call function or a record function of the electronic device 100. The audio processing module 130 can output a notification sound or an effect sound for notification of activation of the direct connection function based on the direct communication module 110. Further, the audio processing module 130 can output various kinds of notification sound or effect sound according to the data transmission and reception situations. The output of the above-described notification sound or effect sound can be omitted to correspond to a user's setting adjustment or design intention.

The storage module 150 can store various pieces of information and programs related to the operation of the electronic device 100. For example, the storage module 150 can be the same storage module as the storage module 150 illustrated in FIG. 1. For example, the storage module 150 can include information related to the relation-based data processing, a software module, information according to the optimum condition data processing, and a software module supporting selection of the optimum conditions. The storage module 150 can store information and programs according to the filter-based data processing.

The storage module 150 can store at least one direct connection application (app) that supports the direct connection function. The direct connection app can be an app that requests activation of the direct communication module 110. For example, the direct connection app can be a game app that is performed through a communication channel formed based on the direct communication module 110. The direct connection app can be a data sharing app, a data broadcasting app, or a data search app. Further, the direct connection app can be an app for searching other electronic devices or a specific file.

If a request for activation of the direct connection app among apps stored in the storage module 150 is generated, the control module 160 can control the operation of the situation processing module 170 and the direct communication module 110. In this case, the control module 160 can select at least one filter 115 to be applied to the direct communication module 110 in relation to the operation of the situation processing module 170. Further, the control module 160 can control the processing of data that is received through the direct communication module 110 based on the selected filter 115 or can process data transmission based on the selected filter 115. In a case where at least one filter 115 is arranged in the direct communication module 110 or the situation processing module 170, the control module 160 can process only the data that is filtered by the corresponding filter 115.

For example, in a case where the at least one filter 115 is arranged in the direct communication module 110 to be used to process the received data, the control module 160 can maintain the current function operation state or a sleep state of the electronic device 100. Further, if data that corresponds to the filter 115 is received, the control module 160 can perform the processing according to the reception of the corresponding data, for example, can output data reception notification to the display module 140 or can store the received data in the storage module 150. At this operation, the electronic device 100 can collect situation information on the electronic device 100 and can process the direct connection function without changing the function operation state, such as awakening the control module 160 from the sleep state, until the data that corresponds to the filter 115 is received. If the data that corresponds to the filter is received in a specific function operation state, the control module 160 can process the received data through performing of background processing. For example, if the filtered data is received in a moving image reproduction state, the control module 160 can process the filtered data through background processing while maintaining the moving image reproduction state.

The control module 160 can apply at least one filter 115 to the direct communication module 110 in relation to the situation information that is collected by the situation processing module 170. According to one embodiment, the situation processing module 170 can apply a specific filter 115 to the direct communication module 110 in relation to the collected situation information. Further, the direct communication module 110 can select the specific filter 115 in relation to the situation information collected by the situation processing module 170.

The situation information that is collected by the situation processing module 170 can include at least one of environment information of the electronic device 100, preference information, and schedule information. The electronic device 100 can apply the specific filter 115 to the data transmission and reception based on the collected situation information. In this case, the electronic device 100 can generate the filters 115 to correspond to the specific information that is provided by the situation processing module 170 or can apply any one of the generated filters 115 to the operation of the direct communication module 110.

The environment information can include at least one of current time information, position or movement information of the electronic device 100, and information on other electronic devices that can form a communication channel with the electronic device 100. The situation processing module 170 can generate preference information based on a history of user's use of the electronic device. The preference information can include at least one of app kind information having a history in which the corresponding app is activated at least once or over a predetermined number of times, data information that is transmitted or received through the app, app activation time information, connection information with other electronic devices through the app, and data kind information that is transmitted or received with the other electronic devices through the app. The schedule information can be automatically generated from the contents included in a message or an e-mail that is prepared, transmitted or received by a user. As an example, the situation information can include not only the above-described environment information, the preference information, and the schedule information, but also alarm information, type information of a specific app of which the activation is requested by a user, and various pieces of information generated during the operation of the specific app, for example, information on an app operation time and app operation place.

According to one embodiment, the electronic device 100 can include various sensor modules 190, and can collect situation information using the sensor modules. For example, the electronic device 100 can include a position information collection module (or collector) connected to at least one of the situation processing module 170 and the control module 160, an acceleration sensor, a gyro sensor, a geomagnetic sensor, an altitude sensor, a pressure sensor, a temperature sensor, or a humidity sensor. Further, the sensor module 190 can include, for example, at least one of an air pressure sensor, a magnetic sensor, a grip sensor, a proximity sensor, an RGB sensor, a biometric sensor, an illumination sensor, and an Ultra Violet (UV) sensor. The sensor module 190 can measure a physical quantity or sense the operation state of the electronic device 100, and can convert the measured or sensed information into an electrical signal. According to an embodiment, the sensor module 190 can include an e-nose sensor, an Electromyography (EMG) sensor, an Electroencephalogram (EEG) sensor, an Electrocardiogram (ECG) sensor, or a finger print sensor. The sensor module 190 can further include a control circuit that controls at least one sensor belonging thereto.

Figure 4:
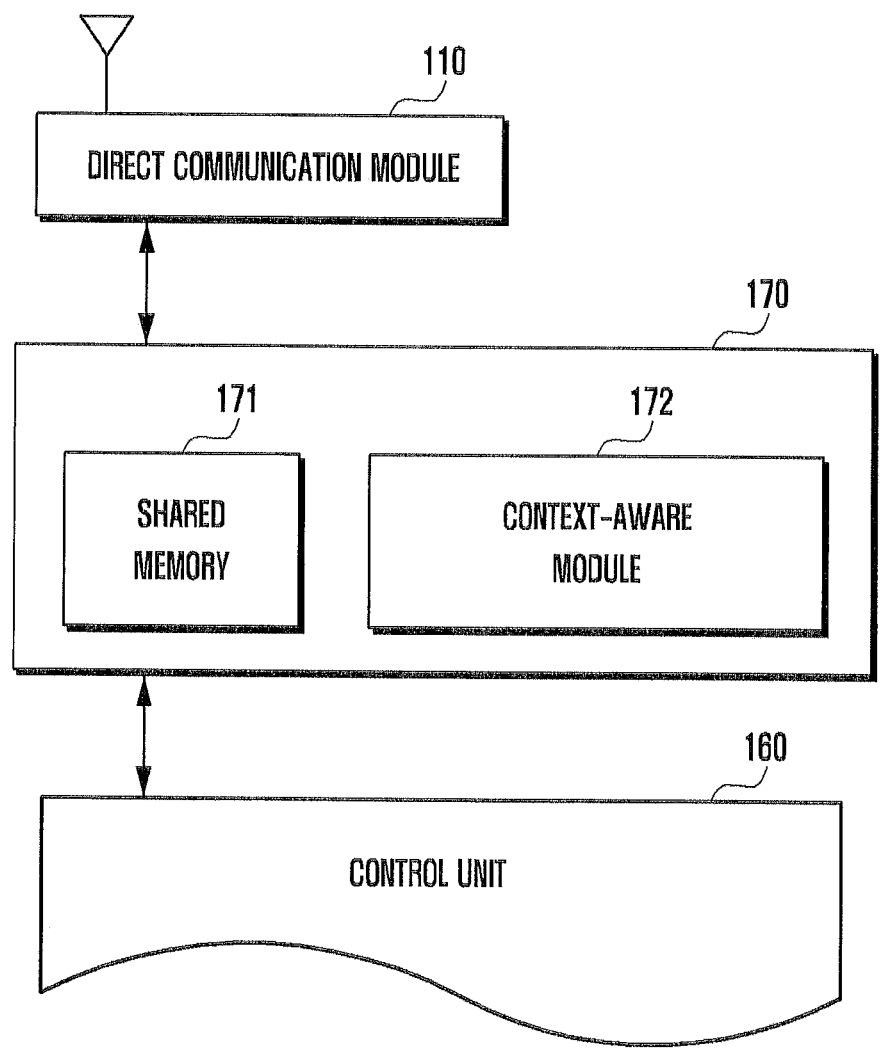
FIG. 4 schematically illustrates the configuration of a situation processing module according to various embodiments.

FIG. 4 is a diagram schematically illustrating the configuration of a situation processing module 170 according to various embodiments. Referring to FIG. 4, the situation processing module 170 according to the present disclosure can include a shared memory 171 and a context-aware module 172. The situation processing module 170 can be implemented to include the direct communication module 110 or the control module 160.

The shared memory 171 can temporarily store data that is received by the direct communication module 110. Further, the shared memory 171 can temporarily store data to be transmitted through the direct communication module 110. The shared memory 171 can support data read or write of the direct communication module 110, and can support data read and write of the control module 160. The situation processing module 170 can perform scheduling so that a sharing violation does not occur in relation to the data read or write operation using the shared memory 171. The shared memory 171 can store file information that is broadcast by the other electronic device, file information to be transmitted to the other electronic device, and at least one filter. The shared memory 171 can temporarily store the situation information that is collected by the context-aware module 172. The temporarily stored situation information can be used as reference information for selecting a specific filter to be applied to the direct communication module 110. Here, in a case where the control module 160 processes selection of the filter 115, the control module 160 can confirm the situation information stored in the shared memory 171, select the corresponding filter 115, and apply the selected filter to the direct communication module 110. According to an embodiment, in a case where the situation processing module 170 is designed to perform the selection processing of the filter 115, the situation information stored in the shared memory 171 can be used as reference information for the context-aware module 172 to select the filter 115.

The context-aware module 172 can collect the situation information of the electronic device 100. The context-aware module 172 can apply the specific filter 115 to the direct communication module 110 based on the collected situation information. According to various embodiments, in a case where the filter 115 is arranged in the direct communication module 110, the context-aware module 172 can select the specific filter 115 in the direct communication module 110 based on the situation information.

The context-aware module 172 can have an authority to apply the specific filter 115 to the direct communication module 110 in relation to the situation information. In a case where at least one filter 115 is stored in the direct communication module 110, the context-aware module 172 can control the direct communication module 110 to select the specific filter 115 according to the situation information without being controlled by the control module 160. Through this, in a case where the control module 160 is in a sleep state or in a specific app operation state, the context-aware module 172 can support the situation processing module 170 so that the situation processing module 170 can control the direct communication module 110 without breaking or interfering with the corresponding state or without affecting the corresponding state.

For example, a user can desire to receive specific data. At this operation, the reception of the corresponding data can correspond to an event that satisfies user needs rather than causing inconvenience such as interference. In contrast, if an interrupt occurs during the operation of the electronic device in a case where the specific data stored in the storage module 150 is transmitted to the other electronic device, the user can recognize the occurrence of the corresponding interrupt as inconvenience. The electronic device 100 according to the present disclosure can operate not to change the specific operation state or the sleep state of the control module 160. For example, the electronic device 100 can support direct access of the situation processing module 170 to the storage module 150 of the context-aware module 172, and can support data read and write operations according to the direct access. In a case of the direct access to the storage module 150, the control module 160 does not perform control operation, and thus even during the data processing operation, the control module 160 can maintain the previous function operation state or sleep state. Here, the data read and write operation can include at least one of an operation of reading the filter stored in the storage module 150, a read operation in an operation of transmitting specific data, and an operation of writing the data received by the direct communication module 110 in the storage module 150.

Figure 5:
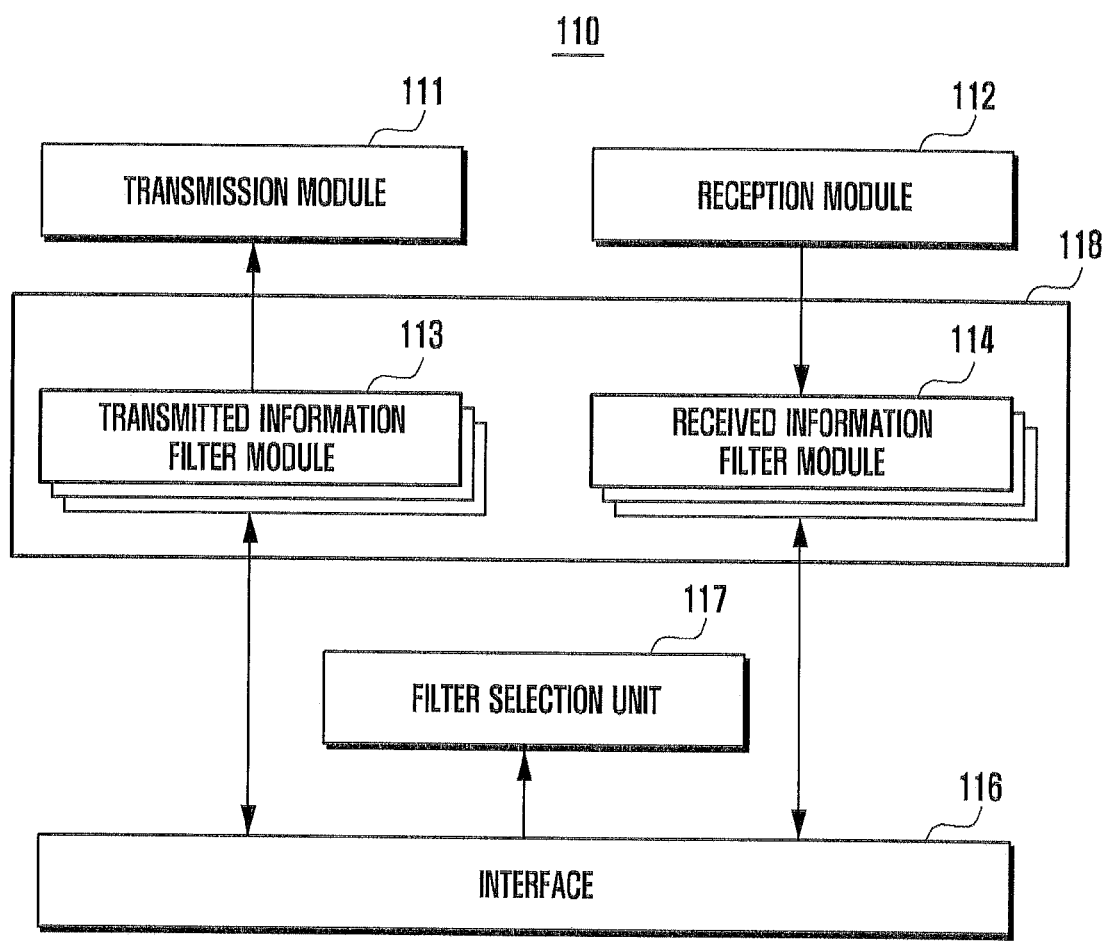
FIG. 5 schematically illustrates the configuration of a direct communication module according to various embodiments.

FIG. 5 schematically illustrates the configuration of a direct communication module according to various embodiments.

Referring to FIG. 5, the direct communication module 110 can include a transmission module 111, a reception module 112, a filter module 118, an interface 116, and a filter selection unit 117. According to an embodiment, the filter module 118 can include at least one of a transmitted information filter module 113 and a received information filter module 114. According to an embodiment, the direct communication module 110 can be configured to include only the transmission module 111 and the reception module 112. According to an embodiment, the transmitted information filter module 113, the received information filter module 114, the interface 116, and the filter selection unit 117 can be configured to be included in the situation processing module 170. Further, the transmitted information filter module 113, the received information filter module 114, the interface 116, and the filter selection unit 117 can be configured to be included in the control module 160. In the following explanation, it is exemplified that the direct communication module 110 includes all the configurations as described above.

The transmission module 111 can output information related to a search for specific content desired by a user or information to request providing of the specific content. The transmission module 111 can output search information to search for the other electronic device having specific data, for example, music content, movie content, text content, a coupon, or other information. The transmission module 111 can output only the specific transmitted information through the transmitted information filter module 113. For example, in a case where a filter to request a specific music file is arranged in the transmitted information filter module 113, the transmission module 111 can output information to search for the other electronic device having the specific music file in a broadcasting or multicasting method. In a case where a filter to request a specific coupon is arranged in the transmitted information filter module 113, the transmission module 111 can transmit search information of the other electronic device that provides the specific coupon in a broadcasting method.

The reception module 112 can receive requested content related to the filter from the other electronic device through the transmission module 111. The content received by the reception module 112 can be stored in the storage module 150. For example, if there are a plurality of other electronic devices having the requested content, the reception module 112 can select the specific other electronic device according to a predefined optimum condition and can receive the content from the selected other electronic device. According to an embodiment, the reception module 112 can select at least one other electronic device having a degree of preference of the data transmission environment that is equal to or higher than a predetermined level or the most preferable other electronic device. Further, the reception module 112 can preferentially select the other electronic device having a history in which the other electronic device previously transmits and receives the content. The optimum condition can be predefined or can be designated by the user. Further, the optimum condition can be provided by the optimum condition data processing module 80.

The reception module 112 can receive data for requesting specific data from the other electronic device. If specific content is stored in the storage module 150 in a state where a request for the corresponding content is received from the other electronic device, the reception module 112 can automatically transmit the corresponding content to the other electronic device. In this case, the transmission of the content by the reception module 112 in relation to the design method can be performed under the control of the situation processing module 170 or the direct control of the direct communication module 110 without intervention of the control module 160.

The transmitted information filter module 113 can include at least one filter that is selected in relation to the operation of the transmission module 111. The transmitted information filter module 113 can include information, such as the kind of data to be transmitted through the direct communication module 110, data name, or data type. For example, the transmitted information filter module 113 can include at least one of a weather information request filter, a traffic information request filter, a vacant parking slot information request filter, a battery charger position information request filter, a restaurant position information request filter, a game participation request filter, and a specific content request filter. In a case of including a plurality of filters, the transmitted information filter module 113 can include a switch that can select a specific filter. The information arranged in the transmitted information filter module 113 can be arranged or written by a user using the input module 120. At this operation, the transmitted information filter module 113 can request the control module 160 to output an input window that supports an input of the specific file name when the music file request filter or the movie file request filter is applied. As an example, the specific file name can be automatically input based on a search information history that is recently searched by the user.

The received information filter module 114 can include at least one filter that is selected in relation to the operation of the reception module 112. The received information filter module 114 can include information, such as the kind of data that can be provided to the other electronic device through the direct communication module 110 or a specific data name. The received information filter module 114 can include a filter to be applied to correspond to the kind of an app when the corresponding app is activated on the basis of the direct communication module 110. For example, the received information filter module 114 can include at least one a music file providing filter to be applied when a music app is executed and a movie file providing filter to be applied when a moving image app is executed. Filter information that is arranged in the music file providing filter or the movie file providing filter can be extracted from the corresponding file information to be predefined. Further, the filter information arranged in the filter can be written or corrected by the user. In a case of including a plurality of filters, the received information filter module 114 can include a switch that can select a specific filter.

The filter selection unit 117 can select at least one filter that is included in the transmitted information filter module 113 to correspond to a predetermined condition. For example, the filter selection unit 117 can preferentially select a filter that supports the specific app among the plurality of filters included in the transmitted information filter module 113 when the corresponding app is operated on the basis of the direct communication module 110. The filter selection unit 117 can select a specific music file request filter when a music reproduction player is activated, or can select a specific moving image reproduction player is activated.

The filter selection unit 117 can select a time-related filter, a place-related filter, or a device-related filter to correspond to the time, place, or device characteristics. For example, if a specific time elapses, the filter selection unit 117 can confirm position information of the electronic device 100, and if the current position is a position that is related to the specific filter, the filter selection unit 117 can select the place-related filter. If the specific time elapses in a state where the electronic device 100 is positioned at a specific place, the filter selection unit 117 can select a device matching filter. The time-related filter, the place-related filter, and the device matching filter, which are selected by the filter selection unit 117, can be arranged in at least one of the received information filter module 114 and the transmitted information filter module 113 in relation to the corresponding filter characteristics.

The time-related filter can be a filter that supports the processing of the data to be received or transmitted at a predetermined time. For example, the time-related filter can include a filter that is related to transmission or reception of music information that is selected at 7:00 AM, a food information transmission/reception filter that is selected at 12:00 AM, a cultural life information reception filter that is selected at 19:00 PM, or a specific public transport information reception filter. The time-related filter can include a movie content transmission/reception filter that is selected at 2:00 PM and an advertisement information transmission/reception filter that is selected at 18:00 PM.

The place-related filter can include a filter that is predefined or prepared by the user and can be selected at a specific place. The place-related filter can include various filters corresponding to places, such as a home broadcasting information reception filter, an internal company-broadcasting transmission or reception filter, a coupon information transmission or reception filter, a regional guidance information transmission/reception filter, a restaurant information transmission/reception filter, a movie information transmission/reception filter, and a parking-related information reception filter.

According to one embodiment, the place-related filter can include a security filter that differently defines a content list that can be provided to the other electronic device to correspond to the accessibility with the other electronic device. The accessibility with the other electronic device can be determined through the strength of a transmitted or received signal between the direct communication module 110 and the other electronic device, and transmission and reception of position information of respective devices. In relation to the selection of a specific filter at a specific place, the electronic device 100 can include a position information collection module (not illustrated) that support position information collection. The position information collection module (e.g., a global positioning system) can be connected to the control module 160 to provide position information, or can be connected to the situation processing module 170 to provide the collected position information to the situation processing module 170.

The device matching filter can include the other electronic device search transmission and reception filter registered in a phone book, the other electronic device search transmission and reception filter registered in a messenger program, and the other electronic device search transmission or reception filter having a message transmission and reception history. The device matching filter can include a transmission filter to search for the other electronic device having a specific name that is input by the user or predefined and a reception filter to receive the electronic device search of the specific name. The device matching filter can operate in association with the place-related filter or the time-related filter. For example, the device matching filter can be used as a filter related to the specific device search on at least one situation of the specific time and the specific place.

The electronic device 100 can provide a filter preparation screen related to filter preparation or generation. The filter preparation screen can include an input column for writing thereon at least one of filter application time information, filter application place information, filter application other electronic device information and filter characteristic definition information. The user can generate the filter through input of at least one of a transmission or reception method related to sharing of specific data, a place, and a time. According to an embodiment, the data sharing can include music sharing, movie sharing, coupon sharing, alarm or notification sharing, and traffic information sharing. As an example, the generated filter can be stored in the storage module 150 or can be loaded on the direct communication module 110. The filter stored in the storage module 150 can be selected in relation to the collected information to be provided to the direct communication module 110.

The interface 116 can transmit a signal between the direct communication module 110 and the situation processing module 170. Further, according to an embodiment, the interface 116 can transmit the signal between the direct communication module 110 and the control module 160. The interface 116 can transmit a signal that is related to filter replacement or filter correction of the transmitted information filter module 113 and the received information filter module 114. The interface 116 can transmit the data transmitted by the control module 160 to the transmitted information filter module 113. The interface 116 can transmit the data, which is received by the reception module 112 and is filtered by the received information filter 112, to the control module 160.

According to various embodiments, the electronic device 100 can include transmission and reception modules 111 and 112 to transmit or receive data using a communication channel formed on the basis of wireless communication and at least one filter 115 having filter information that is related to selection of at least one of data that is transmitted through the communication channel formed by the transmission module 111 and data that is received through the communication channel formed by the reception module 112.

According to various embodiments, the filter 115 can be applied to at least one of the received information filter module 114 that selects the data to be received through the reception module 112 and the transmitted information filter module 113 that selects the data that can be transmitted through the transmission module 111.

According to various embodiments, the electronic device 100 can further include the filter selection unit 117 that selects the filter information to select at least one piece of data of the transmitted information filter module 113 and the received information filter module 114 according to at least one of the time, the place, and the other electronic device information connected through the direct wireless communication.

According to various embodiments, the electronic device 100 can further include a control module that is configured to control at least one of the transmission module 111, the reception module 112, and the filter information selection unit 117.

According to various embodiments, the control module 160 can change the operation state of the control module 160 in a case where the data that is filtered by the filter arranged in the transmitted information filter module 113 is received through the reception module 112. Further, the control module 160 can maintain the previous operation state of the control module 160 in a case where the data that is filtered by the filter arranged in the received information filter module 114 is received through the reception module 112 or the content that corresponds to the received data is transmitted through the transmission module 111.

According to various embodiments, the control module 160 can set the devices that transmit the data filtered by the filter 115 as candidates to connect the wireless communication.

According to various embodiments, the electronic device 100 can further include a display module 140 that displays at least one piece of data received by the received information filter module 114.

According to various embodiments, the electronic device 100 can further include the sensor module 190 including at least one sensor that senses a specific sensor signal corresponding to the situation information of the electronic device 100 and a situation processing module 170 that confirms the satiation information based on the signal generated by the sensor module 190 and operates to apply the at least one filter 115 to the transmitted information filter module 113 or the received information filter module 114.

According to various embodiments, the filter 115 can have at least one grade that corresponds to the permission degree of access by another device.

According to various embodiments, the electronic device 100 can further include the control module 160 that controls the device, and the control module 160 can include at least one of the first data processing module 60 that controls the filter application, the second data processing module 70 that selects at least one electronic device according to the determined condition or determines the communication connection sequence of the other electronic devices in a case where at least one of the other electronic devices is searched, and the third data processing module 80 that broadcasts at least one piece of filter information and operates to provide an event or content to the other electronic device that responds to at least a part of the pieces of filter information.

In various embodiments, there is provided a storage medium that is readable by a machine that stores commands, which are set to make at least one processor perform at least one operation when the at least one processor executes the commands, wherein the at least one operation includes at least one of a first data processing operation to select at least one of a plurality of other electronic devices which are searched using wireless communication based on predefined conditions, to determine a communication connection sequence of the plurality of other electronic devices, and to transmit data to the at least one of the plurality of other electronic devices based on at least one of the selection or the communication connection sequence; a second data processing operation to select a specific filter according to at least one of a time, a place, and an electronic device to be connected for communication to transmit the data and to select at least one piece of the data transmitted and received through the at least one of other electronic devices based on filter information written in the selected specific filter; and a third data processing operation to divide specific information into data pieces, to sequentially broadcast the data pieces to the selected one of other electronic devices, and to provide a specific event or content to the at least one of other electronic devices that sequentially responds to the sequential broadcast or responds to at least a part of the data pieces.

Figure 6:
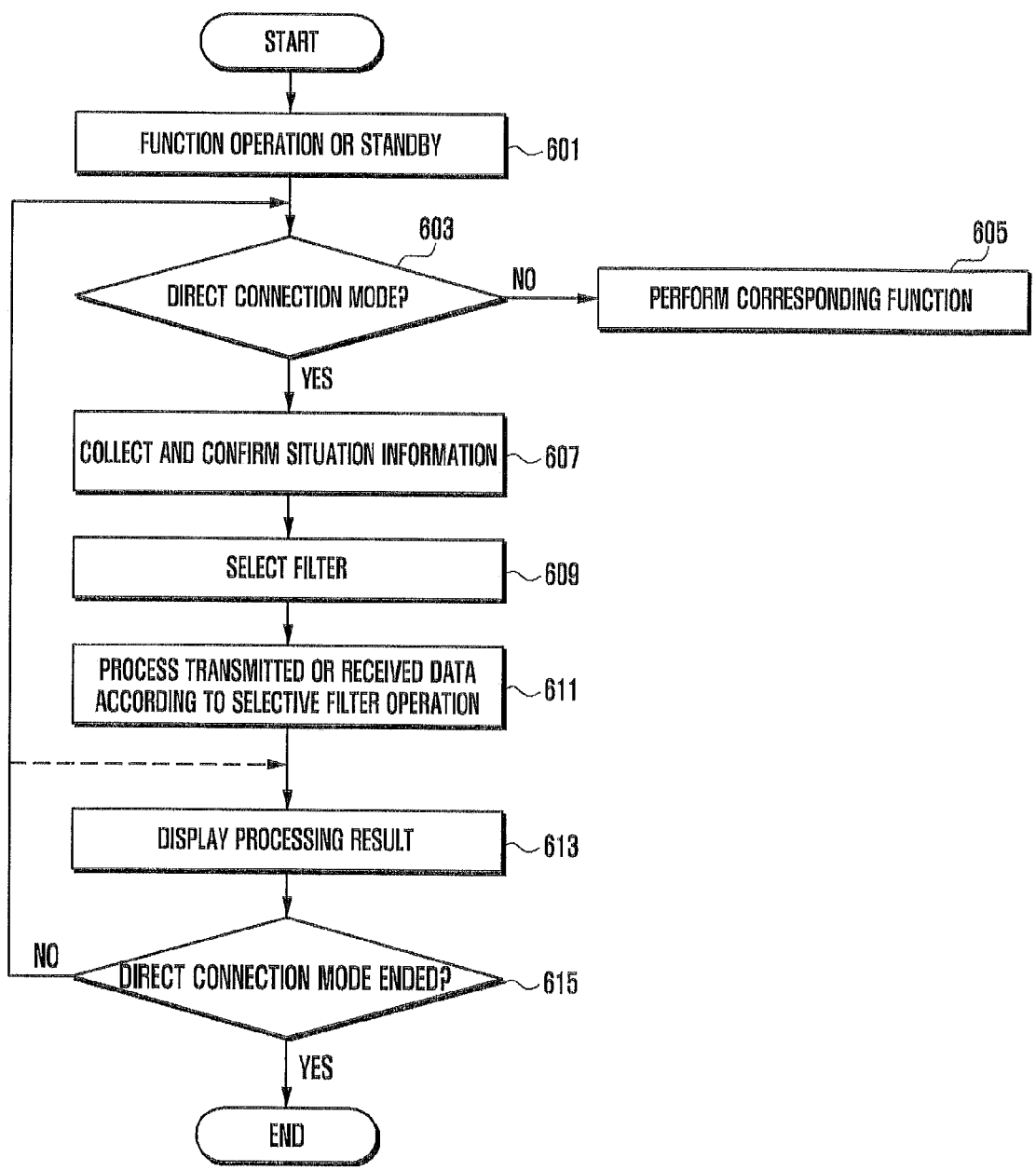
FIG. 6 is a flowchart illustrating a filter-based data processing operation according to various embodiments.

FIG. 6 is a flowchart illustrating a filter-based data processing method according to various embodiments.

According to various embodiments, at operation 601, the control module 160 can operate a specific function according to the preset schedule information or a specific function according to a user's request. Further, at operation 601, the control module 160 can perform function standby. According to an embodiment, the control module 160 can output a standby screen or activate the specific function according to the request, and can operate to output the screen of the activated function to the display module 140. According to an embodiment, the control module 160 can maintain a sleep state where the display module is in a turn-off state.

At operation 603, for example, the control module 160 can confirm whether an input event that is related to direct connection mode activation occurs. At this operation, if the event that is related to the direct connection mode setting does not occur, the control module 160 can be branched to operation 605. At operation 605, for example, the control module 160 can control the preset function or specific function performance. According to an embodiment, the control module 160 can maintain the function activation that is performed at operation 601. The input event that is related to the direct connection mode activation can include an event that is related to specific app selection and activation that are operated on the basis of the direct communication module 110. For example, the electronic device 100 can provide a screen for selecting an app based on the direct communication module 110 through the display module 140. According to an embodiment, the electronic device 100 can output an icon or a menu item that corresponds to each app to the display module 140. If a touch event that is related to the app selection occurs, the control module 160 can recognize the corresponding touch event as an event that is related to the direct connection mode activation.

At operation 603, for example, if a preset specific filter operation is requested, the control module 160 can recognize this as the event that is related to the direct connection mode activation. As described above, the electronic device 100 can operate the time-related filter or the place-related filter. At this operation, if the situation that corresponds to the set time or place occurs, the control module 160 can perform the direction connection function according to the corresponding filter application. According to various embodiments, the control module 160 can automatically activate a direct connection mode. If the direct connection mode is automatically activated, the operation 603 can be omitted.

At operation 607, for example, if an event that is related to the direct connection mode activation occurs, the control module 160 can confirm the situation information. According to an embodiment, the situation processing module 170 can collect the situation information of the electronic device 100 by using at least one sensor to correspond to the direct connection mode activation or confirming the pre-stored schedule information or current time. If the direct connection mode is automatically activated, at operation 607, the control module 160 can perform the situation information confirmation operation in real time or in a predetermined period.

At operation 609, for example, the control module 160 can select the filter according to the situation information. According to an embodiment, the control module 160 can select at least one of the transmitted information filter or the received information filter in relation to the kind information of a specific app to request the direct connection mode activation. Further, the situation processing module 170 can select the filter according to the situation information. Further, the direct communication module 110 can select the filter according to the situation information. According to various embodiments, the direct communication module 110 can receive the situation information from the situation processing module 170. A software module to perform specific filter selection according to the situation information can be mounted in the direct communication module 110.

At operation 611, for example, the control module 160 can process the transmitted or received data through operation of the selected filter. According to an embodiment, the control module 160 can select a traffic information transmission filter at operation 609, and can receive traffic information from the other electronic devices arranged in the neighborhood at operation 611. At operation 613, for example, the control module can operate to output the result of the data processing to the display module 140. According to an embodiment, the control module 160 can operate to output the traffic information to the display module 140.

According to an embodiment, if a short-distance game personnel enrollment filter is selected at the filter selection operation as described above at operation 609, the control module 160, at operation 611, can broadcast personnel enrollment to perform a specific game together. Further, if a response for the game participation is received from the other electronic device, the control module 160 can form a communication channel with the other corresponding electronic device, perform control in relation to the gate performance, and process the corresponding screen output at operation 613.

At operation 615, for example, the control module 160 can confirm the input event occurrence in relation to a mode end. If the input event related to the mode end does not occur, the control module 160 can be branched to operation 603. Further, the control module 160 can operate to maintain the operation 613. The input event related to the mode end can include a specific game end request or an app end request based on the direct communication module 110.

According to various embodiments, a data transmission and reception method using wireless communication can include selecting a transmission filter that filters data to be transmitted based on the wireless communication, selecting a reception filter that filters the data to be received based on the wireless communication, transmitting the data that is filtered through the transmission filter, and receiving the data that is filtered through the reception filter.

According to various embodiments, the selection operation can further include selecting filter information for selecting at least one piece of data of the transmission filter and the reception filter according to at least one of the time, place, and the other electronic device information connected through direct wireless communication.

According to various embodiments, the method can further include changing the operation state of the control module 160 in a case where the filtered data is received in the transmission filter.

According to various embodiments, the method can further include maintaining the previous operation state of the control module 160 in a case where the filtered data is received in the reception filter or content that corresponds to the received data is transmitted.

According to various embodiments, the method can further include collecting a specific sensor signal that is generated according to the situation, collecting the situation information based on the received sensor signal, and selecting a specific filter according to the collected situation information.

According to various embodiments, the method can further include setting the filter information with a grade that is unsearchable by the other electronic device, setting the filter information with a grade that corresponds to predetermined security to receive the filter information, and setting the filter information with a grade that corresponds to automatic transmission of the filter information.

According to various embodiments, the method can further include setting the devices that transmit the data filtered by the filter as candidates to connect the wireless communication.

According to various embodiments, the method can further include displaying at least one piece of data filtered by the reception filter.

According to various embodiments, the method can further include dividing the filter information into data pieces, sequentially broadcasting the data pieces to the other electronic devices, and providing specific event or content to the other electronic devices that respond thereto or respond to the partial data pieces being broadcast.

Figure 7:
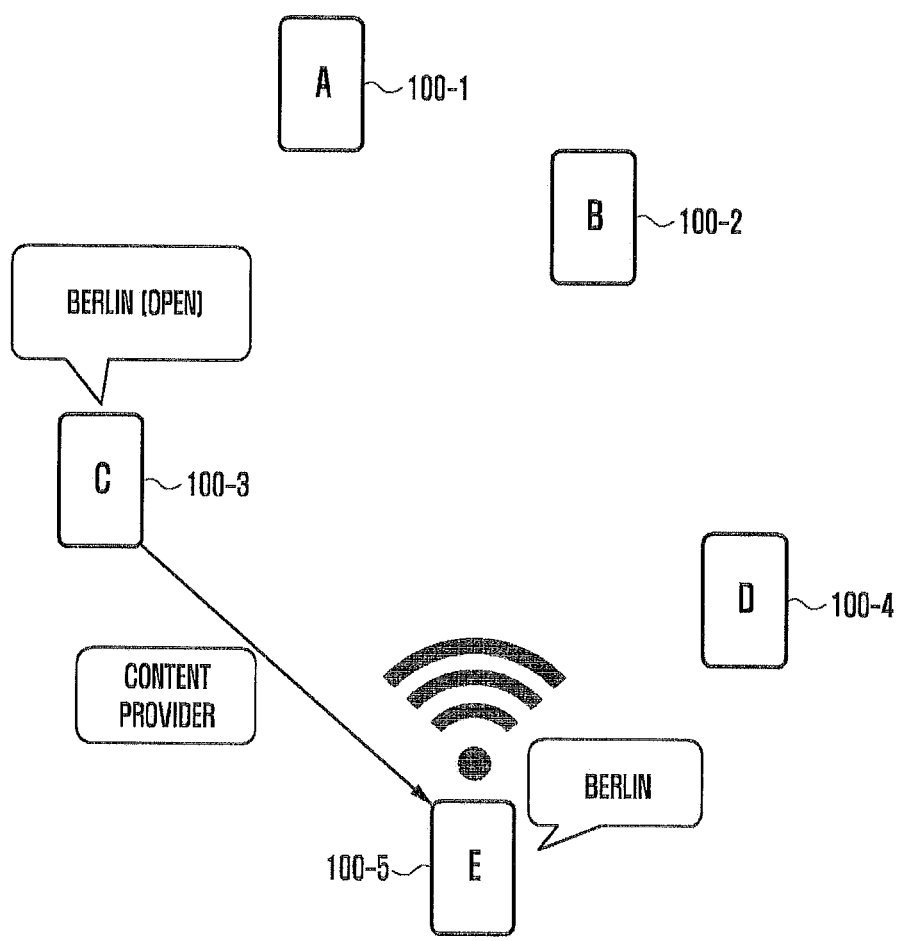
FIG. 7 illustrates filter-based data transmission and reception operations according to various embodiments.

FIG. 7 is a diagram explaining filter-based data transmission and reception according to various embodiments.

In the following description, electronic devices 100-1, 100-2, 100-3, 100-4, and 100-5 can be devices that include direct communication modules capable of directly performing wireless communication (Device to Device: D2D) without passing through a network or without the operation of a base station. The electronic devices 100-1, 100-2, 100-3, 100-4, and 100-5 can be devices that include the configurations as described above with reference to FIGS. 1 and 2 or the configurations as described above with reference to FIGS. 3 to 5.

Referring to FIG. 7, the first to fifth electronic devices 100-1, 100-2, 100-3, 100-4, and 100-5 can be arranged in a predetermined range. The predetermined range can be a region in which a communication channel can be formed based on the direct communication module 110 between the first to fifth electronic devices 100-1, 100-2, 100-3, 100-4, and 100-5 without the operation of the base station. The first to fifth electronic devices 100-1, 100-2, 100-3, 100-4, and 100-5 can include the direct communication modules 110 and can be in a communication operation standby state.

On the other hand, according to an embodiment, the fifth electronic device 100-5 can enter into a predetermined range in which the first to fourth electronic devices 100-1, 100-2, 100-3, and 100-4 are positioned. The fifth electronic device 100-5 can activate the direct communication module 110 to request a specific file transmission while entering into the predetermined range in which the other electronic devices are positioned. For example, the fifth electronic device 100-5 can request transmission of at least one file that is related to a movie "Berlin". The fifth electronic device 100-5 can apply a filter, which requests a file that corresponds to the movie title "Berlin", to the transmitted information filter module 113. For example, the fifth electronic device 100-5 can apply a filter, which requests a file that includes a text "Berlin" in the file names or contents, to the transmitted information filter module 113. The fifth electronic device 100-5 can broadcast a file request through the transmission module 111 in a predetermined period or in real time after applying the transmitted information filter module 113.

The first to fourth electronic devices 100-1, 100-2, 100-3, and 100-4 can receive a "Berlin" movie transmission request from the fifth electronic device 100-5. Among them, the third electronic device 100-3, if a movie titled "Berlin" is searched from the storage module, can transmit the corresponding movie file to the fifth electronic device 100-5. In this case, the third electronic device 100-3 can automatically form a communication channel with the fifth electronic device 100-5 in response to the request from the fifth electronic device, and can automatically transmit the corresponding movie file.

According to an embodiment, the movie "Berlin" can be stored in the remaining electronic devices except for the first electronic device 100-1. In this case, the fifth electronic device 100-5 can select the electronic device that will receive the movie file among the first to fourth electronic devices 100-1, 100-2, 100-3, and 100-4 in response to at least one predetermined condition. For example, the at least one condition can include at least one of movement situations of the devices, previous communication histories between the devices, user designation, and wireless environments between the devices. The previous communication history condition can be used to preferentially select the corresponding electronic device in a case where there is the other electronic device, with which the fifth electronic device 100-5 previously receives or transmits data, in the first to fourth electronic devices 100-1, 100-2, 100-3, and 100-4. In relation to the user designation condition, the fifth electronic device 100-5 can output a list of the first to fourth electronic devices 100-1, 100-2, 100-3, and 100-4 that are connected based on the direct communication module 110 to the display module 140. The wireless environment condition can be used to select the electronic device having the best wireless environment with the fifth electronic device 100-5. The wireless environment condition can include a wireless signal reception strength, a data transfer rate, and an error rate. The at least one of the predetermined conditions can be used as the optimum condition to group the at least one of the plurality of other electronic devices to a data transmission and reception candidate group or can be used as the optimum condition to select the other electronic device to transmit data thereto.

Figure 8:
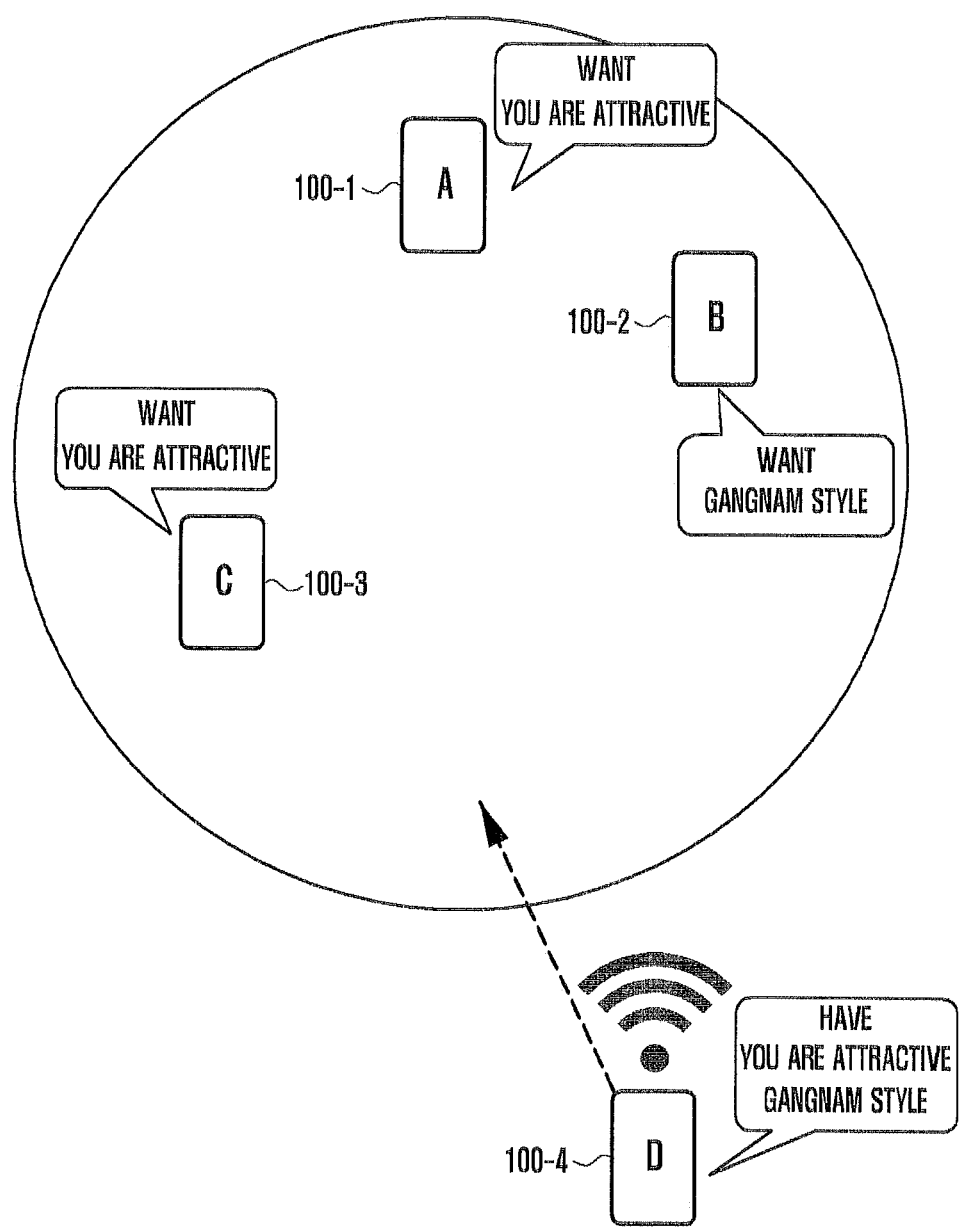
FIG. 8 illustrates a filter-based data transmission and reception operation according to another embodiment.

FIG. 8 is a diagram explaining filter-based data transmission and reception according to another embodiment.

In the following description, electronic devices 100-1, 100-2, 100-3, and 100-4 can be devices that include direct communication modules capable of directly performing wireless communication (Device to Device: D2D) without passing through a network or without the operation of a base station. The electronic devices 100-1, 100-2, 100-3, and 100-4 can be devices that include the configurations as described above with reference to FIGS. 1 and 2 or the configurations as described above with reference to FIGS. 3 to 5.

Referring to FIG. 8, the first to third electronic devices 100-1, 100-2, and 100-3 can form a predetermined group based on a mobile wireless access point. The fourth electronic device 100-4 can enter into a predetermined region in which the electronic devices of the predetermined group are positioned. Accordingly, the first to fourth electronic devices 100-1, 100-2, 100-3, and 100-4 can transmit and receive information on desired data with each other to share information on what data the respective electronic devices desire to receive or what data the respective electronic devices have. At this operation, the first to third electronic devices 100-1, 100-2, and 100-3 can preset the received information filter module 114 and the transmitted information filter module 113. In the received information filter module 114, a filter, which includes list information on the data that the user of the corresponding electronic device desires to receive, can be arranged or written. A filter, which includes data list information that the corresponding electronic device can transmit, can be arranged or written in the transmitted information filter module 113.

Based on the illustrated drawing, the first electronic device 100-1 and the third electronic device 100-3 operate a received information filter Want to desire reception of a file having a file name "You are attractive" that corresponds to the filter information. The second electronic device 100-2 operates a received information filter Want in which information to desire reception of a file having a file name "Gangnam Style" that corresponds to the filter information is arranged. The fourth electronic device 100-4 operates a transmitted information filter Have indicating that files "You are attractive" and "Gangnam Style" are possessed and the corresponding files can be provided.

If the fourth electronic device 100-4 enters into the group of the first to third electronic devices 100-1, 100-2, and 100-3 and transmits and receives information on the filter through the direct communication module 110, the above-described information can be mutually shared. For example, the file "Gangnam Style" that is stored in the fourth electronic device 100-4 can be automatically transmitted to the second electronic device 100-2. The file "You are attractive" that is stored in the fourth electronic device 100-4 can be automatically transmitted to the first electronic device 100-1 or the third electronic device 100-3. The first to fourth electronic devices 100-1, 100-2, 100-3, and 100-4 can broadcast information of the set filter in a predetermined period or in real time.

According to an embodiment, if the file transmission method is set to "Transmit according to selection after notification", the fourth electronic device 100-4 can output information indicating that a specific electronic device requests transmission of a specific file. If the transmission of the corresponding file is permitted by the user, the fourth electronic device 100-4 can transmit the data that corresponds to the file. According to an embodiment, the data transmission and reception can be performed to correspond to a predetermined credit payment. Here, the credit can be a standardized content payment means, such as e-money or e-coin. For example, the first electronic device 100-1 can guide a predetermined credit payment intention while requesting transmission of a file "You are attractive" from the fourth electronic device 100-4. Further, the first electronic device 100-1 can pay the credit determined by the fourth electronic device 100-4 and then request the transmission of the file "You are attractive". The fourth electronic device 100-4 can automatically transmit the file "You are attractive" to the first electronic device 100-1 that has paid the credit without any separate permission operation.

In the above-described embodiment, it is exemplified that the file name is defined as the filter information. Here, the filter information can be defined as a specific category. For example, the filter information can be defined as "Music", "Movie", or "Book". For example, if the first electronic device 100-1 sets "Music" in the transmitted information filter, the first electronic device 100-1 can automatically receive at least a part of the music file possessed by the other electronic device. Further, the first electronic device 100-1 can receive at least a part of the list of music files that the other electronic devices have, and can output the same to the display module in the form of a list. Then, the user can confirm the corresponding list and select the file that is desired to be transmitted. The first electronic device 100-1 can perform a procedure of receiving the files selected by the user from the other electronic devices. At this operation, if the plurality of other electronic devices having the file to be received belong to the data transmission and reception candidate group, the first electronic device 100-1 can select the specific other electronic device using the optimum condition and receive the file from the selected other electronic device.

Figure 9:
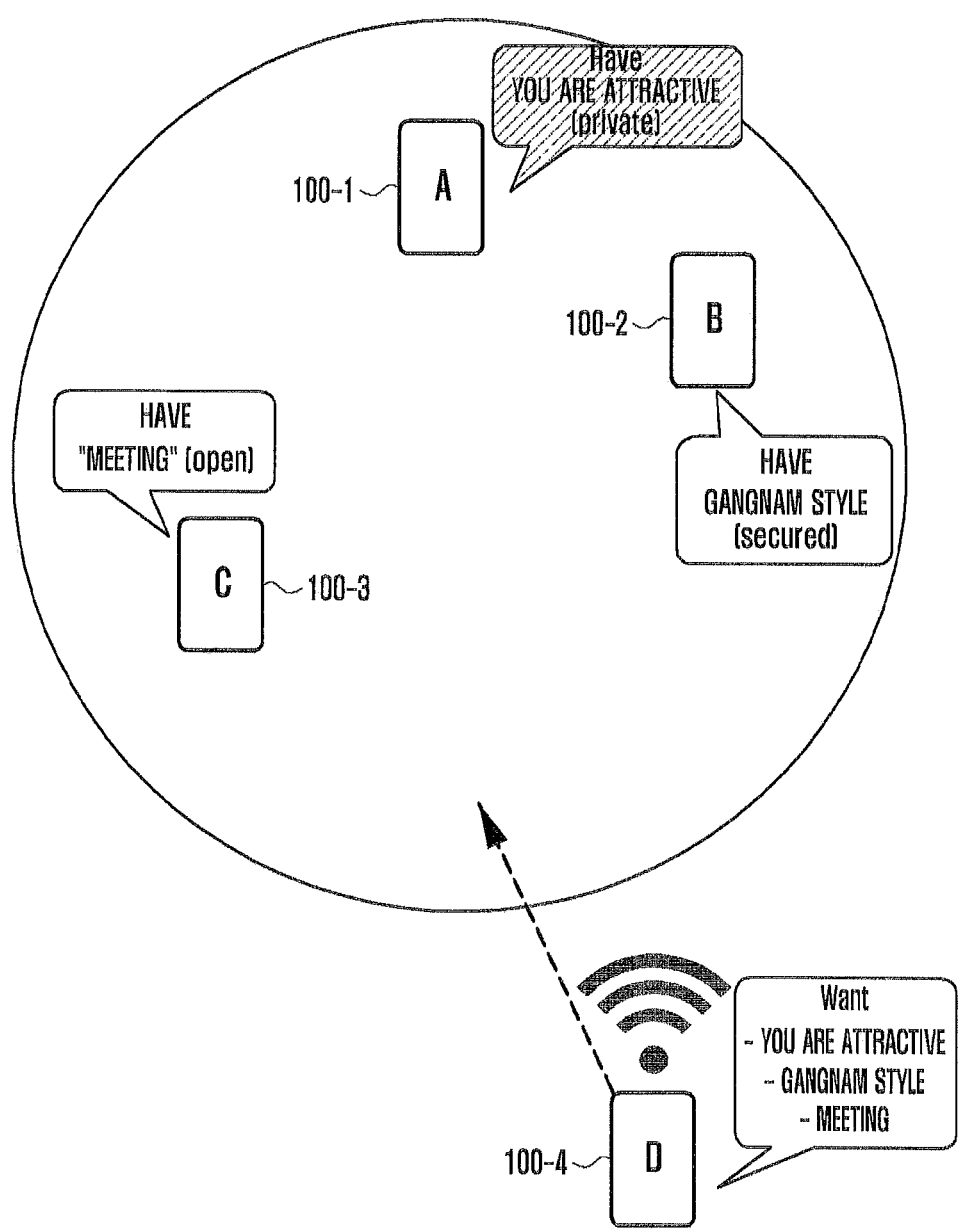
FIG. 9 illustrates a filter-based data transmission and reception operation according to still another embodiment.

FIG. 9 is a diagram explaining filter-based data transmission and reception according to still another embodiment.

In the following description, electronic devices 100-1, 100-2, 100-3, and 100-4 can be devices that include direct communication modules capable of directly performing wireless communication (Device to Device: D2D) without passing through a network or without the operation of a base station. The electronic devices 100-1, 100-2, 100-3, and 100-4 can be devices that include the configurations as described above with reference to FIGS. 1 and 2 or the configurations as described above with reference to FIGS. 3 to 5.

Referring to FIG. 9, the first to third electronic devices 100-1, 100-2, and 100-3 can be arranged in a predetermined range or the fourth electronic device 100-4 can enter into a predetermined group that is formed using a mobile wireless access point. Here, the entering operation of the fourth electronic device 100-4 can be an operation to perform activation of the direct communication module 110 and to perform schedule broadcasting in a run-out distance of the direct communication module 110. At operation of setting the received information filter, the first to third electronic devices 100-1, 100-2, and 100-3 can set grades by data. For example, the first to third electronic devices 100-1, 100-2, and 100-3 can set first to third grades by data.

According to an embodiment, in the first electronic device 100-1, a filter can be set to indicate that a file having a file name "You are attractive" is set as a first grade (Private). The grade can be set to correspond to the user's desire. However, in a case where the corresponding file has inherent characteristics, for example, Digital right Management (DRM) setting characteristics, the grade can be automatically allocated.

The first grade can be a grade that is set so that other electronic devices are unable to confirm whether the corresponding file is stored in the first electronic device 100-1. The first grade can be a grade that controls the corresponding file not to be transmitted to the other electronic devices. If a filter having the first grade file is set, the first electronic device 100-1 can control the file information of the corresponding grade not to be broadcast.

In the second electronic device 100-2, a filter can be set to guide that a file having a file name "Gangnam Style" is set as a second grade (Secured). Here, the second grade can be a grade that requires a predefined security operation. For example, the second grade can be a grade that is set so that if a stored content access request is generated, security procedure performance, such as predefined password input, is requested, and if the security procedure performance is successful, the access of the content that is stored in the electronic device is permitted.

In the third electronic device 100-3, a filter can be set to indicate that a file having a file name "Meeting" is set as a third grade (Open). Here, the third grade can be a grade that is set so that the other electronic devices can make a search and request transmission to correspond to the desire to receive the file.

If the fourth electronic device 100-4 enters into a predetermined position in which the first to third electronic devices 100-1, 100-2, and 100-3 are arranged and becomes in a communicable state, it can receive respective filter information from the first to third electronic devices 100-1, 100-2, and 100-3. In this case, the first electronic device 100-1 may not provide information on a file "You are attractive". The fourth electronic device 100-4 can receive information on the file "Gangnam Style" that is provided by the second electronic device 100-2 with information indicating that the corresponding file is in a "secured" state, and can display the information on the display module 140 in a predetermined form of an image or text. The fourth electronic device 100-4 can receive and display information on the file "Meeting" on the third electronic device 100-3.

Here, if it is assumed that the fourth electronic device 100-4 has the transmitted information filter to desire files "You are attractive", "Gangnam Style", and "Meeting", the fourth electronic device 100-3 can automatically receive the file "Meeting" from the third electronic device 100-3 or can receive the corresponding file in response to the confirmation or permission of the third electronic device 100-3. According to an embodiment, the fourth electronic device 100-4 can transmit a predetermined pass code to the second electronic device 100-2 in relation to the reception of the file "Gangnam Style". If the pass code that is provided by the fourth electronic device 100-4 coincide with the preset pass code, the second electronic device 100-2 can transmit the file "Gangnam Style" to the fourth electronic device 100-4. As an example, the search and transmission of the file "You are attractive" may not be performed by the grade of the corresponding file. The fourth electronic device 100-4 can receive the pass code from the second electronic device 100-2 as a separate message. Further, if there is the previous communication history with the second electronic device 100-2, the fourth electronic device 100-4 can automatically transmit the pre-stored pass code to the second electronic device 100-2 on the basis of the previous communication history. Further, the pass code can be directly input by the user.

If specific pass code information is transmitted from the fourth electronic device 100-4 together with a file transmission request, the second electronic device 100-2 having the file "Gangnam Style" can compare the received pass code information with predefined pass code information. Then, if the compared pass codes coincide with each other, the second electronic device 100-2 can automatically transmit the file "Gangnam Style" to the fourth electronic device 100-4 or can output a popup window for asking whether to permit the transmission after notification to the user.

According to various embodiments, if the above-described electronic devices support the filter-based data processing, the kind or name of the data that is to be transmitted or received can be automatically set using a filter set by the user or a filter set according to the situation information. The electronic devices can share the data with the other surrounding electronic devices through broadcasting of the information written in the corresponding filter using the direct communication module 110.

According to an embodiment, to correspond to the case where "Jazz festival" is set in the schedule information of a specific electronic device or a specific musician information search is performed over a predetermined number of times, the electronic devices can automatically write the schedule information or search information as the filter information, and based on this, can perform broadcasting related to the data sharing. Further, in a case where specific place and time are written in the schedule information, the electronic devices can determine that the electronic device is positioned at the corresponding time in the corresponding place, and in this case, the electronic devices can share the information on the corresponding place with the other electronic devices connected on the basis of the direct communication module 110. The electronic devices can broadcast position information and position tag of a specific place, and can receive corresponding information on a specific photo or text from the other electronic devices based on the direct communication module 110 to store or display the information.

Figure 10A:
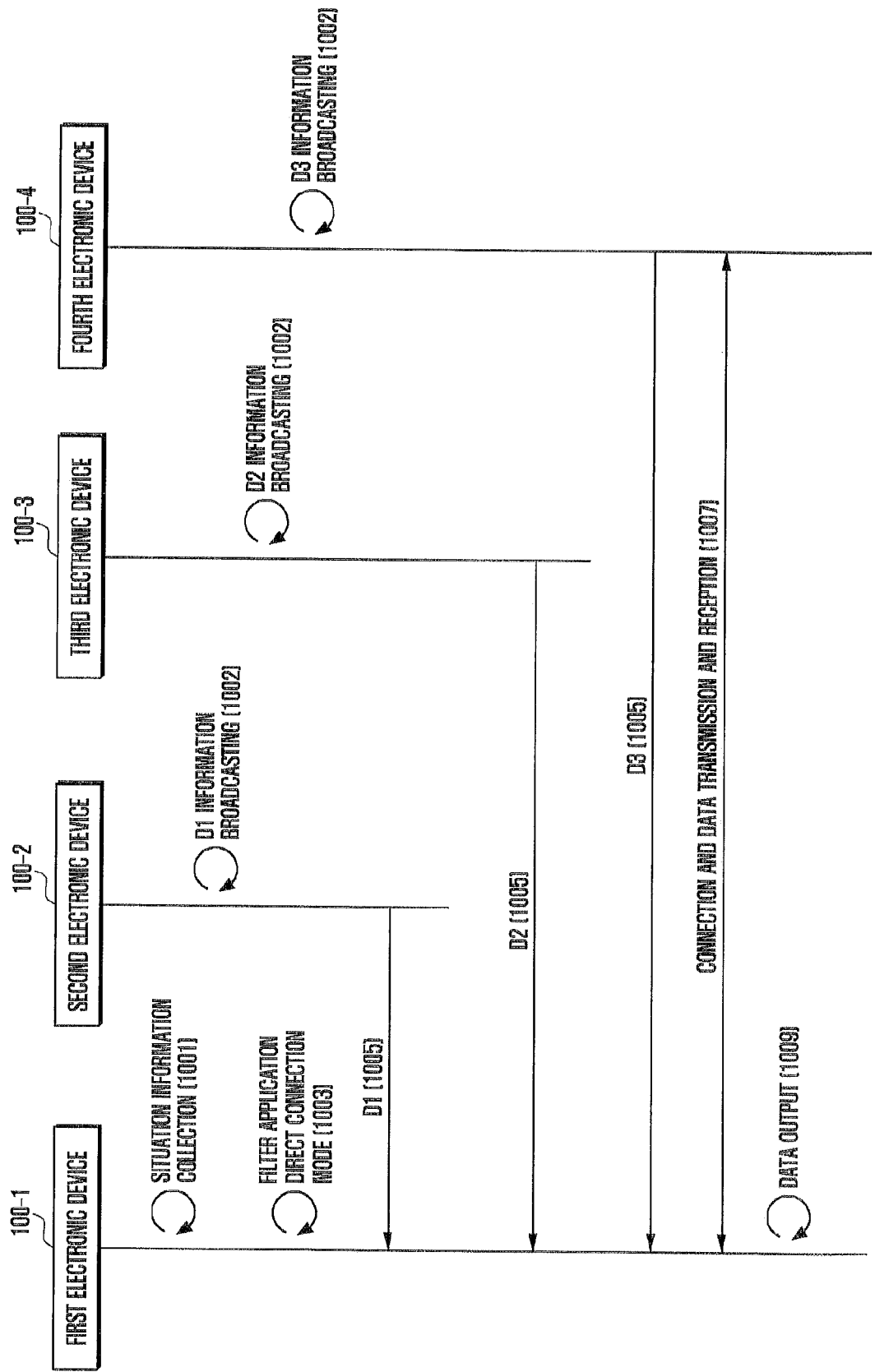
FIG. 10A illustrate a received information filter operation according to various embodiments.

FIG. 10A is a diagram explaining received information filter operation according to various embodiments.

In the following description, electronic devices 100-1, 100-2, 100-3, and 100-4 can be devices that include direct communication modules capable of directly performing wireless communication (Device to Device: D2D) without passing through a network or without the operation of a base station. The electronic devices 100-1, 100-2, 100-3, and 100-4 can be devices that include the configurations as described above with reference to FIGS. 1 and 2 or the configurations as described above with reference to FIGS. 3 to 5.

Referring to FIG. 10A, at operation 1001, for example, the first electronic device 100-1 can select a predefined filter in relation to the situation information collected by the situation processing module 170 at a predetermined time and in a predetermined place. For example, the first electronic device 100-1 can collect preset schedule information to be performed at the present time. Further, the first electronic device 100-1 can collect the schedule information set to be performed in the present place. If the situation information is collected, at operation 1003, for example, the first electronic device 100-1 can perform filter application according to the situation information and can enter into a direct connection mode in response to the filter application. According to an embodiment, the first electronic device 100-1 can activate the direct communication module 110 so as to receive data from the other electronic devices.

At operation 1002, for example, the second electronic device 100-2, the third electronic device 100-3, or the fourth electronic device 100-4 can broadcast specific data. According to various embodiments, at operation 1002, the second electronic device 100-2 can perform D1 information broadcasting, the third electronic device 100-3 can perform D2 information broadcasting, and the fourth electronic device 100-4 can perform D3 information broadcasting. At operation 1005, for example, the first electronic device 100-1 of which the direct communication module 110 is activated can receive at least one of D1 information broadcast by the second electronic device 100-2, D2 information broadcast by the third electronic device 100-3, and D3 information broadcast by the fourth electronic device 100-4.

At operation 1003, for example, if information is received from the other electronic devices, the first electronic device 100-1 can perform filtering of the information using a set filter. According to an embodiment, if the applied transmitted information filter is a traffic information filter, the first electronic device 100-1 can collect D3 information that is provided by the electronic device that provides the traffic information among the other electronic devices, for example, the fourth electronic device 100-4. The first electronic device 100-1 can disregard the D1 information or D2 information that is provided from the second electronic device 100-2 or the third electronic device 100-3 in relation to the transmitted information filter application.

At operation 1007, for example, if it is confirmed that the fourth electronic device 100-4 is a device that provides the traffic information, the first electronic device 100-1 can form a communication channel with the fourth electronic device 100-4. The first electronic device 100-1 can receive real-time traffic information from the fourth electronic device 100-4. At operation 1007, the first electronic device 100-1 can set at least a part of the plurality of other electronic devices as a device candidate group to connect wireless communication using the filter. For example, the first electronic device 100-1 can set the plurality of other electronic devices that transmit the data defined by the filter as the candidate devices to connect the wireless communication related to the data reception.

At operation 1009, for example, the first electronic device 100-1 can operate to output the received data to the display module. According to an embodiment, the first electronic device 100-1 can output the received data output as at least one of text, image and audio signals. For example, the first electronic device 100-1 can output the received real-time traffic information to the display module 140 in the form of at least one of a text and an image. The first electronic device 100-1 can output the received data to the audio processing module 130 as an audio signal. The first electronic device 100-1 can output vibration to notify of the data reception.

At the above-described operation, a method in which the fourth electronic device 100-4 transmits the real-time traffic information itself can be considered, but in this case, the amount of information that is broadcast based on the direct communication module 110 can be limitedly designed. For example, in a case of D1 to D3 information, data having a size that is equal to or smaller than a predetermined size can be broadcast in relation to the kind of information provided by the respective electronic devices, the name of information, and identification information of an electronic device that transmits the information. In the above-described design environment, the first electronic device 100-1 can receive information that includes the identification information that is data having a size that is equal to or smaller than the predetermined size in a broadcasting method. The first electronic device 100-1 can confirm the fourth electronic device 100-4 that provides the traffic information through confirmation of the data having a size that is equal to or smaller than the predetermined size, which is received through broadcasting. The first electronic device 100-1 can form a communication channel with the confirmed fourth electronic device 100-4 and can transmit or receive the data having a size that is equal to or larger than the predetermined size.

According to another embodiment, at operation 1001, the first electronic device 100-1 can collect the schedule information, such as appointment, as the situation information. For example, the first electronic device 100-1 can be positioned in a specific place written in the schedule information, and can collect the corresponding position information as the situation information. For example, at operation 1003, the first electronic device 100-1 can select a device matching filter as the transmitted information filter. As described above, the device matching filter can include the identification information of the other electronic device. If the device matching filter is applied and the first electronic device 100-1 enters into the direct connection mode, the first electronic device 100-1 can receive information provided from the other electronic devices. The first electronic device 100-1 can filter the information provided from the other electronic devices using the device matching filter of the direct communication module 110. For example, the fourth electronic device 100-4 can be a device that is defined by the device matching filter. The first electronic device 100-1 can disregard the information provided from the second electronic device 100-2 and the third electronic device 100-3. If the D3 information that is provided by the fourth electronic device 100-4 coincides with the information defined by the device matching filter, the first electronic device 100-1 can perform communication connections with the fourth electronic device 100-4 in relation to the data transmission having a size that is equal to or larger than the predetermined size at operation 1007.

According to an embodiment, if a communication connection request is received from the first electronic device 100-1, the fourth electronic device 100-4 can output a state where the first electronic device 100-1 is positioned in a predetermined range through the display module 140 or other output means, for example, an audio processing module. Further, if the communication channel is formed with the fourth electronic device 100-4, the first electronic device 100-1 can output a state where the fourth electronic device 100-4 is positioned in the predetermined range using the display module 140. For example, the first electronic device 100-1 and the fourth electronic device 100-4 can grasp the current positions thereof by transmitting or receiving the position information. The first electronic device 100-1 and the fourth electronic device 100-4 can include position information collection modules and pre-store map information so as to output the collected position information and the received position information on a map. According to an embodiment, if a communication channel based on the direct communication module 110 is formed, the first electronic device 100-1 or the fourth electronic device 100-4 can automatically attempt call connection. According to an embodiment, the first electronic device 100-1 or the fourth electronic device 100-4 can transmit a message that notifies of arrival to an opposite electronic device automatically or after the user's confirmation operation.

Figure 10B:
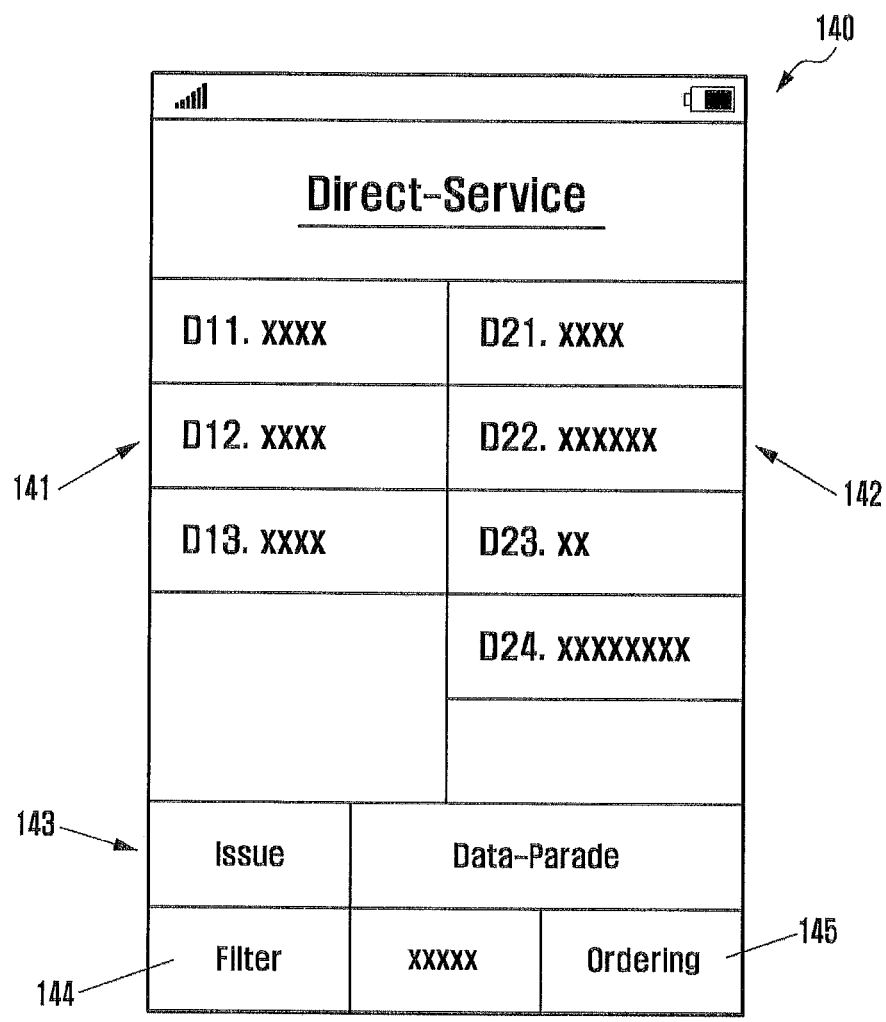
FIG. 10B illustrates a screen that can be provided in a filter-based data processing operation according to various embodiments.

FIG. 10B illustrates a screen that can be provided in a filter-based data processing operation according to various embodiments.

Referring to FIG. 10B, at least one of the electronic devices (hereinafter electronic device 100 is exemplified) according to various embodiments can output information that indicates a direct service to at least a portion of the screen, for example, an upper end of the screen, when the electronic device enters into the direct connection mode. The direct service can be changed to another title or image in response to a designer's intention or user's adjustment.

According to an embodiment, the electronic device 100 can receive predetermined data from the other electronic devices positioned in the surroundings in response to entering into the direct connection mode. Here, if a specific filter is not applied, the electronic device 100 could receive all the data broadcast by the other electronic devices. Further, even in a case where the filter in which information that corresponds to an upper category is written is applied, the electronic device 100 can receive various pieces of data that can be divided into sub-categories in the same category.

If a plurality of pieces of data that can be divided by such a category are received, the electronic device 100 can discriminate the plurality of pieces of data received based on a predetermined condition, and can output the discriminated data to the display module 140 to confirm the discriminated data. In the drawing, it is exemplified that two kinds of data are discriminately displayed. For example, first category data 141 and second category data 142 can be displayed on the display module 140. Here, the data that are divided into two categories are displayed, but various embodiments are not limited thereto. For example, the electronic device 100 can divide the data into two or more category data in relation to the characteristics of the received data, or can divide and display the data as one category.

The first category data 141 can correspond to, for example, broadcasting messages advertised by at least one of the other electronic devices arranged in stores. The second category data 142 can correspond to messages broadcast by a general user. At least one of the first category data 141 and the second category data 142 can be output to the screen together with the predetermined information included in the corresponding data. For example, messages that belong to the first category data 141 can be output to the display module 140 together with at least one character related to advertisement in a display operation. In a similar manner, messages that belong to the second category data 142 can be output to the display module 140 together with at least a part of characters that correspond to the identification information of the other electronic devices in the display operation. According to various embodiments, the broadcasting messages related to advertisement can be so configured that index values that indicate the advertisement are written in headers. According to an embodiment, general user's broadcasting messages can be so configured that index values that indicate the general users are written in the headers.

According to an embodiment, the electronic device 100 can select specific category information among the collected data. Further, the electronic device 100 can output the collected specific category information as an "Issue" item. According to an example illustrated in the drawing, the electronic device 100 can output information related to "Parade" as an issue item 143. For example, the issue item 143 can be information that is transmitted and received over a predetermined frequency in a region where the electronic device 100 is positioned. For example, if the "Parade" information is most frequently transmitted among the pieces of information that are transmitted and received at a point where the electronic device 100 is positioned, the display module 140 can output "parade" as the issue item 143.

A filter item 144 can be an item that provides information on the filter that is currently applied. For example, if the filter item 144 is selected, the electronic device 100 can output a filter list that can select other filters on the current screen or can display the filter list on a separate window. One or a plurality of filter items 144 can be provided in relation to the user's setting or situation information.

An ordering item 145 can be an item related to order adjustment. For example, if the ordering item is selected, at least one of the first category data 141 and the second category data 142 can be updated. Further, the electronic device 100 can update the issue item 143 through analysis of the data that are newly received at a point when the ordering item 145 is selected.

FIG. 11 illustrates the configuration of a relation-based data processing module 70 according to various embodiments.

Referring to FIG. 11, the relation-based data processing module 70 can include a data transmission processor 71 or a data reception processor 72. As described above with reference to FIG. 2, the relation-based data processing module 70 can be provided separately from the control module 160, or can be provided together with other processing modules, for example, the optimum condition data processing module 80 or the filter-based data processing module 60. The configuration of the electronic device to which the relation-based data processing module 70 is applied can be as illustrated in FIG. 1 or 3. Further, the electronic device can include the remaining configurations of the electronic device illustrated in FIG. 3 except for the situation processing module.

For example, referring to FIG. 3, the electronic device 100, to which the relation-based data processing module 70 is independently applied, can include a direction communication module 110, an input module 120, an audio processing module 130, a display module 140, a storage module 150, and a control module 160. The control module 160 can include the relation-based data processing module 70. Further, in a case of the electronic device 100 to which the filter-based data processing module 60 is applied together, it can have the same configuration as the device configuration as described above with reference to FIG. 3.

The data transmission processor 71 can process the data transmission operation in the relation-based data processing operation. For example, the data transmission processor 71 can control the direct communication module 110 to broadcast specific data stored in the storage module 150 in a predetermined period or in real time. In a case of the electronic device 100 to which only the relation-based data processing module 70 is applied, the direct communication module 110 can be configured to include only the transmission module 111 and the reception module 112 among the above-described configurations in FIG. 5. In a case of the electronic device 100 to which both the filter-based data processing module 60 and the relation-based data processing module 70 are applied, the direct communication module 110 can include all the configurations as described above with reference to FIG. 5.

The data transmission processor 71 can output data pieces stored in the storage module 150 in a predetermined period or repeatedly. The data pieces that are transmitted by the data transmission processor 71 can be information of which the meaning becomes clear when the data pieces are integrated into one. As described above, in a case of performing the broadcasting function based on the direct communication module 110, the amount of data to be broadcast can be limited. An appropriate meaning may not be transmitted through once broadcasting. For example, as exemplified in FIG. 7, in a case where the fifth electronic device 100-5 broadcasts data called "Berlin", the third electronic device 100-3 can perform various determinations with respect to "Berlin". For example, the meaning that the transmission-side electronic device (e.g., the fifth electronic device 100-5 of FIG. 7) intends to transmit can be a new movie having a title "Berlin". The reception-side electronic device (e.g., the third electronic device 100-3 of FIG. 7) can recognize "Berlin" as the capital of Germany. According to an embodiment, the data transmission processor 71 can divide data that has a specific meaning through combination of a plurality of words or phrases to transmit the divided data. For example, the data transmission processor 71 can repeatedly transmit the data "movie", "Berlin", and "the year 2013".

According to an embodiment, the data reception processor 72 can confirm whether the other electronic device that has received the above-described information generates a response signal to the reception of the corresponding data. The data reception processor 72 can request the data transmission processor 71 to transmit additional information to the other electronic device that generates the response signal. According to an embodiment, the data reception processor 72 can request to form a communication channel with the other electronic device that provides all responses to the data transmitted by the data transmission processor 71. If the channel forming is requested, the data reception processor 72 can form the communication channel with the other electronic device using the direct communication module 110. The data reception processor 72 with which the communication channel is formed can transmit the data (e.g., a movie file, a music file, a text message, or a document file such as words) to the other electronic device.

As described above, the relation-based data processing module 70 can receive a part of the plurality of data pieces and can transmit other data pieces to the electronic device that provides the corresponding response. For example, the relation-based data processing module 70 can operate to form a communication channel in response to the request of the electronic device that receives all the data pieces. The transmission-side electronic device can form the communication channel only with the electronic device that receives all the transmitted data pieces, and thus more effective data transmission can be performed. The reception-side electronic device can also confirm the transmission-side electronic device that can provide data in which the user is interested through the data pieces. The reception-side electronic device can search the transmission-side electronic device without confirming the whole data.

Figure 12:
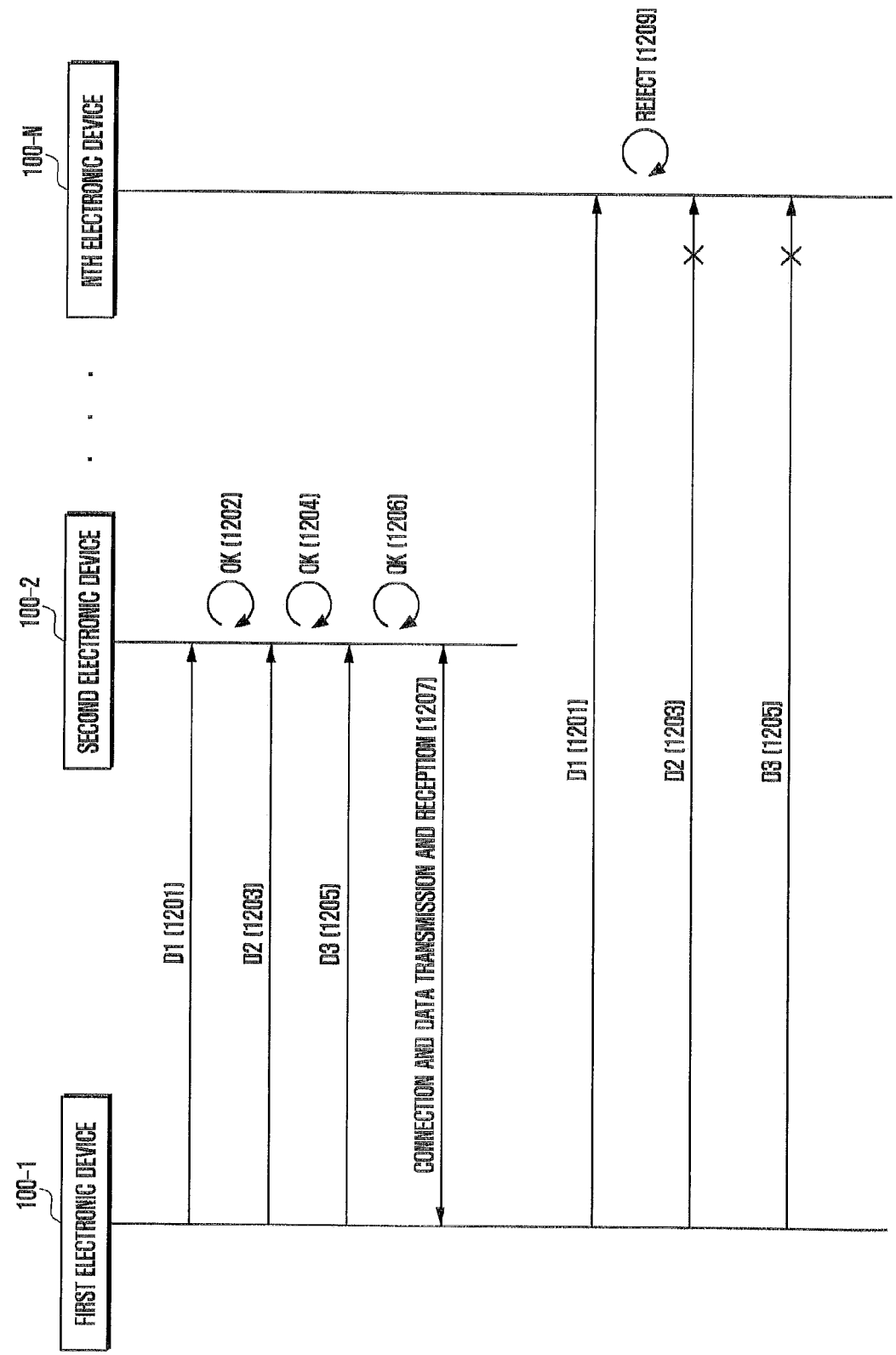
FIG. 12 illustrates a relation-based data processing operation according to various embodiments.

FIG. 12 illustrates a relation-based data processing operation according to various embodiments.

In the following description, electronic devices 100-1 to 100-N can be devices that include direct communication modules capable of directly performing wireless communication (Device to Device: D2D) without passing through a network or without the operation of a base station. The electronic devices 100-1 to 100-N can be devices that include the configurations as described above with reference to FIGS. 1 and 2 or the configurations as described above with reference to FIG. 3 to 5 or 11.

Referring to FIG. 12, at operation 1201, for example, the first electronic device 100-1 can broadcast a first data piece D1. At operation 1203, the first electronic device 100-1 can broadcast a second data piece D2. At operation 1205, the first electronic device 100-1 can broadcast a third data piece D3. The first electronic device 100-1 can perform broadcasting of the first to third data pieces in the predetermined period or repeatedly. Here, the transmitted data pieces can be various pieces of information, such as specific words, phrases, or figures as described above. Further, the data pieces can be an image of a predetermined size.

According to an embodiment, the second electronic device 100-2 or the N-th electronic device 100-N can receive at least one data piece among the data pieces broadcast by the first electronic device 100-1 and can output related information to the display module 140. At operation 1202, for example, if the first data piece D1 is received from the first electronic device 100-1, the second electronic device 100-2 can transmit a response signal OK that corresponds to the user's control to the first electronic device 100-1. Here, the response signal OK can be a response signal to the respective data pieces. Further, at operation 1204 and operation 1206, for example, if the second data piece D2 and the third data piece D3 are received from the first electronic device 100-1, the second electronic device 100-2 can transmit the response signal OK to the first electronic device 100-1 to correspond to the user's control.

For example, if the at least one response signal to the data pieces is received from the second electronic device 100-2, at operation 1207, the first electronic device 100-1 can perform a communication connection with the second electronic device 100-2. The first electronic device 100-1 can transmit the specific data to be transmitted to the second electronic device 100-2. Then, the first electronic device 100-1 can receive the specific data from the second electronic device 100-2.

As an example, the first electronic device 100-1 may not perform separate communication connection with the N-th electronic device 100-N that has no response signal to the data pieces or provides a reject signal. Based on the illustrated drawing, if the first electronic device 100-1 broadcasts the first data piece D1, the second data piece D2, or the third data piece D3, the N-th electronic device 100-N can receive all the data pieces. However, the N-th electronic device 100-N can transmit a reject response to the corresponding data piece to the first electronic device 100-1 or transmit no response to correspond to the user's control. Further, the N-th electronic device 100-N can disregard the second data piece D2 and the third data piece D3 provided by the first electronic device 100-1.

Here, the data that is transmitted based on the communication connection can be data that is different from the broadcast data or has a different size. For example, the data that is transmitted through the communication connection can be a file having a size that is equal to or larger than a predetermined size, a large-capacity movie file, an advertisement file, an audio file, a specific coupon file, or an event winning notification file.

As an example, the first electronic device 100-1 can perform communication connections with the other electronic device that provides a response signal to the broadcast data pieces over a predetermined number of times or the other electronic device that provides a response signal to the finally broadcast data piece among the plurality of data pieces, and can operate to perform the data transmission.

Figure 13:
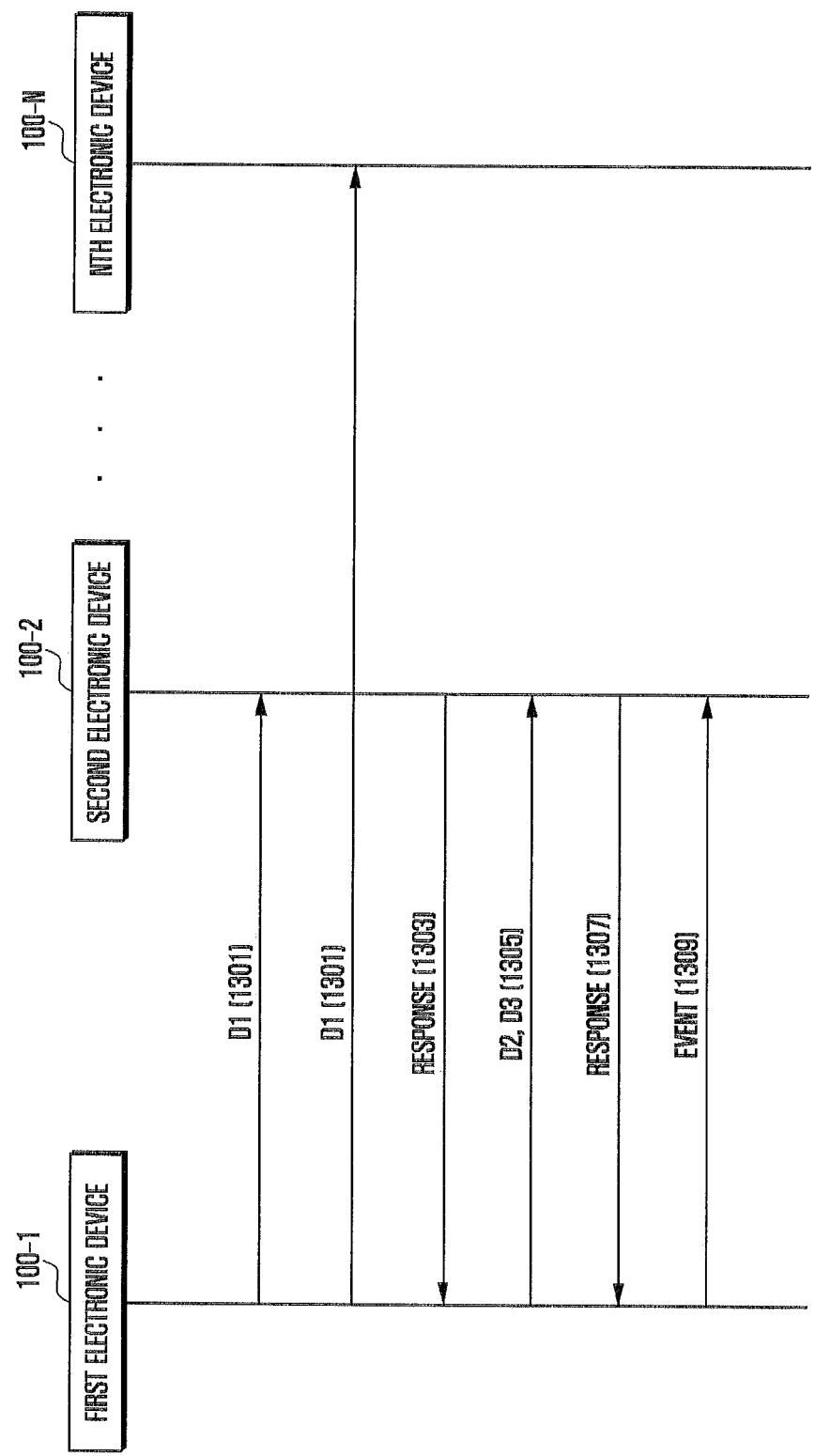
FIG. 13 illustrates a relation-based data processing operation according to another embodiment.

FIG. 13 illustrates a relation-based data processing operation according to another embodiment.

In the following description, electronic devices 100-1 to 100-N can include direct communication modules capable of directly performing wireless communication (Device to Device: D2D) without passing through a network or without the operation of a base station. The electronic devices 100-1 to 100-N can be devices that include the configurations as described above with reference to FIGS. 1 and 2 or the configurations as described above with reference to FIG. 3 to 5 or 11.

Referring to FIG. 13, at operation 1301, for example, the first electronic device 100-1 can broadcast the first data piece D1 to the second electronic device 100-2 and the N-th electronic device 100-N. If the first data piece D1 is received, at operation 1303, for example, the second electronic device 100-2 can transmit the corresponding response to the first electronic device 100-1. The response can be a response signal that notifies to receive the whole data. According to various embodiments, the second electronic device 100-2 can output the received first data piece D1 to the display module 140. The second electronic device 100-2 can transmit the response signal to the first electronic device 100-1 to correspond to the user's control. As an example, the N-th electronic device 100-N can transmit no response.

If the response is received from the second electronic device 100-2, at operation 1305, for example, the first electronic device 100-1 can transmit the second data piece D2 or the third data piece D3 to the second electronic device 100-2. The second electronic device 100-2 can output the received second data piece D2 or third data piece D3 to the display module 140. At operation 1307, for example, the second electronic device 100-2 can transmit the response signal to the first electronic device 100-1 to correspond to the user's control. At operation 1309, for example, the first electronic device 100-1 can provide event information to the second electronic device 100-2 that has provided the response signal.

The first electronic device 100-1 can differently perform the transmission of the above-described data pieces. For example, the first electronic device 100-1 can broadcast the first data piece D1 so that the many and unspecified other electronic devices receive the first data piece D1. Further, the first electronic device 100-1 can transmit other data pieces to at least one of the second electronic devices 100-2 that provides the response signal to the first data piece D1 in a multicasting or unicasting method. In this case, the first electronic device 100-1 may not transmit the second data piece D2 and the third data piece D3 to the N-th electronic device 100-N. Further, the first electronic device 100-1 can repeatedly broadcast only the first data piece D1 and can proved the remaining data pieces to the other electronic device that provides the corresponding response. Further, the first electronic device 100-1 can receive all the data pieces, form a communication channel with the other electronic device that provides the corresponding response, and transmit specific kind of or predefined data.

Figure 14:
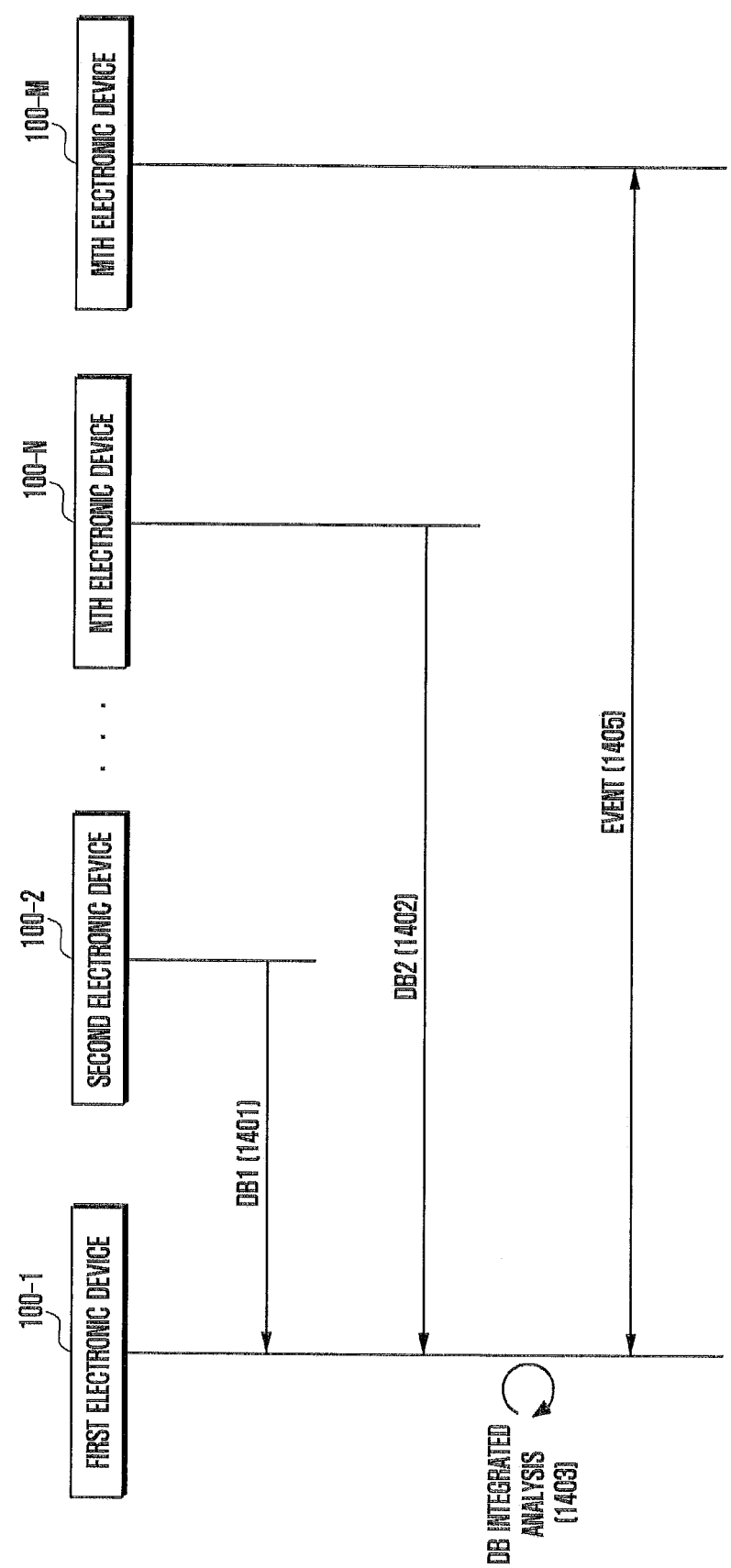
FIG. 14 illustrates a relation-based data processing operation according to still another embodiment.

FIG. 14 illustrates a relation-based data processing operation according to still another embodiment.

In the following description, electronic devices 100-1 to 100-N and 100-M can be devices that include direct communication modules capable of directly performing wireless communication (Device to Device: D2D) without passing through a network or without the operation of a base station. The electronic devices 100-1 to 100-N and 100-M can be devices that include the configurations as described above with reference to FIGS. 1 and 2 or the configurations as described above with reference to FIG. 3 to 5 or 11.

Referring to FIG. 14, at operations 1401 and 1402, for example, the first electronic device 100-1 can receive at least one of a first database DB1 and a second database DB2 from at least one of the second electronic device 100-2 and the N-th electronic device 100-N. According to an embodiment, the first electronic device 100-1 can enter into a direct connection mode and can request the first database DB1 from the second electronic device 100-2. Further, the first electronic device 100-1 can request the second database DB2 from the N—the electronic device 100-N. Further, according to an embodiment, if the first electronic device 100-1 intends to enter into a direct connection mode, at least one of the second electronic device 100-2 and the N-th electronic device 100-N that are positioned around the first electronic device 100-1 can automatically share at least one of the first database DB1 and the second database DB2 with the first electronic device 100-1. On the other hand, the first electronic device 100-1 can perform the database collection even without entering into the direct connection mode. For example, the first electronic device 100-1 can activate the communication channel related to the database request with respect to the second to N-th electronic devices 100-2 to 100-N according to the predetermined period or according to the user's request. The first electronic device 100-1 can receive the database from the other electronic devices.

The first database DB1 and the second database DB2 can include specific information of the other electronic devices collected by the second electronic device 100-2 and the N-th electronic device 100-N. According to an embodiment, the first database DB1 and the second database DB2 can include taste information of users of the other electronic devices. Further, the first database DB1 and the second database DB2 can include information on for what data piece the electronic device provides a response signal. Further, the first database DB1 and the second database DB2 can include information on what data the electronic device requests. The first database DB1 and the second database DB2 can include transmitted information filter information and received information filter information of the other electronic devices. For example, the second electronic device 100-2 and the N-th electronic device 100_n can store data broadcast by the other electronic devices and data provided by the other electronic devices for respective electronic devices.

If at least one of the first database DB1 and the second database DB2 is received, at operation 1403, for example, the first electronic device 100-1 can analyze the received databases. For example, the first electronic device 100-1 can compare at least one of the kind information of the data possessed by the first electronic device 100-1 itself and name information of the data with the results of database analysis. The first electronic device 100-1 can select the other electronic devices having probability to receive event data to be transmitted, which is equal to or higher than a predetermined level, through the results of the comparison. The first electronic device 100-1 can transmit the event data requested by the selected other electronic device, for example, the M-th electronic device 100-M, to the M-th electronic device 100-M. Here, if the event data has a size that is equal to or larger than the predetermined size, the first electronic device 100-1 can form the communication channel with the M-th electronic device 100-M and can transmit the event data through the formed communication channel.

According to an embodiment, the first electronic device 100-1 can possess a hamburger coupon. If it is determined that the M-th electronic device 100-M desires to receive a hamburger coupon through the database analysis, the first electronic device 100-1 can provide the possessed hamburger coupon to the M-th electronic device 100-M. Information on the M-th electronic device 100-M can be collected through the database analysis operation.

In the above-described relation-based data processing method, the first electronic device 100-1 can adopt at least one filter. According to an embodiment, the first electronic device 100-1 can select a filter in which specific filter information is written to correspond to a predetermined time or a predetermined place. Here, the filter information can be composed of the data pieces as described above to be broadcast. The reception-side electronic device (e.g., the M-th electronic device 100-M) can select a filter in which specific filter information that the electronic device intends to receive is written. The reception-side electronic device (e.g., the M-th electronic device) can confirm only the broadcasting information that is filtered through the corresponding filter among broadcasting information provided by at least one transmission-side electronic device (e.g., first electronic device 100-1 and second electronic device 100-2).

According to an embodiment, the first electronic device 100-1 can process relation-based data in relation to the optimum condition application. If there are a plurality of other electronic devices that respond to the relation-based data processing, the first electronic device 100-1 can select only a part of the other electronic devices through application of the predefined condition. Further, the first electronic device 100-1 can align the communication connection sequence of the other electronic devices based on the predefined condition. The first electronic device 100-1 can perform communication connections with the other electronic devices to correspond to the alignment order. The first electronic device 100-1 can provide data or event to the other electronic devices that are communication-connected.

Figure 15:
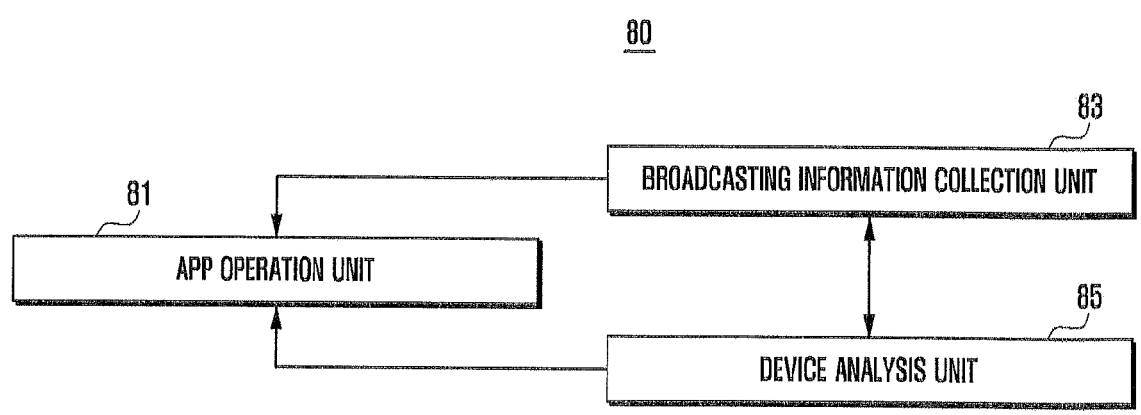
FIG. 15 illustrates in more detail the configuration of an optimum condition data processing module according to various embodiments.

FIG. 15 illustrates the configuration of an optimum condition data processing module 80 according to various embodiments. The optimum condition data processing module 80 can be applied to at least one of the electronic devices according to various embodiments as described above. In the following description, the electronic device 100 is exemplified.

Referring to FIG. 15, the optimum condition data processing module 80 can include an app operation unit 81, a broadcasting information collection unit 83, or a device analysis unit 85. The app operation unit 81, the broadcasting information collection unit 83, or the device analysis unit 85 can be implemented by a processor or a software module that is loaded by the processor.

For example, the app operation unit 81 can control the app operations of the electronic device 100. The app operation unit 81 can control an output of a standby screen related to at least one app selection or icon arrangement screen. Further, if an input event that is related to the specific app activation occurs, the app operation unit 81 can perform the corresponding app activation. In this case, if the activation-requested app is a direct connection app related to the direct connection mode, the app operation unit 81 can activate the direct communication module 110. For example, the app operation unit 81 can control the operation of the direct connection app based on the direct communication module 110.

For example, the broadcasting information collection unit 83 can collect the broadcasting information that is broadcast by the other surrounding electronic devices during the operation of the direct connection app. The broadcasting information collection unit 83 can provide the broadcasting information to the device analysis unit 85. The broadcasting information can include wireless environment information between the other electronic device and the electronic device 100, service information to be performed by the other electronic devices, or identification information of the other electronic devices. The broadcasting information collection unit 83 can apply any one of a plurality of relation methods to the broadcasting information collection operation of the other electronic devices and can collect the broadcasting information of the other electronic devices based on the corresponding relation method. Further, the broadcasting information collection unit 83 can perform at least one filter application, and can collect the broadcasting information of the other electronic devices based on the applied filter.

For example, the device analysis unit 85 can analyze the wireless environment with the other electronic devices using the broadcasting information of the other electronic devices provided by the broadcasting information collection unit 83. For example, the device analysis unit 85 can analyze information on received signal strength, an error occurrence rate, or a distance using the broadcasting information provided by the other electronic devices. According to an embodiment, the distance analysis can be performed through the received signal strength. Further, the distance analysis can be performed through collection of the position information from the other electronic devices. The device analysis unit 85 can provide the analysis results to the app operation unit 81.

The app operation unit 81 can select the other electronic device based on the analysis results provided by the device analysis unit 85 in executing the direct connection app. For example, the app operation unit 81 can transmit predetermined data to the other electronic device that is positioned over a predetermined distance among the other electronic devices. Further, the app operation unit 81 can select the other electronic device that is positioned within a predetermined distance, the other electronic device having movement that is lower than or higher than the predetermined level, the other electronic device having the received signal strength that is higher than or lower than a predetermined level, or the other electronic device having a bit error rate that is higher than or lower than a predetermined value.

According to various embodiments, the electronic device (e.g., 100 or 100-1) can include a communication module that transmits and receives data based on the wireless communication, and a control module 160 that selects the at least one of the other electronic devices searched in relation to the communication channel formation based on the communication module or determines the communication connection sequence of the plurality of other electronic devices.

According to various embodiments, the control module 160 can select the at least one of the plurality of other electronic devices or determine the communication connection sequence of the plurality of other electronic devices based on at least one of a received signal strength with the plurality of other electronic devices, a transmitted and received data error rate with the plurality of other electronic devices, a distance with the plurality of other electronic devices, a Quality of Service (QoS) with the plurality of other electronic devices, whether the plurality of other electronic devices move, whether the electronic device itself moves, and a history before the communication connection.

According to various embodiments, the control module 160 can differently set a weight value of at least one of the received signal strength, the data error rate, the distance, the QoS, the history before the communication connection, and movement of the plurality of other electronic devices or the electronic device itself according to a kind of a currently activated application.

According to various embodiments, the electronic device (e.g., 100 or 100-1) can further include a position information collection module that collects current position information, and the control module 160 can calculate distances between the electronic device and the plurality of other electronic devices through the comparison of the current position information with position information of the plurality of electronic devices.

According to various embodiments, when a specific app is activated, the control module 160 can perform communications connection with the other electronic devices positioned over a predetermined distance.

According to various embodiments, if movement of the electronic device is detected while a specific app is activated, the control module 160 can perform communication connections with the other electronic device that is in a predetermined distance.

According to various embodiments, when a specific app is activated, the control module 160 can perform communication connections with the other electronic device that has no movement and has a received signal strength that is equal to or greater than a preset value among the plurality of other electronic devices.

According to various embodiments, when a specific app is activated, the control module 160 can re-perform surrounding search according to a predetermined period. In this case, if the received signal strengths of the other electronic devices are changed, the control module 160 can release the communication connection with the other previous electronic device and can perform communication connections with the other electronic device having a received signal strength that is equal to or greater than the preset value.

According to various embodiments, the electronic device (e.g., 100 or 100-1) can further include at least one filter that selects at least one piece of data that is transmitted or received with the other electronic device based on previously input filter information.

According to various embodiments, the control module 160 can further include at least one of a filter-based data processing module that selects a specific filter according to at least one of a time, a place, and the other electronic devices to be connected for communication, and a relation-based data processing module that divides specific information into data pieces, sequentially broadcasts the data pieces to the selected other electronic devices, and provides a specific event or content to the other electronic devices that sequentially respond to the sequential broadcast or respond to at least a part of the data pieces.

According to various embodiments, there is provided a storage medium that is readable by a machine that stores commands, which are set to make at least one processor perform at least one operation when the at least one processor executes the commands, wherein the at least one operation includes: at least one of a first data processing operation to select at least one of a plurality of other electronic devices which are searched using wireless communication based on predefined conditions, to determine a communication connection sequence of the plurality of other electronic devices, and to transmit data to the at least one of the plurality of other electronic devices based on at least one of the selection or the communication connection sequence; a second data processing operation to select a specific filter according to at least one of a time, a place, and the other electronic devices to be connected for communication to transmit the data and to select at least one piece of the data transmitted and received through the other electronic devices based on filter information written in the selected specific filter; and a third data processing operation to divide specific information into data pieces, to sequentially broadcast the data pieces to the selected other electronic devices, and to provide a specific event or content to the other electronic devices that sequentially respond to the sequential broadcast or respond to at least a part of the data pieces.

Figure 16:
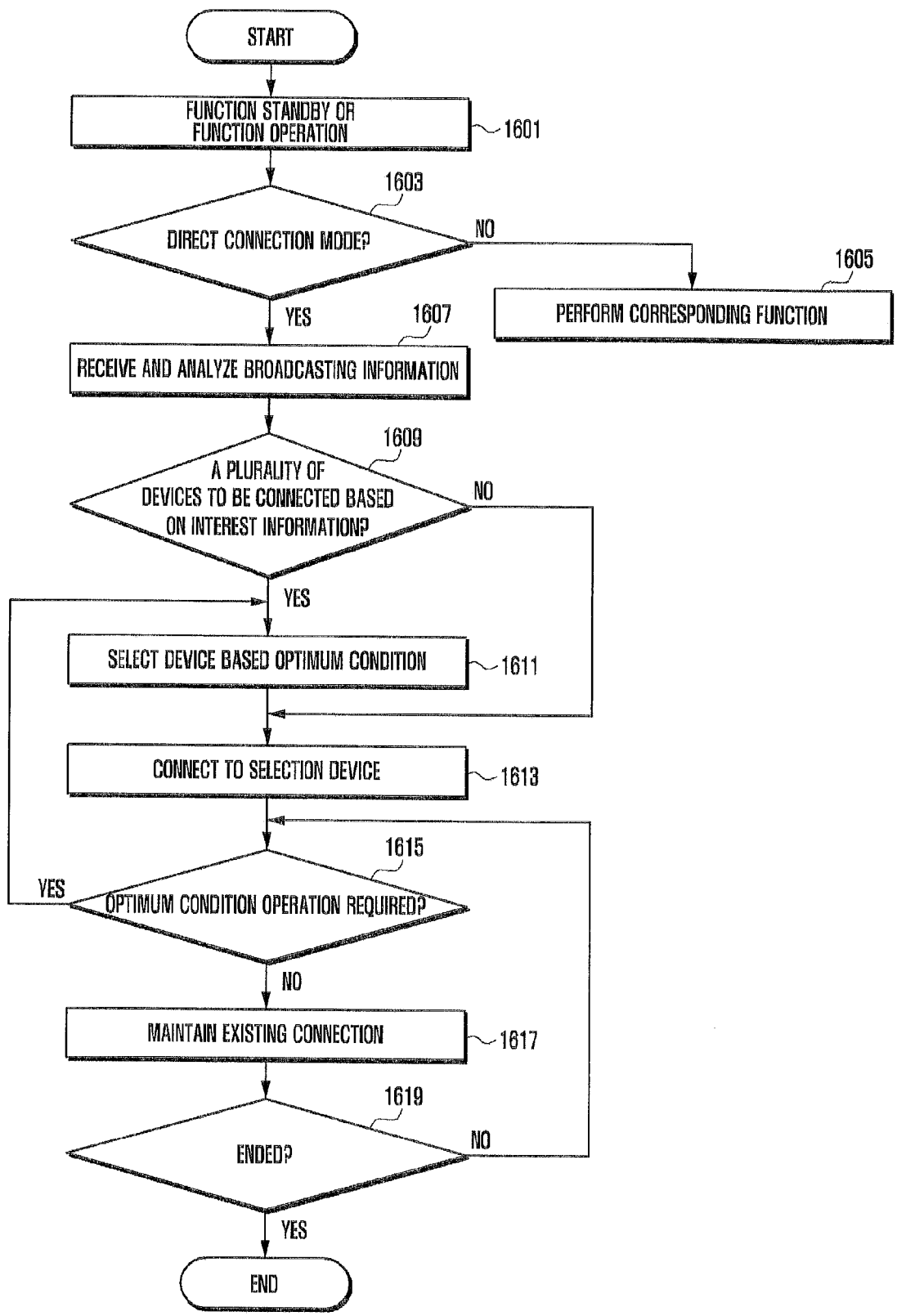
FIG. 16 is a flowchart illustrating an optimum condition data processing operation according to various embodiments.

FIG. 16 is a flowchart illustrating an optimum condition data processing method according to various embodiments. The optimum condition data processing method illustrated in FIG. 16 can be applied to at least one of the electronic devices that are described according to various embodiments.

Referring to FIG. 16, according to the optimum condition data processing method according to various embodiments of the present disclosure, at operation 1601, for example, the control module 160 of the electronic device 100 can be in a function standby state. Further, at operation 1601, for example, the control module 160 of the electronic device 100 can be in a function operation state. According to various embodiments, the control module 160 can operate to output a standby screen to the display module 140. The control module 160 can control a specific function that is set by the schedule information or specific function operation according to a user's request.

According to an embodiment, if a specific event is generated, at operation 1603, for example, the control module 160 can confirm whether the specific event is an event that is related to an entrance of a direct connection mode. At this operation, if the specific event is not the event that is related to the entrance of the direct connection mode, at operation 1605, for example, the control module 160 can perform a function according to the kind or characteristics of the generated event. For example, the control module 160 can control a specific app operation according to the generated event.

At operation 1603, if an event that is related to the entrance of the direct connection mode, for example, an event that is related to selection of a direct connection app, is generated, at operation 1607, for example, the control module 160 can perform broadcasting information reception control and analysis. According to an embodiment, the electronic device 100 can be in a state where the electronic device 100 has entered in a predetermined range in which the other electronic devices are arranged. The other electronic devices can be in a state where they broadcast specific broadcasting information in real time or in a predetermined period. Accordingly, the electronic device 100 can collect broadcasting information broadcast by the other electronic devices.

At operation 1607, the control module 160 can extract data that is written as the broadcasting information. The control module 160 of the electronic device 100 can confirm what data is written as the broadcasting information. The control module 160 can confirm whether the data has relation to interest information related to the direct connection app operation. The interest information can include an app kind of the direct connection app, app name, or specific data related to app operation. For example, in a case where a part of the extracted data is a specific word, such as "A game" and the interest information is also "A game", the control module 160 can determine the other electronic device that provides data called "A game" as the other electronic device to be connected based on the interest information.

At operation 1609, for example, the control module 160 can confirm whether a plurality of other electronic devices are provided to be connected based on the interest conformation. If a plurality of electronic devices are searched, at operation 1611, for example, the control module 160 can select the device based on the optimum condition. At the optimum condition based device selection operation, the control module 160 can consider at least one predefined reference elements. For example, the control module 160 can consider a Received Signal Strength (RSS), a distance d between the electronic device and the other electronic device, a Bit Error Rate (BER), and a channel Quality of Service (QoS) as reference elements. For example, the RSS can be calculated from the level of the response signal of the other electronic device to the signal broadcast by the electronic device itself or the level of the signal broadcast by the other electronic device. The distance with the other electronic device can be calculated based on the distance of the current electronic device 100 and the position information of the other electronic device. The BER can be an error rate of the data that is transmitted or received through the currently connected channel. The channel QoS can be a service quality of the currently connected channel.

According to an embodiment, the control module 160 can consider a weight of at least one item among the reference elements based on the following equation:

$$\text{Weight}=\text{RSS}*\alpha+d*\beta+\text{BER}*\gamma+\text{QoS}*\delta$$

where, $\alpha$, $\beta$, $\gamma$, and $\delta$ can be constant weights. The respective weights can be $0 \leq \alpha < 1$, $0 \leq \beta < 1$, $0 \leq \gamma < 1$, and $0 \leq \delta < 1$. For example, the control module 160 can further consider additional elements, for example, movement of the electronic device 100, movement of the other electronic device, previous connection history, whether the device is a device that is registered in a phone book, and whether the device is a device that is registered in schedule information, in addition to the above-described elements. Further, the electronic device 100 can change the references or change the weights to correspond to what application a user currently operates to discriminate the optimum condition, what information is shared, what information and content is desired to be shared, how the current channel situation, or whether an opposite party or device is in a stop state or in a moving state. For example, the electronic device 100 can change the reference or weight for selecting the device of the optimum condition in relation to the situation, and can automatically perform communication connections with the other electronic device of the optimum condition that is selected according to the application of the corresponding reference and weight.

According to an embodiment, the control module 160 can consider the weight to correspond to the kind of direct connection app with respect to the above-described elements. Further, the control module 160 can differently consider the weight to correspond to the current time or place with respect to the above-described elements. For example, the control module 160 can set the weight of the distance value with the other electronic device relatively low in downtown areas. According to various embodiments, in the suburbs, such as an open land or an open field, the control module 160 can set the weight of the RSS relatively high in comparison to the downtown areas. Further, in the suburbs, such as an open land or an open field, the control module 160 can set the weight of the RSS relatively high in comparison to the downtown areas, whereas in the downtown areas, the control module 160 sets the weight of the RSS relatively low in comparison to the open land or open field. The discrimination between the downtown areas and the suburbs can be acquired from administrative district information that is defined on an e-map. According to various embodiments, the weight discrimination for the RSS can be applied as the degree of population distribution residing in a predefined unit area.

According to various embodiments, a data transmission and reception method using wireless communication can include searching other electronic devices based on wireless communication; processing selection of at least one of the plurality of other electronic devices which are searched based on predefined conditions or determination of a communication connection sequence of the plurality of other electronic devices; and performing communication connection with the selected one of the plurality of other electronic devices or the specific one of the plurality of other electronic devices according to the determined communication connection sequence and performing transmission and reception of data.

According to various embodiments, the processing can include collecting at least one piece of information of a received signal strength with the plurality of other electronic devices, a transmitted and received data error rate with the plurality of other electronic devices, a distance with the plurality of other electronic devices, a Quality of Service (QoS) with the plurality of other electronic devices, whether the plurality of other electronic devices move, whether the electronic device itself moves, and a history before the communication connection; and selecting the other electronic devices or determining the communication connection sequence of the plurality of other electronic devices based on the collected information.

According to various embodiments, the processing can further include differently setting a weight value of at least one of the received signal strength, the data error rate, the distance, the QoS, the history before the communication connection, and the movement of the plurality of other electronic devices or the electronic device itself according to a kind of a currently activated application.

According to various embodiments, the processing can includes performing, when a specific application is activated, communication connection with the other electronic device that is in the farthest distance among the plurality of other electronic devices; or performing, when the specific application is activated, communication connection with the other electronic devices that are in the distance that is farther than a predefined reference value among the plurality of other electronic devices.

According to various embodiments, the processing can include performing, if movement of the electronic device is detected while a specific application is activated, communication connection with the other electronic device that is in the shortest distance among the plurality of other electronic devices; or performing, if the movement of the electronic device is detected while the specific application is activated, communication connection with the other electronic device that is in the relatively shorter distance among the plurality of other electronic devices.

According to various embodiments, the processing can include performing, when a specific application is activated, communication connection with the other electronic device that has no movement and has the strongest or relatively stronger received signal strength among the plurality of other electronic devices; or performing, when the specific application is activated, communication connection with the other electronic device that has no movement and has a relatively stronger received signal strength among the plurality of other electronic devices.

According to various embodiments, the processing can further include re-performing, when a specific application is activated, peripheral search according to a predetermined period, and if the received signal strength of the at least one of the plurality of other electronic devices is changed, releasing the communication connection with the previous other electronic device, and performing the communication connection with the other electronic device having the strongest or relatively stronger received signal strength among the plurality of other electronic devices.

According to various embodiments, the processing can further include at least one of selecting a specific filter according to at least one of a time, a place, and the other electronic devices to be connected for communication, and selecting at least one piece of data transmitted and received with the other electronic devices based on filter information written in the selected specific filter; and dividing specific information into data pieces, sequentially broadcasting the data pieces to the selected other electronic devices, and providing a specific event or content to the other electronic devices that sequentially respond to the sequential broadcast or respond to at least a part of the data pieces.

Figure 17:
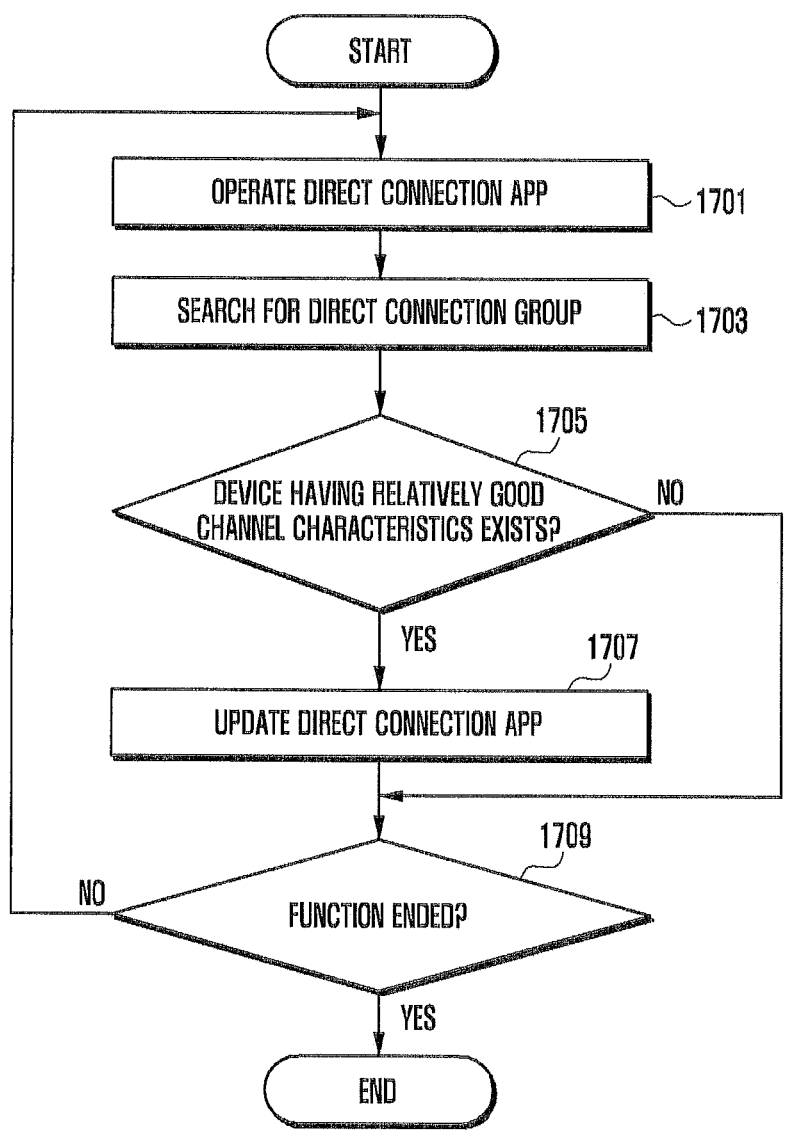
FIG. 17 is a flowchart illustrating an optimum condition data processing operation based on channel characteristics according to various embodiments.

FIG. 17 is a flowchart illustrating an optimum condition data processing method based on channel characteristics according to various embodiments. The optimum condition data processing method illustrated in FIG. 17 can be applied to at least one of the electronic devices according to various embodiments as described above.

Referring to FIG. 17, at operation 1701, for example, if a request related to direct connection app operation is generated, the control module 160 of the electronic device can perform direct connection app operation. For example, at operation 1703, the control module 160 can search a direct connection group. The electronic device 100 can be arranged in a predetermined range in which at least one of the other electronic devices is arranged. At operation 1703, for example, the control module 160 can receive broadcasting information broadcast by the other electronic devices. The control module 160 can analyze the received broadcasting information. At operation 1705, for example, the control module 160 can confirm whether a device having good channel characteristics exists in comparison to the device that forms the current channel. If the device having good channel characteristics exists, at operation 1707, for example, the control module 160 can update the direct connection app. According to an embodiment, the control module 160 can perform communication connections with the other electronic device having good channel characteristics in relation to the direct connection app operation.

At operation 1709, for example, the control module 160 can confirm whether an event related to a function end is generated. If the event related to the function end is not generated, the control module 160 is branched to an operation prior to operation 1701 to re-perform the following operation. As an example, at operation 1705, the control module 160 can maintain the previous communication connection if there is no device in which the channel characteristics better than those of the previous device are formed.

Figure 18:
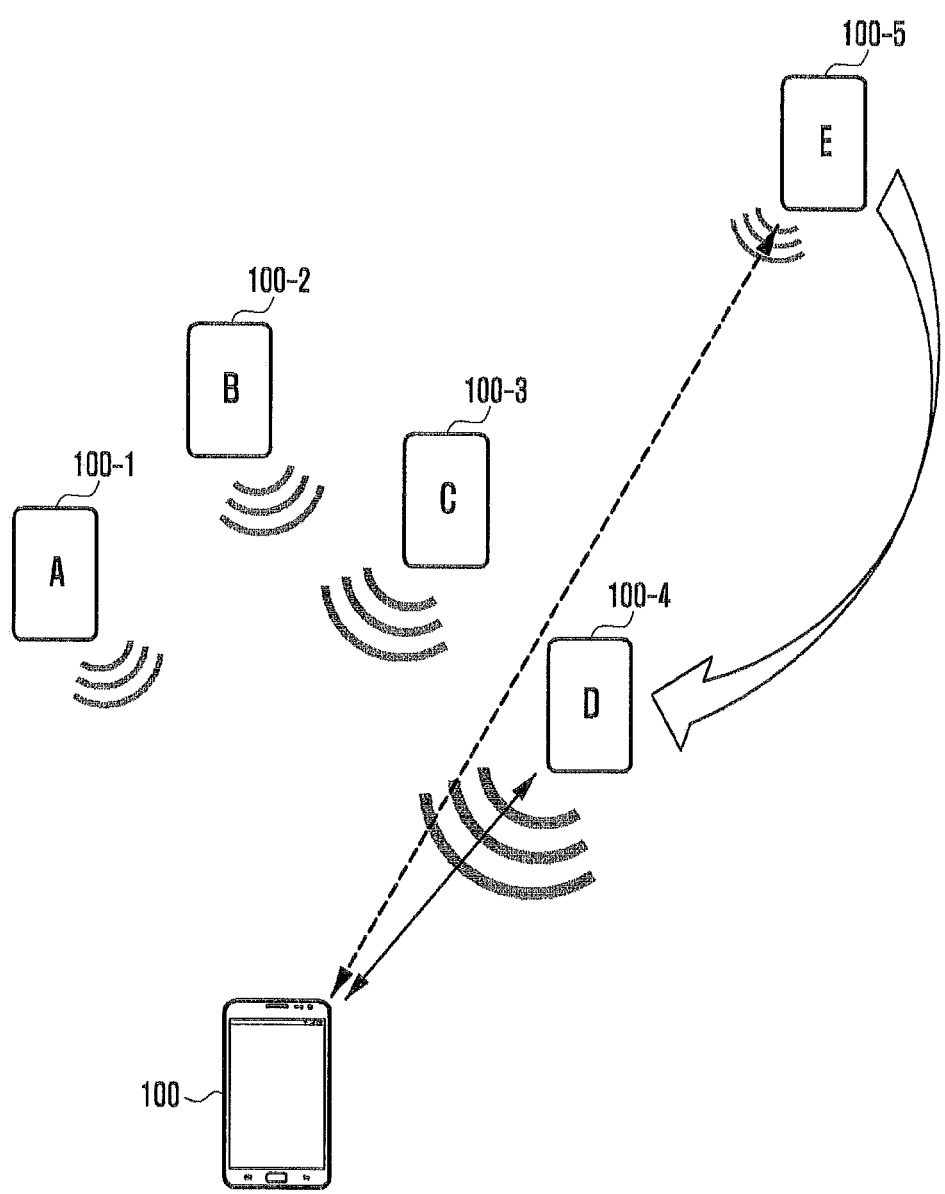
FIG. 18 is a diagram explaining optimum condition data processing according to channel characteristics, for example, BER characteristics, according to various embodiments.

FIG. 18 is a diagram explaining optimum condition data processing according to channel characteristics, for example, BER characteristics, according to various embodiments.

In the following description, electronic devices 100, 100-1, 100-2, 100-3, 100-4, and 100-5 can include direct communication modules capable of directly performing wireless communication (Device to Device: D2D) without passing through a network or without the operation of a base station. The electronic devices 100, 100-1, 100-2, 100-3, 100-4, and 100-5 can be devices that include the configurations as described above with reference to FIGS. 1 and 2 or the configurations as described above with reference to FIG. 3 to 5, 11 or 15.

Referring to FIG. 18, in a state where the first to fifth electronic devices 100-1, 100-2, 100-3, 100-4, and 100-5 are arranged in a predetermined range, the electronic device 100 can enter into the predetermined range. The electronic device 100 can operate the direct connection app to correspond to a user's request or preset schedule information. When the direct connection app is operated, the electronic device 100 can perform app operation based on the communication connection with, for example, the fifth electronic device 100-5. According to an embodiment, the direct connection app that is executed by the first electronic device 100-1, the fourth electronic device 100-4, and the fifth electronic device 100-5 can be a game app that is performed based on the direct connection. The direct connection app that is executed by the second electronic device 100-2 and the third electronic device 100-3 can be a file search and sharing app.

As an example, the electronic device 100 can receive the broadcasting information from the other electronic devices in the direct connection app performing operation, and based on this, can check the specific channel characteristics, for example, BER characteristics. For example, the electronic device 100 can omit the BER check of the second electronic device 100-2 and the third electronic device 100-3 that executes a different direct connection app.

Figure 19:
FIG. 19 is a diagram illustrating BER characteristics formed between other electronic devices according to various embodiments.

FIG. 19 is a diagram illustrating BER characteristics formed between other electronic devices according to various embodiments.

Referring to FIG. 19, the electronic device 100 of FIG. 18 can release the direct communication connection with the fifth electronic device 100-5 based on the BER characteristic check results. The electronic device 100 can connect direct communication with the fourth electronic device 100-4. The electronic device 100 can operate a game app that is a direct connection app with the fourth electronic device 100-4.

The electronic device 100 can provide a scheduled time to check the other electronic devices. For example, if a predetermined page (phase) is ended and a new page is generated in performing the game, the electronic device 100 can switch the connection based on the BER characteristics. Further, if a user ends the game page that is currently performed, but continuously requests the game performance, the control module 160 of the electronic device 100 can perform search and connection of the other electronic devices based on the BER characteristics.

Figure 20:
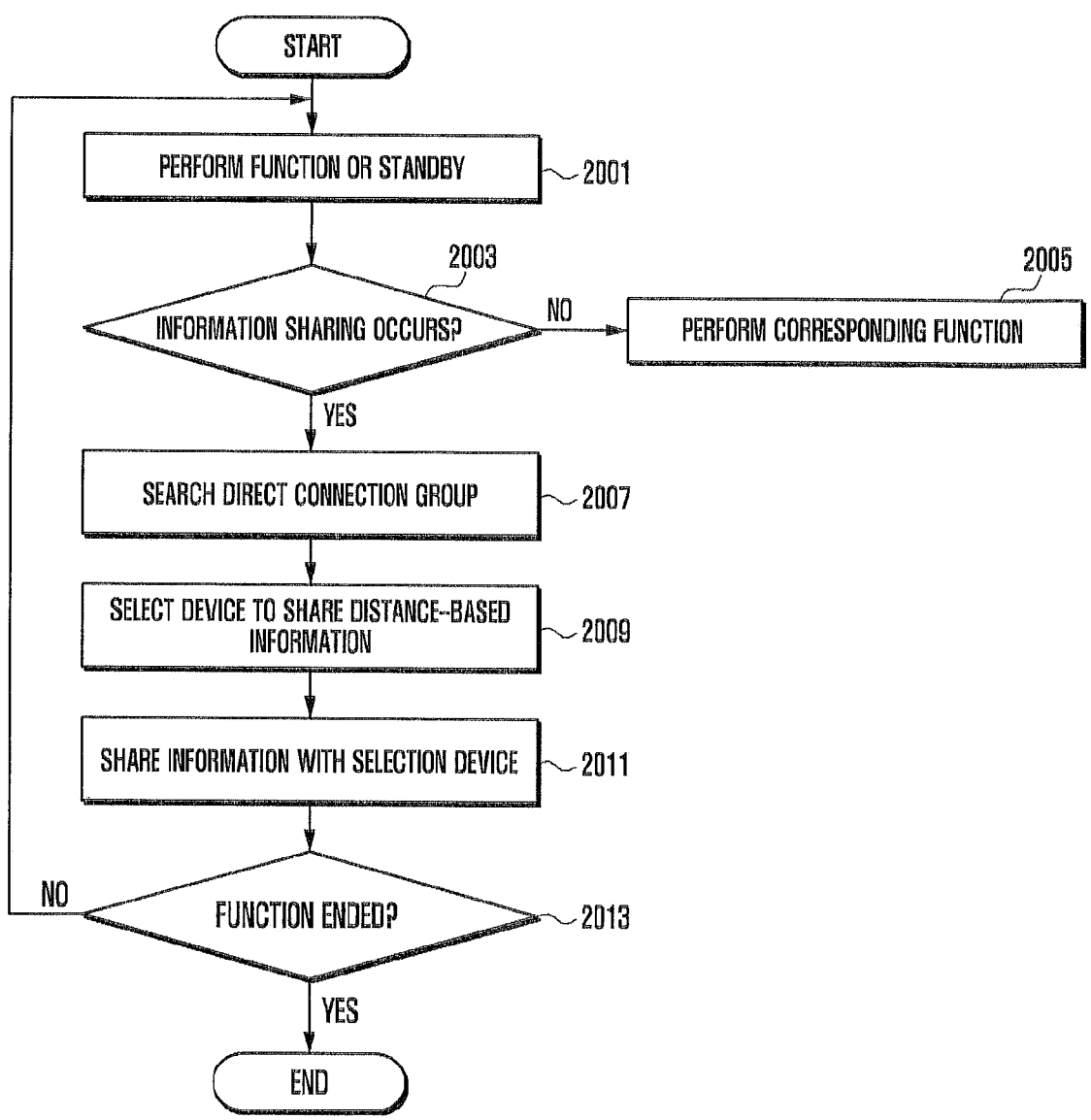
FIG. 20 is a flowchart illustrating an optimum condition data processing operation based on a distance according to various embodiments.

FIG. 20 is a flowchart illustrating an optimum condition data processing method based on a distance according to various embodiments. The distance-based optimum condition data processing method illustrated in FIG. 20 can be applied to at least one of the electronic devices that are described according to various embodiments.

Referring to FIG. 20, at operation 2001, for example, the control module 160 of the electronic device 100 can control specific function performance or function standby. For example, the control module 160 can support the music reproduction or broadcast viewing function to correspond to the user's request.

At operation 2003, for example, the control module 160 can confirm whether direct connection based information sharing occurs. If the corresponding information sharing does not occur, at operation 2005, for example, the control module 160 can perform the previous function or the function according to the user's input. According to an embodiment, the information sharing can occur through a menu selection for a user to share a specific message with the other electronic devices. Further, the information sharing can occur when a menu, which is set to share the message that is received from the other electronic device with the still other electronic device, is selected. Further, the information sharing can occur when a menu is selected to share an alarm that is generated to correspond to the schedule information predefined by the electronic device 100 or schedule information with the other electronic device. In a case of a specific message, the information sharing can be automatically requested without selecting a user menu. For example, in a case where an emergency button that is set to notify of the occurrence of an emergency situation is selected and a corresponding message is generated, the information sharing function can be automatically performed.

At operation 2003, if a direct connection based information sharing request occurs, at operation 2007, for example, the control module 160 can search the direct connection group. The electronic device 100 can be positioned in a predetermined range in which at least one of the other electronic devices is positioned. The electronic device 100 can collect the broadcasting information broadcast by the other electronic devices and analyze the corresponding information. The control module 160 of the electronic device 100 can calculate the distances between the electronic device 100 and the other electronic devices based on the received broadcasting information. In an embodiment, the broadcasting information provided by the other electronic devices can include position information of the other electronic devices themselves. In an embodiment, the control module 160 of the electronic device 100 can request the other electronic devices to provide the position information of the respective devices. For example, the control module 160 can broadcast the data for requesting the position information to the other electronic devices.

If the distances between the electronic device 100 and the other electronic devices are calculated, at operation 2009, for example, the control module 160 can select a device to share the information based on the calculated distances. In various embodiments, at operation 2009, the control module 160 can select the other electronic device that is in the farthest distance from the electronic device 100. Further, at operation 2009, the control module 160 can select the other electronic device that is in the shortest distance from the electronic device 100. Further, at operation 2009, the control module 160 can select the other electronic device whereby the distance between the electronic device and the other electronic device is longer than or shorter than a predefined distance or maintains a predetermined distance.

If the other electronic device is selected, at operation 2011, for example, the control module 160 can share the information with the selection device. According to various embodiments, the control module 160 can transmit the information that is generated at operation 2003 to the selected other electronic device. At operation 2013, for example, the control module 160 can confirm whether an event that is related to the function end is generated. If an event related to a separate function end is not generated, the control module 160 is branched to a state that is prior to operation 2001 to re-perform the following operation.

Figure 21:
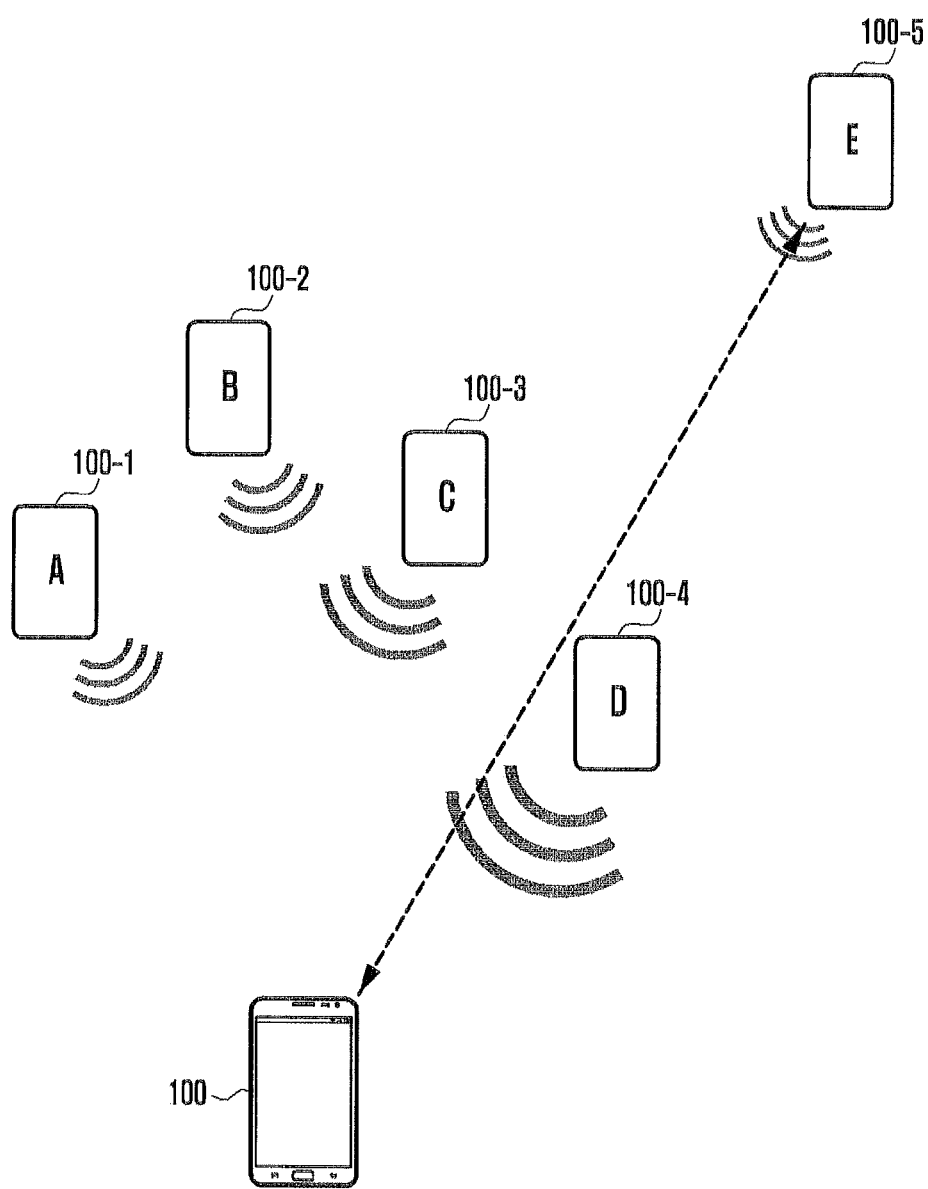
FIG. 21 illustrates an optimum condition data processing situation based on a distance according to various embodiments.

FIG. 21 is a diagram explaining an optimum condition data processing situation based on a distance according to various embodiments.

In the following description, electronic devices 100, 100-1, 100-2, 100-3, 100-4, and 100-5 can be devices that include direct communication modules capable of directly performing wireless communication (Device to Device: D2D) without passing through a network or without the operation of a base station. The electronic devices 100, 100-1, 100-2, 100-3, 100-4, and 100-5 can be devices that include the configurations as described above with reference to FIGS. 1 and 2 or the configurations as described above with reference to FIG. 3 to 5,11 or 15.

Referring to FIG. 21, in a state where the first to fifth electronic devices 100-1, 100-2, 100-3, 100-4, and 100-5 are arranged, the electronic device 100 can generate information to be shared with at least one of the other electronic devices. For example, in a predetermined position related to the electronic device 100, an emergency situation, such as traffic accident or fire, can occur. According to various embodiments, the electronic device 100 can request execution of the information sharing function using the prepared message. At this operation, the electronic device 100 can store predefined messages to be used for the information sharing function with respect to the generation of an emergency situation. The electronic device 100 can output the predefined message to the display module 140 in response to the user's request. The user can select a message that matches the current situation among the messages output to the display module 140, prepare a new message, or correct the selected message.

According to an embodiment, if an information sharing function execution request is generated, the electronic device 100 can activate the direct communication module 110. The other electronic devices can provide the broadcasting information that includes position information as a default to the electronic device 100. Further, the other electronic devices can receive the broadcasting information providing request that include the position information from the electronic device 100. The other electronic devices having received the request can transmit the broadcasting information that includes position information thereof to the electronic device 100 in the broadcasting information transmitting operation. If the broadcasting information that includes the position information is received, the electronic device can calculate the distances with the other electronic devices.

FIG. 22 is a diagram illustrating the results of distance calculation according to various embodiments. Hereinafter, in explaining FIG. 22, it is exemplified that the electronic devices are the electronic devices in FIG. 21.

Referring to FIG. 22, it can be seen that the fifth electronic device 100-5 in FIG. 21 is positioned in the farthest distance from the electronic device 100. In FIG. 21, the electronic device 100 can select the fifth electronic device 100-5 and can perform communication connections with the fifth electronic device 100-5 based on the direct communication module 110. The electronic device 100 can transmit a message that is generated in relation to the information sharing to the fifth electronic device 100-5. According to an embodiment, the electronic device 100 can perform communication connections with the closest electronic device, for example, the fourth electronic device 100-4 in FIG. 21 and can transmit the message. According to an embodiment, the selection of the electronic device can be performed with respect to the specific electronic device that is in a predetermined distance as described above. For example, if it is set to perform information sharing with an electronic device that is in the distance of about 30 m when an emergency situation occurs, the electronic device 100 can perform communication connections with the second electronic device 100-2 in FIG. 21, and can transmit a message to the second electronic device 100-2.

Figure 23:
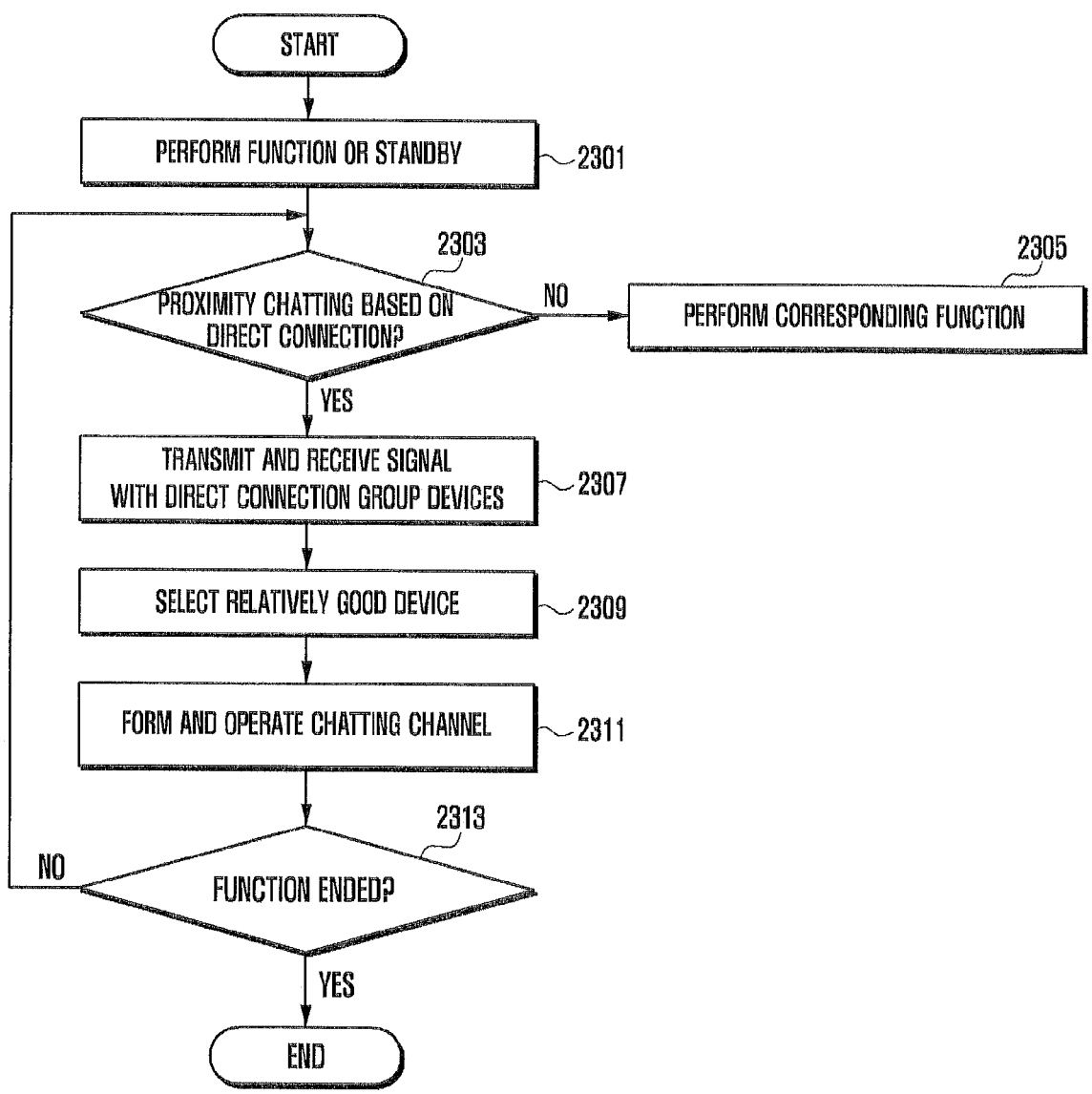
FIG. 23 is a flowchart illustrating an optimum condition data processing operation based on reception strength according to various embodiments.

FIG. 23 is a flowchart illustrating an optimum condition data processing operation based on reception strength according to various embodiments. The reception strength based optimum condition data processing method illustrated in FIG. 23 can be applied to at least one of the electronic devices that are described according to various embodiments.

Referring to FIG. 23, at operation 2301, for example, the control module 160 of the electronic device 100 can perform specific function performance or function standby. If a specific event is generated, at operation 2303, for example, the control module 160 can confirm whether the generated event is an event related to proximity chatting based on the direct connection. According to various embodiments, the electronic device 100 can provide an app that can select the proximity chatting based on the direct connection. At this operation, the electronic device 100 can output an icon or a menu item related to the corresponding app selection to the display module 140. At operation 2303, if the generated event is not an event related to the proximity chatting, at operation 2305, for example, the control module 160 can perform a function according to the kind and characteristics of the generated event. According to an embodiment, the control module 160 can support a web access function or photo reading function to correspond to the generated event characteristics.

At operation 2303, if an event that is related to activation of proximity chatting based on the direct connection is generated, at operation 2307, for example, the control module 160 can transmit and receive a signal with the direct connection group devices. According to various embodiments, the control module 160 can collect the received signal strength information based on the signal transmission and reception with the other devices. According to an embodiment, the control module 160 can activate the direct communication module 110 and can receive the broadcasting signal provided by the other surrounding electronic devices as a signal related to the detection of the received signal strength information.

At operation 2309, for example, the control module 160 can select the other electronic devices having good signal strength. At operation 2311, for example, the control module 160 can form a chatting channel through performing of communication connection with the selected device, and can control the proximity chatting according to the user's request. If a specific event is generated, at operation 2313, for example, the control module 160 can confirm whether the specific event is input event related to the function end. If the specific event is not the event related to the function end, the control module 160 can be branched to the previous operation of the operation 2303, and can re-perform the following operation.

Figure 24:
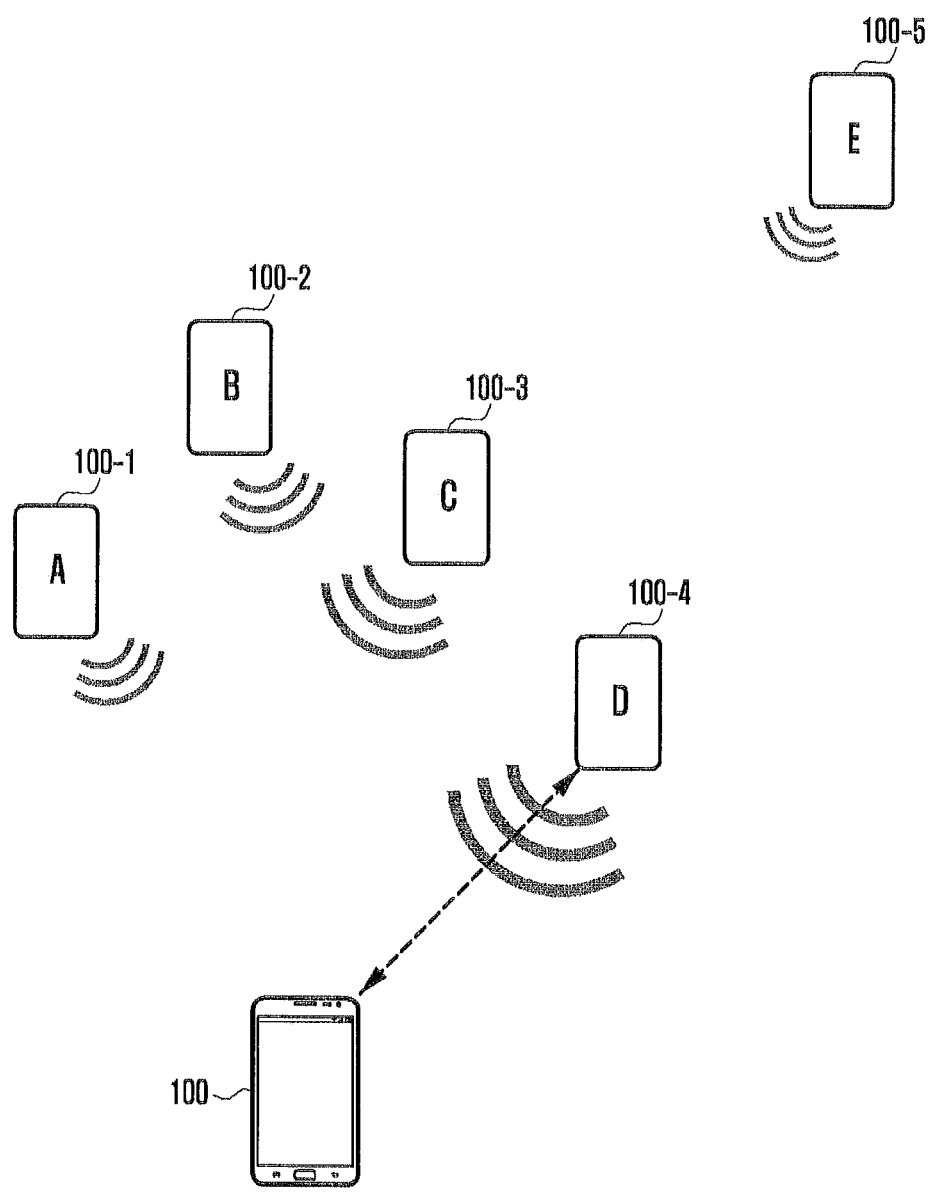
FIG. 24 is a diagram explaining an optimum condition data processing situation based on signal strength according to various embodiments.

FIG. 24 is a diagram explaining optimum condition data processing based on signal strength, according to various embodiments.

In the following description, electronic devices 100, 100-1, 100-2, 100-3, 100-4, and 100-5 can be devices that include direct communication modules capable of directly performing wireless communication (Device to Device: D2D) without passing through a network or without the operation of a base station. The electronic devices 100, 100-1, 100-2, 100-3, 100-4, and 100-5 can be devices that include the configurations as described above with reference to FIGS. 1 and 2 or the configurations as described above with reference to FIG. 3 to 5, 11 or 15.

Referring to FIG. 24, the first to fifth electronic devices 100-1, 100-2, 100-3, 100-4, and 100-5 can be arranged in a predetermined range. For example, the first to fifth electronic devices 100-1, 100-2, 100-3, 100-4, and 100-5 can be devices that are positioned in a communicable distance based on the direct communication module 110. the electronic device 100 can be arranged in a position in which the electronic device 100 can communicate with the first to fifth electronic devices 100-1, 100-2, 100-3, 100-4, and 100-5.

According to an embodiment, the electronic device 100 can be requested by a user to perform activation of proximity chatting based on the direct connection. The proximity chatting based on the direct connection can be a service that can transmit or receive a chatting message based on the direct communication module 110. The electronic device 100 can broadcast information that guides that the proximity chatting based on the direct connection is currently operated to the other electronic devices. For example, the first to fifth electronic devices 100-1, 100-2, 100-3, 100-4, and 100-5 can be in a state where they broadcast interest information defined by users. In an embodiment, as described above, the interest information can include various pieces of information, such as game app participation application information, game app participation request information, specific music content search information, specific music possession information, traffic confirmation information, and device matching confirmation information.

FIG. 25 is a diagram illustrating the results of received signal strength between an electronic device and other electronic devices according to various embodiments. It is exemplified that the electronic devices illustrated in FIG. 25 are electronic devices illustrated in FIG. 24.

Based on that as exemplified in FIG. 25, the first electronic device 100-1, the third electronic device 100-3, the fourth electronic device 100-4, and the fifth electronic device 100-5 in FIG. 24 can operate proximity chatting based on the direction connection, and can broadcast related broadcasting information. According to an embodiment, the second electronic device 100-2 in FIG. 24 can broadcast broadcasting information related to local Social Network Service (SNS) operation. Here, local SNS can be a service based on communication using a base station and a server. If the electronic device 100 requests proximity chatting participation based on the direction connection, the first electronic device 100-1, the third electronic device 100-3, the fourth electronic device 100-4, and the fifth electronic device 100-5, which operate proximity chatting, can transmit corresponding response signals to the electronic device 100.

For example, the electronic device 100 can receive the broadcasting information from the first to fifth electronic devices 100-1, 100-2, 100-3, 100-4, and 100-5 as response signals. The electronic device 100 can collect received signal strength information based on the response signals of the first to fifth electronic devices 100-1, 100-2, 100-3, 100-4, and 100-5. The electronic device 100 can select the fourth electronic device 100-4 having the received signal strength that is higher than a predetermined level, for example, having the best received signal strength. The electronic device 100 can support the proximity chatting based on the direct connection with the fourth electronic device 100-4. According to an embodiment, if the interest information differs although the received signal strength of the second electronic device 100-2 is best, the electronic device 100 may not attempt the communication connection with the corresponding device. According to various embodiments, the electronic device 100 can perform connection of the proximity chatting based on the direct connection even with another electronic device in the order of received signal strength. Further, the electronic device 100 can operate to maintain only the communication connection with the fourth electronic device 100-4.

As described above, during the operation of the specific direct connection app, the communication connection of the electronic device 100 with the other electronic devices based on the received signal strength can be used in a case where proximity chatting is performed to perform direct wireless communication without passing through a base station, a server or a network, in a case where a local SNS is operated, in a case where proximity game is operated, in a case where a battery level is lower than a predetermined value, and in a case where the crowd density of the devices is higher than or lower than a predetermined level.

Figure 26:
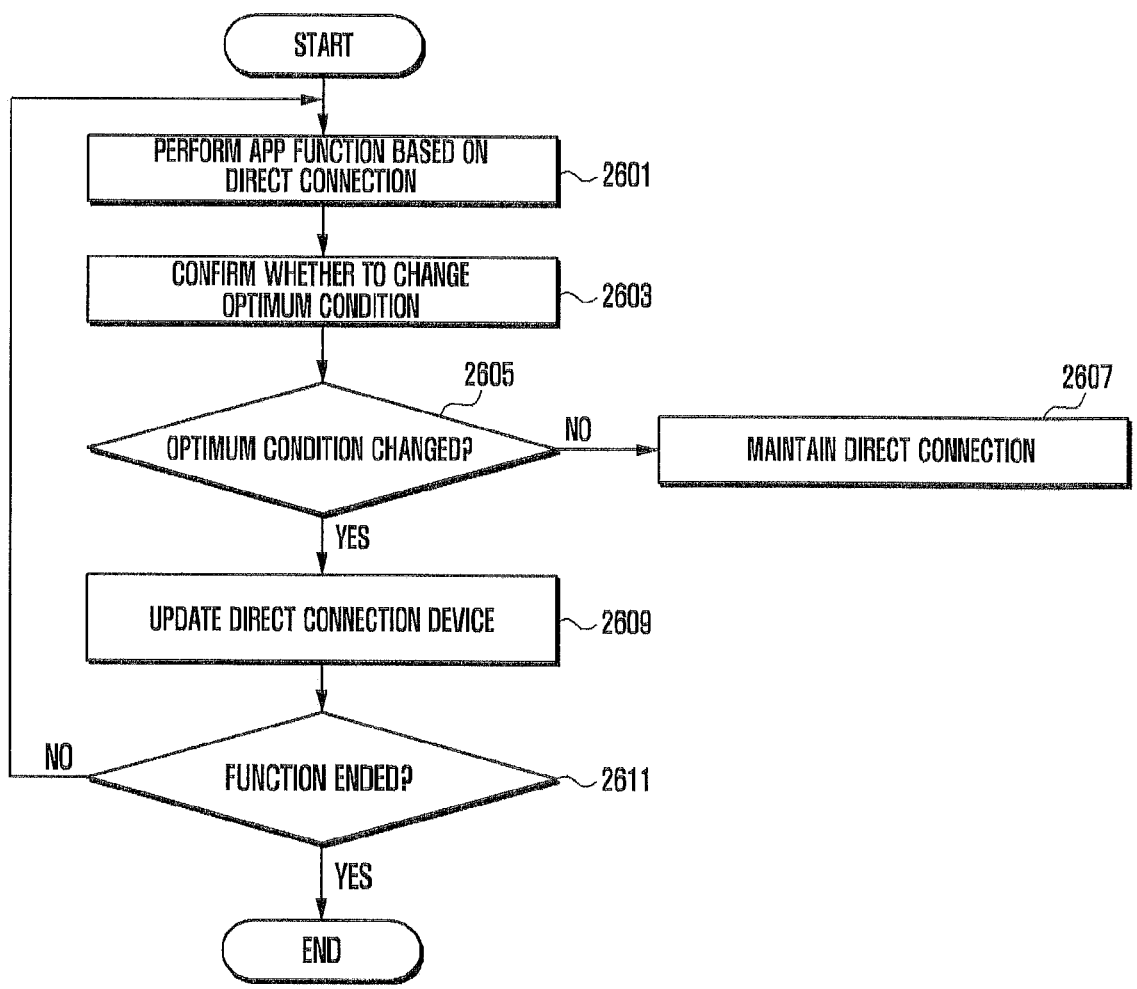
FIG. 26 is a flowchart illustrating a processing operation according to an optimum condition change according to various embodiments.

FIG. 26 is a flowchart illustrating a processing method according to an optimum condition change according to various embodiments. The processing method according to the optimum condition change as illustrated in FIG. 26 can be applied to at least one of the electronic devices that have been described according to various embodiments.

Referring to FIG. 26, according to the processing method according to the optimum condition change according to an embodiment, at operation 2601, for example, the control module 160 of the electronic device 100 can control operation of the direct connection based app to correspond to an app operation request based on the direct connection. In relation to the app operation based on the direct connection, the control module 160 can perform the communication connection based on at least one of the other electronic devices and the direct communication module 110. The control module 160 can control the operation of the direct connection app based on the communication connection.

At operation 2603, for example, the control module 160 can perform an operation that is related to the confirmation of the optimum condition change. According to an embodiment, the control module 160 can monitor broadcasting information provided by the other electronic devices. Further, the control module 160 can confirm movement of the electronic device 100. At operation 2605, for example, the control module 160 can confirm whether the optimum condition is changed. If the optimum condition change does not occur at operation 2605, for example, the control module 160 can maintain the direct connection at operation 2607.

If the optimum condition is changed at operation 2605, for example, the control module 160 can update the device that is connected to perform direct communication at operation 2606. The control module 160 can receive signals transmitted by the other electronic devices. The control module 160 can confirm the position movement of the other electronic devices based on the received signals. For example, if the received signal strengths of the other electronic devices are changed, the electronic device 100 can determined that the electronic device 100 itself or the other electronic devices move. Further, the other electronic devices can include sensors and can include movement-related sensor information in the broadcasting information to transmit the sensor information. According to an embodiment, with respect to the movement of the other electronic devices, the electronic device 100 can apply the optimum condition in various manners. The control module 160 can release the connection with the other electronic device, and can form the communication connection with the still other electronic device.

At operation 2611, for example, if an input event related to a function end occurs, the control module 160 can end the function. Further, at operation 2611, if the input event related to the function end does not occur, the control module 160 can be branched to the operation that is prior to the operation 2601 to re-perform the following operation.

Figure 27:
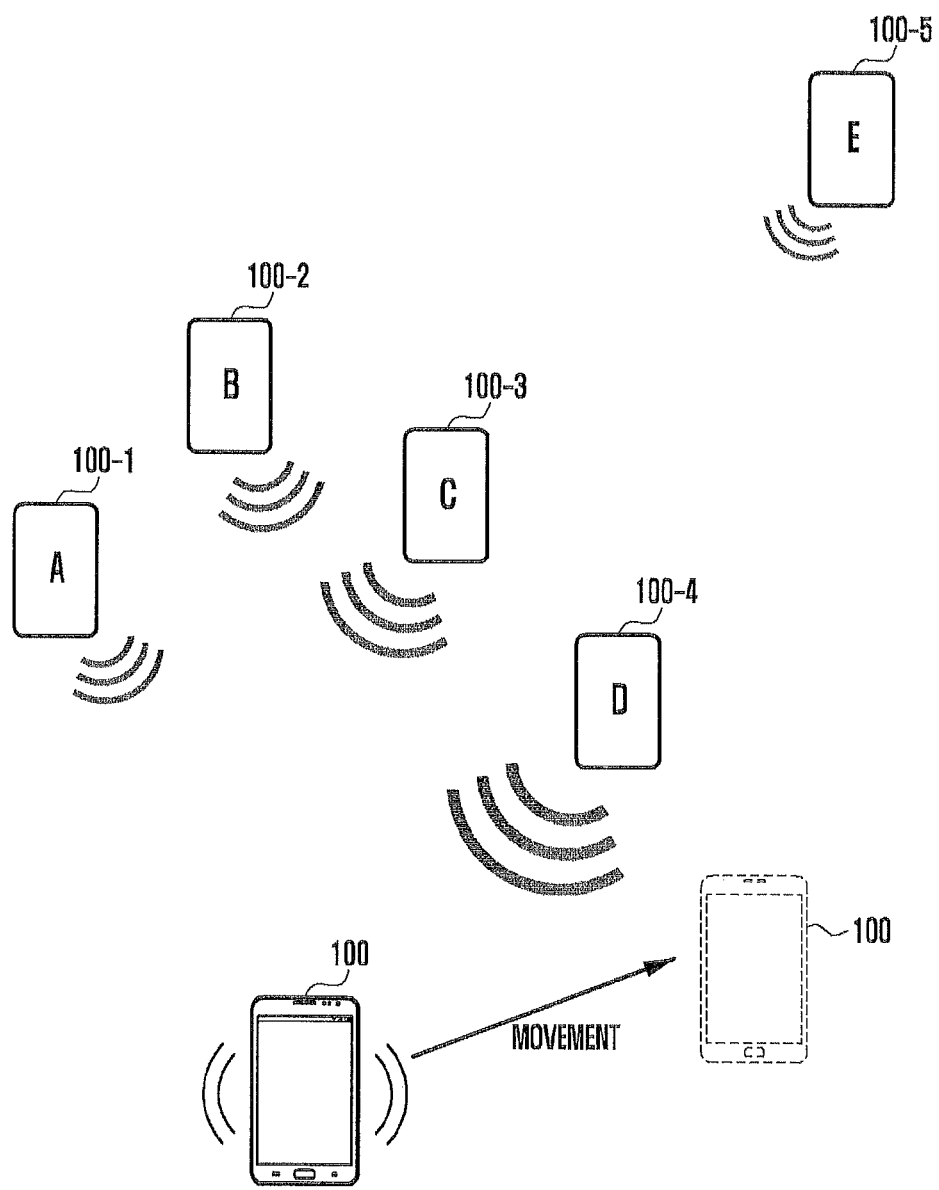
FIG. 27 is a diagram explaining a data processing operation according to an optimum condition change according to various embodiments.

FIG. 27 is a diagram explaining a data processing operation according to an optimum condition change according to various embodiments.

In the following description, electronic devices 100, 100-1, 100-2, 100-3, 100-4, and 100-5 can be devices that include direct communication modules capable of directly performing wireless communication (Device to Device: D2D) without passing through a network or without the operation of a base station. The electronic devices 100, 100-1, 100-2, 100-3, 100-4, and 100-5 can be devices that include the configurations as described above with reference to FIGS. 1 and 2 or the configurations as described above with reference to FIG. 3 to 5, 11 or 15.

Referring to FIG. 27, the first to fifth electronic devices 100-1, 100-2, 100-3, 100-4, and 100-5 can be positioned in a predetermined range, and the electronic device 100 can select any one of the other electronic devices in relation to the direct connection app operation. For example, the electronic device 500 can perform communications with the fifth electronic device 100-5 that is in the farthest distance from the position of the electronic device 100 and can transmit a message in an operation to perform information sharing to correspond to the emergency situation occurrence. According to an embodiment, the electronic device 100 can confirm whether the device moves using the sensor. If the electronic device 100 moves during performing the information sharing function to correspond to the emergency situation generation, the electronic device 100 can recognize this as the occurrence of the optimum condition change. If it is determined that the optimum condition is changed, the electronic device 100 may not select the fifth electronic device 100-5, but can select any one of the first to fourth electronic devices 100-1, 100-2, 100-3, and 100-4 to perform a communication connection. The electronic device 100 can lower the possibility that the wireless environment is changed due to the movement and the message transmission to the fifth electronic device 100-5 fails.

Figure 28:
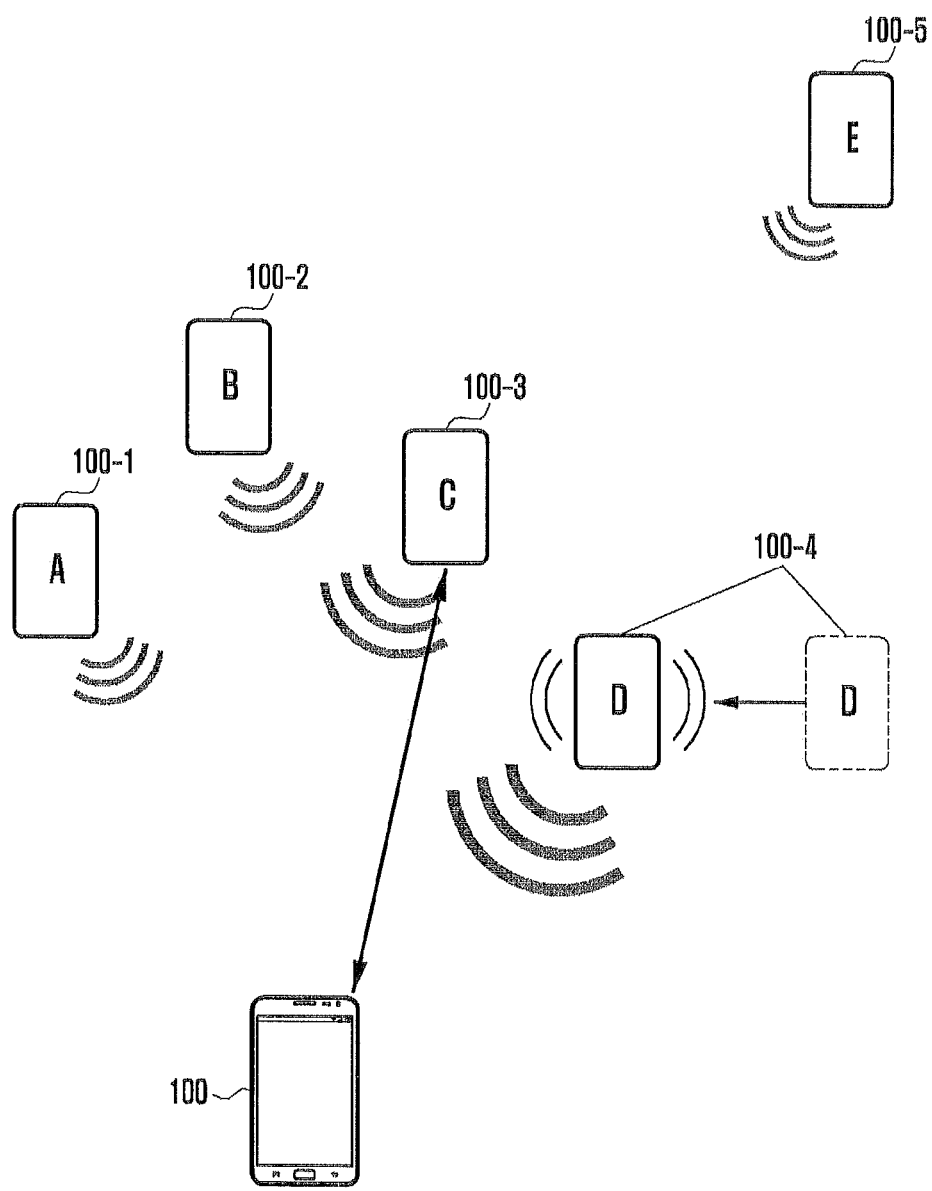
FIG. 28 is a diagram explaining another data processing operation according to an optimum condition change according to various embodiments.

FIG. 28 illustrates another data processing operation according to an optimum condition change according to various embodiments.

In the following description, electronic devices 100, 100-1, 100-2, 100-3, 100-4, and 100-5 can be devices that include direct communication modules capable of directly performing wireless communication (Device to Device: D2D) without passing through a network or without the operation of a base station. The electronic devices 100, 100-1, 100-2, 100-3, 100-4, and 100-5 can be devices that include the configurations as described above with reference to FIGS. 1 and 2 or the configurations as described above with reference to FIG. 3 to 5, 11 or 15.

Referring to FIG. 28, the first to fifth electronic devices 100-1, 100-2, 100-3, 100-4, and 100-5 can be positioned in a predetermined range, and the electronic device 100 can select any one of the other electronic devices in relation to the direct connection app operation. For example, the electronic device 100 can perform direct communication connection in relation to the received signal strength. According to the technology as described above with reference to FIG. 23, the electronic device 100 can perform communication connections with the fourth electronic device 100-4 having the best received signal strength and can transmit a message.

As an example, the electronic device 100 can monitor the other electronic devices or can receive movement information from the other electronic devices. Based on this, the electronic device 100 can analyze movement information of the other electronic devices. For example, it can be analyzed that the fourth electronic device 100-4 moves in a specific direction. For example, it can be analyzed that the third electronic device 100-3 is in a stop state. In this case, for example, the electronic device 100 can perform communication connections with the third electronic device 100-3. According to an embodiment, the third electronic device 100-3 can be a device that has no movement and has good received signal strength information in the order next to the fourth electronic device 100-4. For example, even if the fifth electronic device 100-5 is also analyzed as a device having no movement, the electronic device 100 can select the third electronic device 100-3 having better received signal strength and can perform direct communication connection with the third electronic device.

The optimum condition data processing method according to the present disclosure can support more effective data transmission and reception processing through selection of a device that satisfies a predetermined condition or the optimum condition in selectively connecting the device. The electronic device (e.g., at least one of the electronic devices 100, 100-1, and the like) according to the present disclosure can improve the resource utilization during communication between the devices through connection with the other electronic devices having the optimum condition to correspond to the situation. In a case of a direct wireless communication technology, the electronic device can continuously perform a communication with at least one neighboring device. According to various embodiments of the present disclosure, the electronic device (e.g., at least one of the electronic devices 100, 100-1, and the like) can achieve the optimization of the resources and thus can improves the corresponding power consumption. For example, the electronic device (e.g., at least one of the electronic devices 100, 100-1, and the like) can greatly lower the level of the transmission output through connection with a device that is in a short distance and has the optimum condition or a device in better wireless environment, and thus lower the power consumption.

According to various embodiments, the above-described device can further include various additional modules to correspond to the providing type. For example, if the device includes a communication function, the device can further include configurations that are not mentioned above, such as near field communication module that supports near field communication, an interface that support data transmission and reception through a wire communication method or wireless communication method of the device, an Internet communication module that performs Internet function through communication with the Internet, and a digital broadcasting module that performs digital broadcasting reception and reproduction function. Although such configurations are very diversely modified with the convergence trend of the digital device to be too manifold to enumerate, constituent elements that have the equivalent level to the level of the above-described constituent elements can be additionally included in the device. Further, the device according to the present disclosure can be partially excluded to correspond to the providing type thereof or can be replaced by another configuration. This can be easily understood by those of ordinary skill in the art to which the present disclosure pertains. Modules according to various embodiments can be hardware, firmware, software, or a combination of at least two of them.

At least a part of the operations (e.g., operations 1601 to 1613) described in the respective methods according to various embodiments can be performed successively, repeatedly, and in parallel, and a part of the above-described operations can be omitted or new operations can be added.

In the present disclosure, the term "or" include a combination of any or all of the words enumerated together. For example, "A or B" can include only A, only B, or both A and B.

Further, the device according to various embodiments of the present disclosure can include, for example, all information communication devices or various multimedia application devices, which include all mobile communication terminals that operate based on communication protocols corresponding to various communication systems, Portable Multimedia Players (PMPs), Personal Digital Assistants (PDAs), music players (e.g., MP3 players), portable game machines, smart phones, notebook computers, and handheld PCs.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. An electronic device comprising:
   a communication module configured to transmit and receive data through wireless communication; and
   a controller configured to:
   search for other electronic devices through the communication module; and
   determine a communication connection sequence to connect each of the other electronic devices based on predefined conditions and a predefined weight value of each of multiple parameters that correspond to the predefined conditions.

2. The electronic device of claim 1, wherein the controller is configured to:
   select at least one of a plurality of the other electronic devices to establish a communication channel with, based on the predefined conditions; or
   determine the communication connection sequence of the plurality of other electronic devices based on at least one of:
   received signal strengths for the plurality of other electronic devices, a transmitted and received data error rate with the plurality of other electronic devices,
a distance with the plurality of other electronic devices,
a Quality of Service (QoS) with the plurality of other electronic devices,
whether the plurality of other electronic devices move,
whether the electronic device itself moves, or
a history of previous communication connections.

3. The electronic device of claim 2, wherein the controller is configured to differently put a weight value on at least one of the received signal strength, the data error rate, the distance, the QoS, the history before the communication connection, and movements of the plurality of other electronic devices or the electronic device itself, according to a kind of a currently activated application.

4. The electronic device of claim 2, further comprising a position information collector module configured to collect current position information,
wherein the controller is configured to calculate distances between the electronic device and the at least one of the other electronic devices.

5. The electronic device of claim 4, wherein when a specific application is activated, the controller is configured to perform communication connection with a farthest electronic device among the at least one of the other electronic devices.

6. The electronic device of claim 2, wherein if movement of the electronic device is detected while a specific application is activated, the controller is configured to perform a communication connection with a closest electronic device among the at least one of the other electronic devices.

7. The electronic device of claim 2, wherein when a specific application is activated, the controller is configured to perform a communication connection with one other electronic device with no movement and a strongest received signal strength among the at least one of other electronic devices.

8. The electronic device of claim 7, wherein when the specific application is activated, the controller is configured to:
re-perform a search according to a predetermined period if the received signal strength of the at least one of other electronic devices is changed;
release a communication connection with a previous other electronic device, and
perform a communication connection with the other electronic device having the strongest received signal strength among the at least one of other electronic devices.

9. The electronic device of claim 1, further comprising at least one filter configured to select at least one piece of data that is transmitted or received with the at least one of the other electronic devices based on previously input filter information.

10. The electronic device of claim 9, wherein the controller comprises a filter-based data processing module configured to select a specific filter according to at least one of a time, a place, and at least one electronic device to be connected for communication among the other electronic devices.

11. The electronic device of claim 9, wherein the controller further comprises a relation-based data processing module configured to:
divide specific information into data pieces;
sequentially broadcast the data pieces to selected other electronic devices; and
provide a specific event or content to the other electronic devices that sequentially respond to the sequential broadcast or respond to at least a part of the data pieces.

12. A data transmission and reception method using wireless communication comprising:
searching for other electronic devices based on wireless communication;
determining a communication connection sequence to connect each of the other electronic devices based on predefined conditions; and
establishing a communication connection with either a selected at least one of the other electronic devices, or each of the other electronic devices according to the determined communication connection sequence and a predefined weight value of each of multiple parameters that correspond to the predefined conditions.

13. The data transmission and reception method of claim 12, wherein the determining comprises:
collecting at least one piece of information of a received signal strength, a transmitted and received data error rate, a distance, and a Quality of Service (QoS) of the at least one of the other electronic devices, whether the at least one of other electronic devices moves, and whether the electronic device itself moves, and a history of previous communication connections; and
selecting the at least one of the other electronic devices, or determining the communication connection sequence to connect each of the at least one of the other electronic devices based on the collected information.

14. The data transmission and reception method of claim 13, further comprising:
differently putting a weight value on the at least one of the received signal strength, the data error rate, the distance, the QoS, the history of the previous communication connections, and the movement of the at least one of other electronic devices or the electronic device itself according to a kind of a currently activated application.

15. The data transmission and reception method of claim 13, wherein the determining comprises:
performing, when a specific application is activated, communication connection with the other electronic device that is in a farthest distance among the at least one of the other electronic devices; or
performing, when the specific application is activated, communication connection with the other electronic devices that are in a distance farther than a predefined reference value among the other electronic devices.

16. The data transmission and reception method of claim 13, wherein the determining comprises:
performing, if movement of the electronic device is detected while a specific application is activated, a communication connection with one other electronic device that is in a shortest distance among the other electronic devices; or
performing, if the movement of the electronic device is detected while the specific application is activated, a communication connection with one other electronic device that is in a relatively shorter distance among the other electronic devices.

17. The data transmission and reception method of claim 13, wherein the selecting or the determining comprises:
performing, when a specific application is activated, a communication connection with one other electronic device with no movement and a strongest received signal strength among the other electronic devices; or performing, when the specific application is activated, a communication connection with one other electronic device with no movement and a relatively stronger received signal strength among the other electronic devices.

18. The data transmission and reception method of claim 17, further comprising:
re-performing a search according to a predetermined period, if a received signal strength of the at least one of other electronic devices is changed,
releasing a communication connection with a previous other electronic device, and
performing a communication connection with one other electronic device with a strongest received signal strength among the other electronic devices.

19. The data transmission and reception method of claim 12, further comprising at least one of:
selecting a specific filter according to at least one of a time, a place, and the other electronic devices to be connected for communication, and selecting at least one piece of data transmitted and received with the other electronic devices based on filter information written in the selected specific filter; and
dividing specific information into data pieces, sequentially broadcasting the data pieces to the selected at least one of the other electronic devices, and providing a specific event or content to the other electronic devices that sequentially respond to the sequential broadcast or respond to at least a part of the data pieces.

20. A non-transitory storage medium that is readable by a machine that stores commands, which are set to make at least one processor perform at least one operation when the at least one processor executes the commands, wherein the at least one operation comprises:

a first data processing operation:
to select at least one of other electronic devices which are searched using wireless communication based on predefined conditions,
to determine a communication connection sequence to connect each of the other electronic devices based on the predefined conditions and a predefined weight value of each of multiple parameters that correspond to the predefined conditions, and
to transmit data to the at least one of the other electronic devices based on at least one of the selection or the communication connection sequence;
a second data processing operation:
to select a specific filter according to at least one of:
a time,
a place, and
at least one of other electronic devices to be connected for communication to transmit the data, and
to select at least one piece of the data transmitted and received through the other electronic devices based on filter information written in the selected specific filter; and
a third data processing operation:
to divide specific information into data pieces,
to sequentially broadcast the data pieces to the selected other electronic devices, and
to provide a specific event or content to the other electronic devices that sequentially respond to the sequential broadcast or respond to at least a part of the data pieces.

* * * * *